(12) United States Patent
Zamfir et al.

(10) Patent No.: US 9,767,539 B2
(45) Date of Patent: Sep. 19, 2017

(54) IMAGE CAPTURE DEVICE WITH CONTEMPORANEOUS IMAGE CORRECTION MECHANISM

(71) Applicant: Fotonation Limited, Galway (IE)

(72) Inventors: Adrian Zamfir, Bucharest (RO); Petronel Bigioi, Galway (IE); Peter Corcoran, Claregalway (IE); Alexandru Drimbarean, Galway (IE); Eran Steinberg, San Jose, CA (US)

(73) Assignee: FotoNation Limited, Galway (IE)

( * ) Notice: Subject to any disclaimer, the term of this patent is extended or adjusted under 35 U.S.C. 154(b) by 89 days.

(21) Appl. No.: 14/523,816

(22) Filed: Oct. 24, 2014

(65) Prior Publication Data
US 2015/0063692 A1 Mar. 5, 2015

Related U.S. Application Data

(63) Continuation of application No. 12/140,532, filed on Jun. 17, 2008, now Pat. No. 8,896,725.
(Continued)

(51) Int. Cl.
*H04N 5/228* (2006.01)
*H04N 5/225* (2006.01)
(Continued)

(52) U.S. Cl.
CPC ............ *G06T 5/003* (2013.01); *G06K 9/0061* (2013.01); *G06K 9/00248* (2013.01);
(Continued)

(58) Field of Classification Search
CPC ..... G06T 5/003; G06T 3/4038; G06T 7/0081; G06T 7/408; G06T 11/60; G06K 9/4652;
(Continued)

(56) References Cited

U.S. PATENT DOCUMENTS

| 4,047,187 A | 9/1977 | Mashimo et al. |
| 4,317,991 A | 3/1982 | Stauffer |

(Continued)

FOREIGN PATENT DOCUMENTS

| EP | 578508 A2 | 1/1994 |
| EP | 984386 A2 | 3/2000 |

(Continued)

OTHER PUBLICATIONS

U.S. Appl. No. 12/140,532, filed Jun. 17, 2008, Notice of Allowance, May 13, 2014.
(Continued)

*Primary Examiner* — Twyler Haskins
*Assistant Examiner* — Carramah J Quiett

(57) ABSTRACT

A hand-held or otherwise portable or spatial or temporal performance-based image capture device includes one or more lenses, an aperture and a main sensor for capturing an original main image. A secondary sensor and optical system are for capturing a reference image that has temporal and spatial overlap with the original image. The device performs an image processing method including capturing the main image with the main sensor and the reference image with the secondary sensor, and utilizing information from the reference image to enhance the main image. The main and secondary sensors are contained together within a housing.

21 Claims, 19 Drawing Sheets

Related U.S. Application Data

(60) Provisional application No. 60/945,558, filed on Jun. 21, 2007.

(51) Int. Cl.

| | | |
|---|---|---|
| *G06T 5/00* | (2006.01) | |
| *G06K 9/00* | (2006.01) | |
| *G06K 9/32* | (2006.01) | |
| *H04N 5/232* | (2006.01) | |
| *H04N 5/235* | (2006.01) | |
| *H04N 5/272* | (2006.01) | |
| *H04N 5/345* | (2011.01) | |
| *H04N 5/347* | (2011.01) | |
| *H04N 5/77* | (2006.01) | |
| *H04N 9/804* | (2006.01) | |
| *G06K 9/46* | (2006.01) | |
| *G06K 9/48* | (2006.01) | |
| *G06T 3/40* | (2006.01) | |
| *G06T 11/60* | (2006.01) | |
| *H04N 5/907* | (2006.01) | |

(52) U.S. Cl.
CPC ......... *G06K 9/3208* (2013.01); *G06K 9/4652* (2013.01); *G06K 9/48* (2013.01); *G06T 3/4038* (2013.01); *G06T 11/60* (2013.01); *H04N 5/2258* (2013.01); *H04N 5/2354* (2013.01); *H04N 5/23219* (2013.01); *H04N 5/23222* (2013.01); *H04N 5/272* (2013.01); *H04N 5/345* (2013.01); *H04N 5/347* (2013.01); *H04N 5/772* (2013.01); *H04N 9/8042* (2013.01); *G06T 2207/10004* (2013.01); *G06T 2207/20201* (2013.01); *G06T 2207/20221* (2013.01); *G06T 2207/30168* (2013.01); *G06T 2207/30216* (2013.01); *H04N 5/907* (2013.01)

(58) Field of Classification Search
CPC ...... G06K 9/48; G06K 9/0061; G06K 9/3208; G06K 9/00248; H04N 5/2258; H04N 5/345; H04N 5/23222; H04N 5/23219; H04N 9/8042; H04N 5/772; H04N 5/272; H04N 5/347; H04N 5/23
See application file for complete search history.

(56) References Cited

U.S. PATENT DOCUMENTS

| | | |
|---|---|---|
| 4,367,027 A | 1/1983 | Stauffer |
| RE31,370 E | 9/1983 | Mashimo et al. |
| 4,448,510 A | 5/1984 | Murakoshi |
| 4,469,417 A | 9/1984 | Masunaga et al. |
| 4,562,346 A | 12/1985 | Hayashi et al. |
| 4,638,364 A | 1/1987 | Hiramatsu |
| 4,673,276 A | 6/1987 | Yoshida et al. |
| 4,796,043 A | 1/1989 | Izumi et al. |
| 4,970,663 A | 11/1990 | Bedell et al. |
| 4,970,683 A | 11/1990 | Harshaw et al. |
| 4,975,969 A | 12/1990 | Tal |
| 5,008,946 A | 4/1991 | Ando |
| 5,018,017 A | 5/1991 | Sasaki et al. |
| RE33,682 E | 9/1991 | Hiramatsu |
| 5,051,770 A | 9/1991 | Cornuejols |
| 5,061,951 A | 10/1991 | Higashihara et al. |
| 5,063,603 A | 11/1991 | Burt |
| 5,111,231 A | 5/1992 | Tokunaga |
| 5,150,432 A | 9/1992 | Ueno et al. |
| 5,161,204 A | 11/1992 | Hutcheson et al. |
| 5,164,831 A | 11/1992 | Kuchta et al. |
| 5,164,992 A | 11/1992 | Turk et al. |
| 5,227,837 A | 7/1993 | Terashita |
| 5,262,820 A | 11/1993 | Tamai et al. |
| 5,278,923 A | 1/1994 | Nazarathy et al. |
| 5,280,530 A | 1/1994 | Trew et al. |
| 5,291,234 A | 3/1994 | Shino et al. |
| 5,305,048 A | 4/1994 | Suzuki et al. |
| 5,311,240 A | 5/1994 | Wheeler |
| 5,331,544 A | 7/1994 | Lu et al. |
| 5,353,058 A | 10/1994 | Takei |
| 5,384,615 A | 1/1995 | Hsieh et al. |
| 5,384,912 A | 1/1995 | Ogrinc et al. |
| 5,430,809 A | 7/1995 | Tomitaka |
| 5,432,863 A | 7/1995 | Benati et al. |
| 5,450,504 A | 9/1995 | Calia |
| 5,465,308 A | 11/1995 | Hutcheson et al. |
| 5,488,429 A | 1/1996 | Kojima et al. |
| 5,493,409 A | 2/1996 | Maeda et al. |
| 5,496,106 A | 3/1996 | Anderson |
| 5,543,952 A | 8/1996 | Yonenaga et al. |
| 5,576,759 A | 11/1996 | Kawamura et al. |
| 5,633,678 A | 5/1997 | Parulski et al. |
| 5,638,136 A | 6/1997 | Kojima et al. |
| 5,638,139 A | 6/1997 | Clatanoff et al. |
| 5,652,669 A | 7/1997 | Liedenbaum |
| 5,680,481 A | 10/1997 | Prasad et al. |
| 5,684,509 A | 11/1997 | Hatana et al. |
| 5,706,362 A | 1/1998 | Yabe |
| 5,710,833 A | 1/1998 | Moghaddam et al. |
| 5,715,325 A | 2/1998 | Bang et al. |
| 5,724,456 A | 3/1998 | Boyack et al. |
| 5,745,668 A | 4/1998 | Poggo et al. |
| 5,748,764 A | 5/1998 | Benati et al. |
| 5,764,790 A | 6/1998 | Brunelli et al. |
| 5,764,803 A | 6/1998 | Jacquin et al. |
| 5,771,307 A | 6/1998 | Lu et al. |
| 5,774,129 A | 6/1998 | Poggio et al. |
| 5,774,591 A | 6/1998 | Black et al. |
| 5,774,747 A | 6/1998 | Ishihara et al. |
| 5,774,754 A | 6/1998 | Ootsuka |
| 5,781,650 A | 7/1998 | Lobo et al. |
| 5,802,208 A | 9/1998 | Podilchuk et al. |
| 5,812,193 A | 9/1998 | Tomitaka et al. |
| 5,818,975 A | 10/1998 | Goodwin et al. |
| 5,835,616 A | 11/1998 | Lobo et al. |
| 5,842,194 A | 11/1998 | Arbuckle |
| 5,844,573 A | 12/1998 | Poggio et al. |
| 5,850,470 A | 12/1998 | Kung et al. |
| 5,852,669 A | 12/1998 | Eleftheriadis et al. |
| 5,852,823 A | 12/1998 | De Bonet |
| RE36,041 E | 1/1999 | Turk |
| 5,870,138 A | 2/1999 | Smith et al. |
| 5,905,807 A | 5/1999 | Kado et al. |
| 5,911,139 A | 6/1999 | Jain et al. |
| 5,912,980 A | 6/1999 | Hunke |
| 5,963,670 A | 10/1999 | Lipson et al. |
| 5,966,459 A | 10/1999 | Hara et al. |
| 5,978,519 A | 11/1999 | Bollman et al. |
| 5,990,973 A | 11/1999 | Sakamoto |
| 5,991,456 A | 11/1999 | Rahman et al. |
| 6,009,209 A | 12/1999 | Acker et al. |
| 6,016,354 A | 1/2000 | Lin et al. |
| 6,028,960 A | 2/2000 | Graf et al. |
| 6,035,074 A | 3/2000 | Fujimoto et al. |
| 6,053,268 A | 4/2000 | Yamada |
| 6,061,055 A | 5/2000 | Marks |
| 6,072,094 A | 6/2000 | Karady et al. |
| 6,097,470 A | 8/2000 | Buhr et al. |
| 6,101,271 A | 8/2000 | Yamashita et al. |
| 6,108,437 A | 8/2000 | Lin |
| 6,115,052 A | 9/2000 | Freeman et al. |
| 6,121,953 A | 9/2000 | Walker |
| 6,128,397 A | 10/2000 | Baluja et al. |
| 6,128,398 A | 10/2000 | Kuperstein et al. |
| 6,134,339 A | 10/2000 | Luo |
| 6,148,092 A | 11/2000 | Qian |
| 6,151,073 A | 11/2000 | Steinberg et al. |
| 6,157,677 A | 12/2000 | Martens et al. |
| 6,173,068 B1 | 1/2001 | Prokoski |
| 6,184,926 B1 | 2/2001 | Khosravi et al. |
| 6,188,777 B1 | 2/2001 | Darrell et al. |
| 6,192,149 B1 | 2/2001 | Eschbach et al. |
| 6,240,198 B1 | 5/2001 | Rehg et al. |

(56) References Cited

U.S. PATENT DOCUMENTS

| | | |
|---|---|---|
| 6,246,779 B1 | 6/2001 | Fukui et al. |
| 6,246,790 B1 | 6/2001 | Huang et al. |
| 6,249,315 B1 | 6/2001 | Holm et al. |
| 6,252,976 B1 | 6/2001 | Schildkraut et al. |
| 6,263,113 B1 | 7/2001 | Abdel-Mottaleb et al. |
| 6,268,939 B1 | 7/2001 | Klassen et al. |
| 6,278,491 B1 | 8/2001 | Wang et al. |
| 6,282,317 B1 | 8/2001 | Luo et al. |
| 6,285,410 B1 | 9/2001 | Marni |
| 6,292,575 B1 | 9/2001 | Bortolussi et al. |
| 6,301,370 B1 | 10/2001 | Steffens et al. |
| 6,301,440 B1 | 10/2001 | Bolle et al. |
| 6,332,033 B1 | 12/2001 | Qian |
| 6,334,008 B2 | 12/2001 | Nakabayashi |
| 6,349,373 B2 | 2/2002 | Sitka et al. |
| 6,351,556 B1 | 2/2002 | Loui et al. |
| 6,393,148 B1 | 5/2002 | Bhaskar |
| 6,400,830 B1 | 6/2002 | Christian et al. |
| 6,404,900 B1 | 6/2002 | Qian et al. |
| 6,407,777 B1 | 6/2002 | Deluca |
| 6,421,468 B1 | 7/2002 | Ratnakar et al. |
| 6,426,779 B1 | 7/2002 | Noguchi et al. |
| 6,438,234 B1 | 8/2002 | Gisin et al. |
| 6,438,264 B1 | 8/2002 | Gallagher et al. |
| 6,441,854 B2 | 8/2002 | Fellegara et al. |
| 6,445,810 B2 | 9/2002 | Darrell et al. |
| 6,456,732 B1 | 9/2002 | Kimbell et al. |
| 6,459,436 B1 | 10/2002 | Kumada et al. |
| 6,463,163 B1 | 10/2002 | Kresch |
| 6,473,199 B1 | 10/2002 | Gilman et al. |
| 6,483,521 B1 | 11/2002 | Takahashi et al. |
| 6,501,857 B1 | 12/2002 | Gotsman et al. |
| 6,502,107 B1 | 12/2002 | Nishida |
| 6,504,942 B1 | 1/2003 | Hong et al. |
| 6,504,951 B1 | 1/2003 | Luo et al. |
| 6,516,154 B1 | 2/2003 | Parulski et al. |
| 6,526,156 B1 | 2/2003 | Black et al. |
| 6,526,161 B1 | 2/2003 | Yan |
| 6,529,630 B1 | 3/2003 | Kinjo |
| 6,549,641 B2 | 4/2003 | Ishikawa |
| 6,556,708 B1 | 4/2003 | Christian et al. |
| 6,560,029 B1 | 5/2003 | Dobbie et al. |
| 6,564,225 B1 | 5/2003 | Brogliatti et al. |
| 6,567,983 B1 | 5/2003 | Shiimori |
| 6,587,119 B1 | 7/2003 | Anderson et al. |
| 6,606,398 B2 | 8/2003 | Cooper |
| 6,611,613 B1 | 8/2003 | Kang et al. |
| 6,633,655 B1 | 10/2003 | Hong et al. |
| 6,661,907 B2 | 12/2003 | Ho et al. |
| 6,681,032 B2 | 1/2004 | Bortolussi et al. |
| 6,697,503 B2 | 2/2004 | Matsuo et al. |
| 6,697,504 B2 | 2/2004 | Tsai |
| 6,700,999 B1 | 3/2004 | Yang |
| 6,714,665 B1 | 3/2004 | Hanna et al. |
| 6,747,690 B2 | 6/2004 | Molgaard |
| 6,754,368 B1 | 6/2004 | Cohen |
| 6,754,389 B1 | 6/2004 | Dimitrova et al. |
| 6,760,465 B2 | 7/2004 | Mcveigh et al. |
| 6,760,485 B1 | 7/2004 | Gilman et al. |
| 6,765,612 B1 | 7/2004 | Anderson et al. |
| 6,778,216 B1 | 8/2004 | Lin |
| 6,792,135 B1 | 9/2004 | Toyama |
| 6,798,834 B1 | 9/2004 | Murakami et al. |
| 6,801,250 B1 | 10/2004 | Miyashita |
| 6,801,642 B2 | 10/2004 | Gorday et al. |
| 6,816,611 B1 | 11/2004 | Hagiwara et al. |
| 6,829,009 B2 | 12/2004 | Sugimoto |
| 6,850,274 B1 | 2/2005 | Silverbrook et al. |
| 6,859,565 B2 | 2/2005 | Baron |
| 6,876,755 B1 | 4/2005 | Taylor et al. |
| 6,879,705 B1 | 4/2005 | Tao et al. |
| 6,900,840 B1 | 5/2005 | Schinner et al. |
| 6,937,773 B1 | 8/2005 | Nozawa et al. |
| 6,940,545 B1 | 9/2005 | Ray et al. |
| 6,947,601 B2 | 9/2005 | Aoki et al. |
| 6,959,109 B2 | 10/2005 | Moustafa |
| 6,965,684 B2 | 11/2005 | Chen et al. |
| 6,967,680 B1 | 11/2005 | Kagle et al. |
| 6,977,687 B1 | 12/2005 | Suh |
| 6,980,691 B2 | 12/2005 | Nesterov et al. |
| 6,993,157 B1 | 1/2006 | Oue et al. |
| 7,003,135 B2 | 2/2006 | Hsieh et al. |
| 7,020,337 B2 | 3/2006 | Viola et al. |
| 7,027,619 B2 | 4/2006 | Pavlidis et al. |
| 7,027,621 B1 | 4/2006 | Prokoski et al. |
| 7,034,848 B2 | 4/2006 | Sobol |
| 7,035,456 B2 | 4/2006 | Lestideau |
| 7,035,462 B2 | 4/2006 | White et al. |
| 7,035,467 B2 | 4/2006 | Nicponski |
| 7,038,709 B1 | 5/2006 | Verghese |
| 7,038,715 B1 | 5/2006 | Flinchbaugh |
| 7,039,222 B2 | 5/2006 | Simon et al. |
| 7,042,501 B1 | 5/2006 | Matama |
| 7,042,505 B1 | 5/2006 | Deluca |
| 7,042,511 B2 | 5/2006 | Lin |
| 7,043,056 B2 | 5/2006 | Edwards et al. |
| 7,043,465 B2 | 5/2006 | Pirim |
| 7,050,607 B2 | 5/2006 | Li et al. |
| 7,057,653 B1 | 6/2006 | Kubo |
| 7,064,776 B2 | 6/2006 | Sumi et al. |
| 7,082,212 B2 | 7/2006 | Liu et al. |
| 7,099,510 B2 | 8/2006 | Jones et al. |
| 7,106,374 B1 | 9/2006 | Bandera et al. |
| 7,106,887 B2 | 9/2006 | Kinjo |
| 7,110,569 B2 | 9/2006 | Brodsky et al. |
| 7,110,575 B2 | 9/2006 | Chen et al. |
| 7,113,641 B1 | 9/2006 | Eckes et al. |
| 7,119,838 B2 | 10/2006 | Zanzucchi et al. |
| 7,120,279 B2 | 10/2006 | Chen et al. |
| 7,146,026 B2 | 12/2006 | Russon et al. |
| 7,151,843 B2 | 12/2006 | Rui et al. |
| 7,158,680 B2 | 1/2007 | Pace |
| 7,162,076 B2 | 1/2007 | Liu |
| 7,162,101 B2 | 1/2007 | Itokawa et al. |
| 7,171,023 B2 | 1/2007 | Kim et al. |
| 7,171,025 B2 | 1/2007 | Rui et al. |
| 7,190,829 B2 | 3/2007 | Zhang et al. |
| 7,194,114 B2 | 3/2007 | Schneiderman |
| 7,200,249 B2 | 4/2007 | Okubo et al. |
| 7,218,759 B1 | 5/2007 | Ho et al. |
| 7,227,976 B1 | 6/2007 | Jung et al. |
| 7,254,257 B2 | 8/2007 | Kim et al. |
| 7,269,292 B2 | 9/2007 | Steinberg |
| 7,274,822 B2 | 9/2007 | Zhang et al. |
| 7,274,832 B2 | 9/2007 | Nicponski |
| 7,289,664 B2 | 10/2007 | Enomoto |
| 7,295,233 B2 | 11/2007 | Steinberg et al. |
| 7,315,630 B2 | 1/2008 | Steinberg et al. |
| 7,315,631 B1 | 1/2008 | Corcoran et al. |
| 7,317,815 B2 | 1/2008 | Steinberg et al. |
| 7,321,670 B2 | 1/2008 | Yoon et al. |
| 7,324,670 B2 | 1/2008 | Kozakaya et al. |
| 7,324,671 B2 | 1/2008 | Li et al. |
| 7,336,821 B2 | 2/2008 | Ciuc et al. |
| 7,336,830 B2 | 2/2008 | Porter et al. |
| 7,340,110 B2 | 3/2008 | Lim et al. |
| 7,352,394 B1 | 4/2008 | Deluca et al. |
| 7,362,210 B2 | 4/2008 | Bazakos et al. |
| 7,362,368 B2 | 4/2008 | Steinberg et al. |
| 7,403,643 B2 | 7/2008 | Ianculescu et al. |
| 7,436,998 B2 | 10/2008 | Steinberg et al. |
| 7,437,998 B2 | 10/2008 | Burger et al. |
| 7,440,593 B1 | 10/2008 | Steinberg et al. |
| 7,457,477 B2 | 11/2008 | Petschnigg et al. |
| 7,460,695 B2 | 12/2008 | Steinberg et al. |
| 7,469,055 B2 | 12/2008 | Corcoran et al. |
| 7,515,740 B2 | 4/2009 | Corcoran et al. |
| 7,536,036 B2 | 5/2009 | Steinberg et al. |
| 7,565,030 B2 | 7/2009 | Steinberg et al. |
| 7,587,085 B2 | 9/2009 | Steinberg et al. |
| 7,620,218 B2 | 11/2009 | Steinberg et al. |
| 7,623,177 B2 | 11/2009 | Nakamura et al. |
| 7,636,486 B2 | 12/2009 | Steinberg et al. |
| 7,689,009 B2 | 3/2010 | Corcoran et al. |

(56) References Cited

U.S. PATENT DOCUMENTS

| | | |
|---|---|---|
| 7,738,015 B2 | 6/2010 | Steinberg et al. |
| 7,792,335 B2 | 9/2010 | Steinberg et al. |
| 7,868,922 B2 | 1/2011 | Ciuc et al. |
| 7,920,723 B2 | 4/2011 | Nanu et al. |
| 7,953,251 B1 | 5/2011 | Steinberg et al. |
| 8,055,029 B2 | 11/2011 | Petrescu et al. |
| 8,073,286 B2 | 12/2011 | David et al. |
| 8,135,184 B2 | 3/2012 | Steinberg et al. |
| 2001/0005222 A1 | 6/2001 | Yamaguchi |
| 2001/0028731 A1 | 10/2001 | Covell et al. |
| 2001/0031142 A1 | 10/2001 | Whiteside |
| 2001/0038712 A1 | 11/2001 | Loce et al. |
| 2001/0038714 A1 | 11/2001 | Masumoto et al. |
| 2002/0041717 A1 | 4/2002 | Murataet et al. |
| 2002/0093577 A1 | 7/2002 | Kitawaki et al. |
| 2002/0105662 A1 | 8/2002 | Patton et al. |
| 2002/0106114 A1 | 8/2002 | Yan et al. |
| 2002/0114535 A1 | 8/2002 | Luo |
| 2002/0118287 A1 | 8/2002 | Grosvenor et al. |
| 2002/0136433 A1 | 9/2002 | Lin |
| 2002/0141640 A1 | 10/2002 | Kraft |
| 2002/0150662 A1 | 10/2002 | Dewis et al. |
| 2002/0168108 A1 | 11/2002 | Loui et al. |
| 2002/0172419 A1 | 11/2002 | Lin et al. |
| 2002/0176610 A1 | 11/2002 | Okazaki et al. |
| 2002/0181801 A1 | 12/2002 | Needham et al. |
| 2002/0191861 A1 | 12/2002 | Cheatle |
| 2003/0012414 A1 | 1/2003 | Luo |
| 2003/0023974 A1 | 1/2003 | Dagtas et al. |
| 2003/0025812 A1 | 2/2003 | Slatter |
| 2003/0035573 A1 | 2/2003 | Duta et al. |
| 2003/0044070 A1 | 3/2003 | Fuersich et al. |
| 2003/0044177 A1 | 3/2003 | Oberhardt et al. |
| 2003/0048950 A1 | 3/2003 | Savakis et al. |
| 2003/0052991 A1 | 3/2003 | Stavely et al. |
| 2003/0059107 A1 | 3/2003 | Sun et al. |
| 2003/0059121 A1 | 3/2003 | Savakis et al. |
| 2003/0071908 A1 | 4/2003 | Sannoh et al. |
| 2003/0084065 A1 | 5/2003 | Lin et al. |
| 2003/0095197 A1 | 5/2003 | Wheeler et al. |
| 2003/0107649 A1 | 6/2003 | Flickner et al. |
| 2003/0118216 A1 | 6/2003 | Goldberg |
| 2003/0118249 A1 | 6/2003 | Edgar |
| 2003/0123713 A1 | 7/2003 | Geng |
| 2003/0123751 A1 | 7/2003 | Krishnamurthy et al. |
| 2003/0142209 A1 | 7/2003 | Yamazaki et al. |
| 2003/0151674 A1 | 8/2003 | Lin |
| 2003/0174773 A1 | 9/2003 | Comaniciu et al. |
| 2003/0202715 A1 | 10/2003 | Kinjo |
| 2004/0022435 A1 | 2/2004 | Ishida |
| 2004/0041121 A1 | 3/2004 | Yoshida et al. |
| 2004/0095359 A1 | 5/2004 | Simon et al. |
| 2004/0114904 A1 | 6/2004 | Sun et al. |
| 2004/0120391 A1 | 6/2004 | Lin et al. |
| 2004/0120399 A1 | 6/2004 | Kato |
| 2004/0125387 A1 | 7/2004 | Nagao et al. |
| 2004/0170397 A1 | 9/2004 | Ono |
| 2004/0175021 A1 | 9/2004 | Porter et al. |
| 2004/0179719 A1 | 9/2004 | Chen et al. |
| 2004/0218832 A1 | 11/2004 | Luo et al. |
| 2004/0223063 A1 | 11/2004 | DeLuca et al. |
| 2004/0227978 A1 | 11/2004 | Enomoto |
| 2004/0228505 A1 | 11/2004 | Sugimoto |
| 2004/0233301 A1 | 11/2004 | Nakata et al. |
| 2004/0234156 A1 | 11/2004 | Watanabe et al. |
| 2005/0007486 A1 | 1/2005 | Fujii et al. |
| 2005/0013479 A1 | 1/2005 | Xiao et al. |
| 2005/0013603 A1 | 1/2005 | Ichimasa |
| 2005/0018923 A1 | 1/2005 | Messina et al. |
| 2005/0031224 A1 | 2/2005 | Prilutsky et al. |
| 2005/0036044 A1 | 2/2005 | Funakura |
| 2005/0041121 A1* | 2/2005 | Steinberg et al. |
| 2005/0046725 A1* | 3/2005 | Sasagawa ............ H04N 7/0122 348/333.01 |
| 2005/0068446 A1 | 3/2005 | Steinberg et al. |
| 2005/0068452 A1 | 3/2005 | Steinberg et al. |
| 2005/0069208 A1 | 3/2005 | Morisada |
| 2005/0073596 A1 | 4/2005 | Takahashi |
| 2005/0089218 A1 | 4/2005 | Chiba |
| 2005/0104848 A1 | 5/2005 | Yamaguchi et al. |
| 2005/0105780 A1 | 5/2005 | Ioffe |
| 2005/0128518 A1* | 6/2005 | Tsue ................ H04N 1/00196 358/1.15 |
| 2005/0129324 A1* | 6/2005 | Lemke ................ H04N 1/387 382/254 |
| 2005/0140801 A1 | 6/2005 | Prilutsky et al. |
| 2005/0185054 A1 | 8/2005 | Edwards et al. |
| 2005/0195317 A1 | 9/2005 | Myoga |
| 2005/0265453 A1 | 12/2005 | Saito |
| 2005/0275721 A1 | 12/2005 | Ishii |
| 2006/0006077 A1 | 1/2006 | Mosher et al. |
| 2006/0008152 A1 | 1/2006 | Kumar et al. |
| 2006/0008171 A1 | 1/2006 | Petschnigg et al. |
| 2006/0008173 A1 | 1/2006 | Matsugu et al. |
| 2006/0018517 A1 | 1/2006 | Chen et al. |
| 2006/0029265 A1 | 2/2006 | Kim et al. |
| 2006/0039690 A1 | 2/2006 | Steinberg et al. |
| 2006/0050933 A1 | 3/2006 | Adam et al. |
| 2006/0054787 A1 | 3/2006 | Olsen |
| 2006/0056655 A1 | 3/2006 | Wen et al. |
| 2006/0083440 A1 | 4/2006 | Chen |
| 2006/0093212 A1 | 5/2006 | Steingberg et al. |
| 2006/0093213 A1 | 5/2006 | Steingberg et al. |
| 2006/0093238 A1 | 5/2006 | Steinberg et al. |
| 2006/0098875 A1 | 5/2006 | Sugimoto |
| 2006/0098890 A1 | 5/2006 | Steinberg et al. |
| 2006/0120599 A1 | 6/2006 | Steingberg et al. |
| 2006/0133699 A1 | 6/2006 | Widrow et al. |
| 2006/0140455 A1 | 6/2006 | Costache et al. |
| 2006/0147192 A1 | 7/2006 | Zhang et al. |
| 2006/0153472 A1 | 7/2006 | Sakata et al. |
| 2006/0177100 A1 | 8/2006 | Zhu et al. |
| 2006/0177131 A1 | 8/2006 | Porikli |
| 2006/0187305 A1 | 8/2006 | Trivedi et al. |
| 2006/0203106 A1 | 9/2006 | Lawrence et al. |
| 2006/0203107 A1 | 9/2006 | Steingberg et al. |
| 2006/0204034 A1 | 9/2006 | Steinberg et al. |
| 2006/0204037 A1 | 9/2006 | Watanabe et al. |
| 2006/0204055 A1 | 9/2006 | Steinberg et al. |
| 2006/0204056 A1 | 9/2006 | Steinberg et al. |
| 2006/0204057 A1 | 9/2006 | Steinberg |
| 2006/0204058 A1 | 9/2006 | Kim et al. |
| 2006/0204110 A1 | 9/2006 | Steinberg et al. |
| 2006/0210148 A1 | 9/2006 | Nakashima |
| 2006/0210264 A1 | 9/2006 | Saga |
| 2006/0215924 A1 | 9/2006 | Steinberg et al. |
| 2006/0227997 A1 | 10/2006 | Au et al. |
| 2006/0257047 A1 | 11/2006 | Kameyama et al. |
| 2006/0268150 A1 | 11/2006 | Kameyama et al. |
| 2006/0269270 A1 | 11/2006 | Yoda et al. |
| 2006/0280380 A1 | 12/2006 | Li |
| 2006/0285754 A1 | 12/2006 | Steinberg et al. |
| 2006/0291739 A1 | 12/2006 | Li et al. |
| 2007/0018980 A1 | 1/2007 | Berteig et al. |
| 2007/0035628 A1 | 2/2007 | Kanai |
| 2007/0047768 A1 | 3/2007 | Gordon et al. |
| 2007/0053614 A1 | 3/2007 | Mori et al. |
| 2007/0070440 A1 | 3/2007 | Li et al. |
| 2007/0071347 A1 | 3/2007 | Li et al. |
| 2007/0091203 A1 | 4/2007 | Peker et al. |
| 2007/0098303 A1 | 5/2007 | Gallagher et al. |
| 2007/0110305 A1 | 5/2007 | Corcoran et al. |
| 2007/0110417 A1 | 5/2007 | Itokawa |
| 2007/0116379 A1 | 5/2007 | Corcoran et al. |
| 2007/0116380 A1 | 5/2007 | Ciuc et al. |
| 2007/0154095 A1 | 7/2007 | Cao et al. |
| 2007/0154096 A1 | 7/2007 | Cao et al. |
| 2007/0160307 A1 | 7/2007 | Steinberg et al. |
| 2007/0189748 A1 | 8/2007 | Drimbarean et al. |
| 2007/0189757 A1 | 8/2007 | Steinberg et al. |
| 2007/0195174 A1 | 8/2007 | Oren |
| 2007/0201724 A1 | 8/2007 | Steinberg et al. |
| 2007/0201725 A1 | 8/2007 | Steinberg et al. |
| 2007/0201726 A1 | 8/2007 | Steinberg et al. |

(56) References Cited

U.S. PATENT DOCUMENTS

| | | |
|---|---|---|
| 2007/0263104 A1 | 11/2007 | Deluca et al. |
| 2007/0269108 A1 | 11/2007 | Steinberg et al. |
| 2007/0273504 A1 | 11/2007 | Tran |
| 2007/0296833 A1 | 12/2007 | Corcoran et al. |
| 2008/0002060 A1 | 1/2008 | Deluca et al. |
| 2008/0013798 A1 | 1/2008 | Ionita et al. |
| 2008/0013799 A1 | 1/2008 | Steinberg et al. |
| 2008/0013800 A1 | 1/2008 | Steinberg et al. |
| 2008/0019565 A1 | 1/2008 | Steinberg |
| 2008/0037827 A1 | 2/2008 | Corcoran et al. |
| 2008/0037839 A1 | 2/2008 | Corcoran et al. |
| 2008/0043121 A1 | 2/2008 | Prilutsky et al. |
| 2008/0043122 A1 | 2/2008 | Steinberg et al. |
| 2008/0049970 A1 | 2/2008 | Ciuc et al. |
| 2008/0055433 A1 | 3/2008 | Steinberg et al. |
| 2008/0075385 A1 | 3/2008 | David et al. |
| 2008/0144966 A1 | 6/2008 | Steinberg et al. |
| 2008/0175481 A1 | 7/2008 | Petrescu et al. |
| 2008/0175574 A1 | 7/2008 | Tomita et al. |
| 2008/0186389 A1 | 8/2008 | Deluca et al. |
| 2008/0205712 A1 | 8/2008 | Ionita et al. |
| 2008/0219517 A1 | 9/2008 | Blonk et al. |
| 2008/0219518 A1 | 9/2008 | Steinberg et al. |
| 2008/0220750 A1 | 9/2008 | Steinberg et al. |
| 2008/0240555 A1 | 10/2008 | Nanu et al. |
| 2008/0267461 A1 | 10/2008 | Ianculescu et al. |
| 2008/0316328 A1 | 12/2008 | Steinberg et al. |
| 2008/0317339 A1 | 12/2008 | Steinberg et al. |
| 2008/0317357 A1 | 12/2008 | Steinberg et al. |
| 2008/0317378 A1 | 12/2008 | Steinberg et al. |
| 2008/0317379 A1 | 12/2008 | Steinberg et al. |
| 2009/0002504 A1* | 1/2009 | Yano .................. G06T 3/4007 348/218.1 |
| 2009/0002514 A1 | 1/2009 | Steinberg et al. |
| 2009/0003652 A1 | 1/2009 | Steinberg et al. |
| 2009/0003708 A1 | 1/2009 | Steinberg et al. |
| 2009/0052749 A1 | 2/2009 | Steinberg et al. |
| 2009/0052750 A1 | 2/2009 | Steinberg et al. |
| 2009/0087030 A1 | 4/2009 | Steinberg et al. |
| 2009/0087042 A1 | 4/2009 | Steinberg et al. |
| 2009/0141144 A1 | 6/2009 | Steinberg |
| 2009/0179998 A1 | 7/2009 | Steinberg et al. |
| 2009/0208056 A1 | 8/2009 | Corcoran et al. |
| 2009/0238410 A1 | 9/2009 | Corcoran et al. |
| 2009/0238419 A1 | 9/2009 | Steinberg et al. |
| 2009/0303342 A1 | 12/2009 | Corcoran et al. |
| 2010/0014721 A1 | 1/2010 | Steinberg et al. |
| 2010/0039525 A1 | 2/2010 | Steinberg et al. |
| 2010/0053362 A1 | 3/2010 | Nanu et al. |
| 2010/0054533 A1 | 3/2010 | Steinberg et al. |
| 2010/0054549 A1 | 3/2010 | Steinberg et al. |
| 2010/0060727 A1 | 3/2010 | Steinberg et al. |
| 2010/0066822 A1 | 3/2010 | Steinberg et al. |
| 2010/0069222 A1 | 3/2010 | Steinberg et al. |
| 2010/0092039 A1 | 4/2010 | Steinberg et al. |
| 2010/0271505 A1 | 10/2010 | Zimmer et al. |
| 2011/0110567 A1 | 5/2011 | Jiang |
| 2011/0122297 A1 | 5/2011 | Steinberg et al. |
| 2011/0221936 A1 | 9/2011 | Steinberg et al. |
| 2012/0069198 A1 | 3/2012 | Steinberg et al. |

FOREIGN PATENT DOCUMENTS

| | | |
|---|---|---|
| EP | 1128316 A1 | 8/2001 |
| EP | 1391842 A2 | 2/2004 |
| EP | 1398733 A1 | 3/2004 |
| EP | 1626569 A1 | 2/2006 |
| EP | 1785914 A1 | 5/2007 |
| EP | 2256666 A2 | 12/2010 |
| EP | 2052347 B1 | 4/2011 |
| GB | 2370438 A1 | 6/2002 |
| JP | 5260360 A2 | 10/1993 |
| JP | 2003030647 A | 1/2003 |
| JP | 2005129070 A | 5/2005 |
| JP | 25164475 A2 | 6/2005 |
| JP | 2005662 A2 | 1/2006 |
| JP | 26254358 A2 | 9/2006 |
| WO | WO0133497 A1 | 5/2001 |
| WO | WO02052835 A2 | 7/2002 |
| WO | WO03028377 A1 | 4/2003 |
| WO | WO2006045441 A1 | 5/2006 |
| WO | WO2007095477 A2 | 8/2007 |
| WO | WO2007095483 A2 | 8/2007 |
| WO | WO2007095553 A2 | 8/2007 |
| WO | WO2007/142621 A1 | 12/2007 |
| WO | WO2007142621 A1 | 12/2007 |
| WO | WO2008015586 A2 | 2/2008 |
| WO | WO2008017343 A1 | 2/2008 |
| WO | WO2008018887 A1 | 2/2008 |
| WO | WO2008023280 A2 | 2/2008 |
| WO | WO2008104549 A2 | 9/2008 |
| WO | WO2008/157792 A1 | 12/2008 |

OTHER PUBLICATIONS

U.S. Appl. No. 12/140,532, filed Jun. 17, 2008, Office Action, Sep. 9, 2013.

U.S. Appl. No. 12/140,827, filed Jun. 17, 2008, Final Office Action, Mar. 28, 2012.

U.S. Appl. No. 12/140,125, filed Jun. 16, 2008, Final Office Action, Dec. 21, 2011.

U.S. Appl. No. 12/140,827, filed Jun. 17, 2008, Office Action, Aug. 4, 2011.

U.S. Appl. No. 12/140,950, filed Jun. 17, 2008, Office Action, Dec. 29, 2011.

U.S. Appl. No. 12/141,134, filed Jun. 19, 2008, Office Action, Feb. 24, 2012.

U.S. Appl. No. 12/140,125, filed Jun. 16, 2008, Office Action, Apr. 5, 2011.

U.S. Appl. No. 12/140,048, filed Jun. 16, 2008, Office Action, Jun. 24, 2011.

U.S. Appl. No. 12/141,042, filed Jun. 17, 2008, Office Action, May 15, 2009.

U.S. Appl. No. 12/947,731, filed Nov. 11, 2010, Notice of Allowance, Apr. 19, 2011.

U.S. Appl. No. 13/113,648, filed May 23, 2011, Notice of Allowance, Jan. 9, 2012.

U.S. Appl. No. 12/141,042, filed Jun. 17, 2008, Notice of Allowance, Sep. 23, 2009.

U.S. Appl. No. 12/140,048, filed Jun. 16, 2008, Final Office Action, Dec. 6, 2011.

U.S. Appl. No. 11/765,899, filed Jun. 20, 2007, Final Office Action, Oct. 13, 2010.

U.S. Appl. No. 12/142,773, filed Jun. 20, 2008, Office Action, Jun. 27, 2011.

U.S. Appl. No. 12/479,593, filed Jun. 5, 2009, Office Action, Jun. 3, 2010.

U.S. Appl. No. 12/947,731, filed Nov. 16, 2010, Notice of Allowance, Apr. 19, 2011.

U.S. Appl. No. 12/479,593, filed Jun. 5, 2009, Notice of Allowance, Jan. 3, 2011.

U.S. Appl. No. 11/554,539, filed Oct. 30, 2006, Notice of Allowance, Oct. 15, 2010.

U.S. Appl. No. 12/262,061, filed Oct. 30, 2006, Notice of Allowance, Oct. 22, 2010.

PCT International Preliminary Report on Patentability Chapter I (IB/373), for PCT Application No. PCT/US2008/067746, report dated Dec. 22, 2009, 6 pages.

PCT Written Opinion of the International Search Authority, for PCT Application No. PCT/US2008/067746, report dated Sep. 10, 2008, 5 pages.

Swain et al (1995) "Defocus-based image segmentation." Proc 1995 Int'l Conf. on Acoustics, Speech, and Signal Processing, vol. 4 pp. 2403-2406.

Modesto Castrillon-Santana, Javier Lorenzo-Navarro, Oscar Deniz-Suárez, Jose Isern-González and Antonio Falcón-Martel, Multiple face detection at different resolutions for perceptual user interfaces, Lecture Notes in Computer Science, [Online] vol. 3522, May 13,

(56) References Cited

OTHER PUBLICATIONS 2005 (May 13, 2005), pp. 445-452, XP002562025 Retrieved from the Internet: URL:http://www.springerlink.com/content/m5umr32q9l673xhf/> [retrieved on Jan. 6, 2010].

Chang Huang, Haizhou Ai, Yuan Li, Shihong Lao, Learning Sparse Features in Granular Space for Multi-View Face Detection, Automatic Face and Gesture Recognition, 2006. FGR 2006. 7th International Conference on Southampton, UK Apr. 10-12, 2006, Piscataway, NJ, USA,IEEE, Apr. 10, 2006 (Apr. 10, 2006), pp. 401-407, XP010911641 ISBN: 978-0-7695-2503-7.

Extended European Search Report, dated Jan. 15, 2010, including, pursuant to Rule 62 EPC, the supplementary European Search Report (Art. 153(7) EPC) and the European search opinion, for European application No. 06802192.2, dated Jan. 7, 2010, 8 pages.

Kawato, Shinjiro; Tetsutani, Nobuji; Hosaka, Kenichi, Scale-adaptive face detection and tracking in real-time with SSR filters and Support Vector Machine IEICE Trans. on Information and Systems, [Online] vol. E88-D, No. 12, pp. 2857-2863, XP008116751 Retrieved from the Internet: URL:http://search.ieice.org/bin/summary.php?id=e88d122857&category=D&lang=E&year=2005&abst=&auth=1> [retrieved on Jan. 6, 2010].

PCT Notification of the Transmittal of the International Preliminary Report on Patentability, including the International Preliminary Report on Patentability (IPRP), Chapter II, for PCT Application PCT/EP2007/009763, dated Sep. 11, 2009, 8 pages.

Pham M-T, et al., Detection Caching for Faster Object Detection, Proc. IEEE Workshop on Modeling People and Human Interaction (PHI). Beijing. China. 2005. [Online] Oct. 15, 2005 (Oct. 15, 2005). pp. 1-8. XP002562026. Retrieved from the Internet: URL:http://web.mysites.ntu.edu.sg/astjcham/public/Shared20Documents/papers/phamcham-phi05-hdr.pdf>.

Aoki, Hiroyuki et al., "An Image Storage System Using Complex-Valued Associative Memories, Abstract printed from http://csdl.computer.org/comp/proceedings/icpr/2000/0750/02/07502626abs.htm", International Conference on Pattern Recognition (ICPR '00), 2000, vol. 2.

Batur et al., "Adaptive Active Appearance Models". IEEE Transactions on Image Processing, 2005, pp. 1707-1721, vol. 14—Issue 11.

Beraldin, J.A. et al., "Object Model Creation from Multiple Range Images: Acquisition, Calibration, Model Building and Verification. Abstract printed from http://csdl.computer.org/comp/proceedings/nrc/1997/7943/00/79430326abs.htm", International Conference on Recent Advances in 3-D Digital Imaging and Modeling, 1997.

Beymer, David, "Pose-Invariant face Recognition Using Real and Virtual Views, A.I. Technical Report No. 1574", Massachusetts Institute of Technology Artificial Intelligence Laboratory, 1996, pp. 1-176.

Bradski Gary et al., "Learning-Based Computer Vision with Intel's Open Source Computer Vision Library", Intel Technology, 2005, pp. 119-130, vol. 9—Issue 2.

Buenaposada, J., "Efficiently estimating 1-3,16 facial expression and illumination in appearance-based tracking, Retrieved from the Internet: http://www.bmva.ac.uk/bmvc/2006/ [retrieved on Sep. 1, 2008]", Proc. British machine vision conference, 2006.

Chang, T., "Texture Analysis and Classification with Tree-Structured Wavelet Transform", IEEE Transactions on Image Processing, 1993, pp. 429-441, vol. 2—Issue 4.

Cootes T. et al., "Modeling Facial Shape and Appearance, S. Li and K. K. Jain (Eds.): "Handbook of face recognition", XP002494037", 2005, Chapter 3, Springer.

Cootes, T.F. et al., "A comparative evaluation of active appearance model algorithms", Proc. 9th British Machine Vison Conference. British Machine Vision Association, 1998, pp. 680-689.

Cootes, T.F. et al., "On representing edge structure for model matching", Proc. IEEE Computer Vision and Pattern Recognition, 2001, pp. 1114-1119.

Corcoran, P. et al., "Automatic Indexing of Consumer Image Collections Using Person Recognition Techniques", Digest of Technical Papers. International Conference on Consumer Electronics, 2005, pp. 127-128.

Costache, G. et al., "In-Camera Person-Indexing of Digital Images", Digest of Technical Papers. International Conference on Consumer Electronics, 2006, pp. 339-340.

Crowley, J. et al., "Multi-modal tracking of faces for video communication, http://citeseer.ist.psu.edu/crowley97multimodal.html", In Comp Vision and Patent Recog., 1997.

Dalton, John. "Digital Cameras and Electronic Color Image Acquisition, Abstract printed from http://csdl.computer.org/comp/proceedings/compcon/1996/7414/00/74140431abs.htm", C0MPC0N Spring '96—41st IEEE International Conference. 1996.

Demirkir, C. et al., "Face detection using boosted tree classifier stages", Proceedings of the IEEE 12th Signal Processing and Communications Applications Conference, 2004, pp. 575-578.

Deng, Ya-Feng et al., "Fast and Robust face detection in video, http://rlinks2.dialog.com/NASApp/ChannelWEB/DialogProServlet?ChName=engineering", International Conference on Machine Learning and Cybernetics, 2005.

Donner, Rene et al., "Fast Active Appearance Model Search Using Canonical Correlation Analysis", IEEE Transactions on Pattern Analysis and Machine Intelligence, 2006. pp. 1690-1694, vol. 28—Issue 10.

Drimbarean, A.F. et al., "Image Processing Techniques to Detect and Filter Objectionable Images based on Skin Tone and Shape Recognition", International Conference on Consumer Electronics, 2001, pp. 278-279.

Edwards, G.J. et al., "Advances in active appearance models", International Conference on Computer Vision (ICCV'99), 1999, pp. 137-142.

Edwards, G.J. et al., "Learning to identify and track faces in image sequences, Automatic Face and Gesture Recognition", IEEE Comput. Soc, 1998, pp. 260-265.

Examination Report for European patent application No. 05792584.4, dated May 13, 2008, 8 pgs.

Feraud, R. et al., "A Fast and Accurate Face Detector Based on Neural Networks", IEEE Transactions on Pattern Analysis and Machine Intelligence, 2001, pp. 42-53, vol. 23—Issue 1.

Fernandez, Anna T. et al., "Synthetic Elevation Beamforming and Image Acquisition Capabilities Using an 8x 128 1.75D Array, Abstract Printed from http://www.ieee-uffc.org/archive/uffc/trans/toc/abs/03/t0310040.htm", The Technical Institute of Electrical and Electronics Engineers.

Froba, B. et al., "Face detection with the modified census transform", Proceedings of the Sixth IEEE International Conference on Automatic Face and Gesture Recognition, 2004, pp. 91-96.

Froba, B. et al., "Real time face detection, Kauai, Hawai Retrieved from the Internet:URL:http://www.embassi.de/publi/veroeffent/Froeba.pdf [retrieved on Oct. 23, 2007]", Dept. of Applied Electronics, Proceedings of lasted "Signal and Image Processing", 2002, pp. 1-6.

Garnaoui, H.H. et al., "Visual Masking and the Design of Magnetic Resonance Image Acquisition, Abstract printed from http://csdl.computer.org/comp/proccedings/icip/1995/7310/01/73100625abs.htm", International Conference on Image Processing, 1995, vol. 1.

Gaubatz, Matthew et al., "Automatic Red-Eye Detection and Correction", IEEE ICIP, Proceedings 2002 Intl Conference on Image Processing, 2002, pp. 1-804-1-807, vol. 2—Issue 3.

Gerbrands, J., "On the Relationships Between SVD, KLT, and PCA", Pattern Recognition, 1981, pp. 375-381, vol. 14, Nos. 1-6.

Goodall, C., "Procrustes Methods in the Statistical Analysis of Shape, Stable URL: http://www.jstor.org/stable/2345744", Journal of the Royal Statistical Society. Series B (Methodological), 1991, pp. 285-339, vol. 53—Issue 2. Blackwell Publishing for the Royal Statistical Society.

Hayashi, S. et al., "A Detection Technique for Degraded Face Images", Conference on Computer Vision and Pattern Recognition; 2006, pp. 1506 1512, vol. 2. IEEE Computer Society.

Heisele, B. et al., "Hierarchical Classification and Feature Reduction for Fast Face Detection with Support Vector Machines", Pattern Recognition, 2003, pp. 2007-2017, vol. 36—Issue 9, Elsevier.

(56) References Cited

OTHER PUBLICATIONS

Hou, Xinwen et al., "Direct Appearance Models", IEEE, 2001, pp. I-828-I-833.

Hu, Wen-Chen et al., "A Line String Image Representation for Image Storage and Retrieval, Abstract printed from http://csdl.computer.oro/comp/proceedings/icmcs/ 1997/7819/00/78190434abs.htm", International Conference on Multimedia Computing and systems, 1997.

Huang, J. et al., "Detection of human faces using decision trees, http://doLieeecomputersociety.org/10.1109/Recognition", 2nd International Conference on Automatic Face and Gesture Recognition (FG '96), IEEE Xplore, 2001, p. 248.

Huber, Reinhold et al., "Adaptive Aperture Control for Image Acquisition, Abstract printed from http://csdl.computer.org/comp/proceedings/wacv/2002/1858/00/18580320abs.htm.", Sixth IEEE Workshop on Applications of Computer Vision, 2002.

Isukapalli, Ramana et al., "Learning a dynamic classification method to detect faces and identify facial expression, http://rlinks2.dialog.com/NASApp/ChannelWEB/DialogProServlet?ChName=engineering", International Workshop on Analysis and Modelling of Faces and Gestures, AMFG 2005, in Lecture Notes in Computer Science, 2005, vol. 3723.

Jebara, Tony S. et al., "3D Pose Estimation and Normalization for Face Recognition. A Thesis submitted to the Faculty of Graduate Studies and Research in Partial fulfillment of the requirements of the degree of Bachelor of Engineering", Department of Electrical Engineering, 1996, pp. 1-121, McGill University.

Jones, M et al., "Fast multi-view face detection. http://www.merl.com/papers/docs/TR2003-96.pdf", Mitsubishi Electric Research Lab, 2003, 10 pgs.

Kang, Sing Bing et al., "A Multibaseline Stereo System with Active Illumination and Real-Time Image Acquisition, Abstract printed from http://csdl.computer.org/comp/proccedings/iccv/1995/7042/00/70420088abs.htm", Fifth International Conference on Computer Vision, 1995.

Kita, Nobuyuki et al., "Archiving Technology for Plant Inspection Images Captured by Mobile Active Cameras 4D Visible Memory, Abstract printed from http://csdl.computer.org/comp/proccedings/3dpvt/2002/1521/00/15210208abs.htm", 1st Intl Symposium on 3D Data Processing Visualization and Transmission (3DPVT '02), 2002.

Kouzani, A.Z., "Illumination-Effects Compensation in Facial Images Systems", Man and Cybernetics, IEEE SMC '99 Conference Proceedings, 1999, pp. VI-840-VI-844, vol. 6.

Kozubek, Michal et al., "Automated Multi-view 3D Image Acquisition in Human Genome Research, Abstract printed from http://csdl.computer.org/comp/proceedings/3pvt/2002/1521/00/15210091absium". 1st International Symposium on 3D Data Processing Visualization and Transmission (3DPVT '02). 2002.

Krishnan, Arun, "Panoramic Image Acquisition, Abstract printed from http://csdl.computer.org/comp/proceedings/cvpr/1996/7258/00/72580379abs.htm", Conference on Computer Vision and Pattern Recognition (CVPR '96), 1996.

Lai, J.H. et al., "Face recognition using holistic Fourier in variant features, http://digitalimaging.inf.brad.ac.uk/publication/pr34-1.pdf.", Pattern Recognition, 2001, pp. 95-109, vol. 34.

Lei et al., "A CBIR Method Based on Color-Spatial Feature", IEEE 10th Ann. Int. Conf., 1999.

Lienhart, R. et al., "A Detector Tree of Boosted Classifiers for Real-Time Object Detection and Tracking", Proceedings of the 2003 International Conference on Multimedia and Expo, 2003, pp. 277-280, vol. 1, IEEE Computer Society.

Matthews, I. et al., "Active appearance models revisited, Retrieved from http://www.d.cmu.edu/pub_files/pub4/matthews_iain_2004_2/matthews_iain_2004_2.pdf", International Journal of Computer Vision, 2004, pp. 135-164, vol. 60—Issue 2.

Mekuz, N. et al., "Adaptive Step Size Window Matching for Detection", Proceedings of the 18th International Conference on Pattern Recognition, 2006, pp. 259-262, vol. 2.

Mitra, S. et al., "Gaussian Mixture Models Based on the Frequency Spectra for Human Identification and Illumination Classification", Proceedings of the Fourth IEEE Workshop on Automatic Identification Advanced Technologies. 2005, pp. 245-250.

Moghaddam, Baback et al., "Bayesian Modeling of Facial Similarity, http://citeseer.ist.psu.edu/article/moghaddam98bayesian.html", Advances in Neural Information Processing Systems (NIPS 1998), 1998, pp. 910-916.

Nayak et al., "Automatic illumination correction for scene enhancement and objection tracking, XP005600656, ISSN: 0262- 8856". Image and Vision Computing, 2006, pp. 949-959. vol. 24—Issue 9.

Nordstrom, M.M. et al., "The IMM face database an annotated dataset 01240 face images, http://www2.imm.dtu.dk/pubdb/p.php?3160", Informatics and Mathematical Modelling, 2004.

Ohta, Y-I et al., "Color Information for Region Segmentation, XP008026458", Computer Graphics and Image Processing, 1980, pp. 222-241, vol. 13—Issue 3, Academic Press.

Park, Daechul et al., "Lenticular Stereoscopic Imaging and Displaying Techniques with no Special Glasses, Abstract printed from http://esdl.computer.org/comp/proceedings/icip/1995/7310/03/73103137abs.htm", International Conference on Image Processing, 1995, vol. 3.

PCT International Preliminary Report on Patentability (IPRP) for PCT Application PCT/EP2005/011010, dated Jan. 23, 2007, 18 pages.

PCT International Search Report and Written Opinion of the International Searching Authority, or the Declaration, for PCT Application No. PCT/US2006/021393, filed Jun. 2, 2006, paper dated Mar. 29, 2007, 12 pgs.

PCT International Search Report and Written Opinion of the International Searching Authority, or the Declaration, for PCT Application No. PCT/US2006/060392, filed Oct. 31, 2006, paper dated Sep. 19, 2008, 9 pgs.

PCT Notification of Transmittal of the International Search Report and the Written Opinion of the International Searching Authority, or the Declaration for PCT Application No. PCT/US2006/032959, dated Mar. 6, 2007, 8 pages.

PCT Notification of Transmittal of the International Search Report and the Written Opinion of the International Searching Authority, or the Declaration for PCT/EP/2005/011010, dated Jan. 23, 2006, 14 pages.

PCT Notification of Transmittal of the International Search Report and the Written Opinion of the International Searching Authority, or the Declaration, for PCT Application No. PCT/EP2007/005330, filed Jun. 18, 2007, paper dated Sep. 28, 2007, 11 pages.

PCT Notification of Transmittal of the International Search Report and the Written Opinion of the International Searching Authority, or the Declaration, for PCT Application No. PCT/EP2007/006540, Nov. 8, 2007, 11 pgs.

PCT Notification of Transmittal of the International Search Repon and the Written Opinion of the International Searching Authority, or the Declaration, for PCT Application No. PCT/EP2007/009763, paper dated Jun. 17, 2008, 11 pages.

PCT Notification of Transmittal of the International Search Report and the Written Opinion of the International Searching Authority, or the Declaration, for PCT Application No. PCT/EP2008/001510, dated May 29, 2008, 13 pages.

PCT Notification of Transmittal of the International Search Report and the Written Opinion of the International Searching Authority, or the Declaration, for PCT Application No. PCT/EP2008/052329, dated Sep. 15, 2008, 12 pages.

PCT Notification of Transmittal of the International Search Report and the Written Opinion of the International Searching Authority, or the Declaration, for PCT Application No. PCT/IB2007/003724, dated Aug. 28, 2008, 9 pages.

PCT Notification of Transmittal of the International Search Report and the Written Opinion of the International Searching Authority, or the Declaration, for PCT Application No. PCT/US2008/067746, dated Sep. 10, 2008, 8 pages.

Romdhani, S. et al., "Face Identification by Fitting a 3D Morphable Model using linear Shape and Texture Error Functions, XP003018283", European Conf on Computer Vision, 2002, pp. 1-15.

(56) References Cited

OTHER PUBLICATIONS

Roux, Sebastien et al., "Embedded Convolutional Face Finder,Multimedia and Expo, XP031032828, ISBN: 978-1-4244-0366-0", IEEE International Conference on IEEE, 2006, pp. 285-288.

Rowley, Henry A. et al., "Neural network-based face detection, ISSN: 0162-8828, DOI: 10.1109/34.655647, Posted online: Aug. 6, 2002. http://ieeexplore.ieee.org/xpl/freeabs_all.jsp?arnumber-655647andisnumber-14286", IEEE Transactions on Pattern Analysis and Machine Intelligence. 1998. pp. 23-38, p. 92, vol. 20—Issue 1.

Ryu, Hanjin et al., "Coarse-to-Fine Classification for Image-Based Face Detection", Image and video retrieval lecture notes in Computer Science, 2006, pp. 291-299, vol. 4071, Springer-Verlag.

Sahba, F. et al., "Filter Fusion for Image Enhancement Using Reinforcement Learning, XP010654204, ISBN: 0-7803-7781-8", Canadian Conference on Electrical and computer Engineering, 2003, pp. 847-850, vol. 3.

Shand, M., "Flexible Image Acquisition Using Reconfigurable Hardware, Abstract printed from http://csdl.computer.org/comp/proceedings/fccm/1995/7086/00/70860125abs.htm", IEEE Symposium of FPGA's for Custom Computing Machines (FCCM '95), 1995.

Sharma, G. et al., "Digital color imaging, [Online]. Available: citeseer.ist.psu.edu/sharma97digital.html", IEEE Transactions on Image Processing, 1997, pp. 901-932, vol. 6—Issue 7.

Shock, D. et al., "Comparison of Rural Remote Site Production of Digital Images Employing a film Digitizer or a Computed Radiography (CR) System, Abstract printed from http://csdl/computer.org/comp/proceedings/imac/1995/7560/00/75600071abs.htm", 4th International Conference on Image Management and Communication (IMAC '95), 1995.

Sim, T. et al., "The CMU Pose, Illumination, and Expression (PIE) Database of Human Faces Robotics Institute, Tech. Report, CMU-RI-TR-01-02", 2001, 18 pgs, Carnegie Mellon University.

Skocaj, Danijel, "Range Image Acquisition of Objects with Non-Uniform Albedo Using Structured Light Range Sensor, Abstract printed from http://csdl.computer.org/comp/proceedings/icpr/2000/0750/01/07501778abs.htm", International Conference on Pattern Recognition (ICPR '00), 2000, vol. 1.

Smeraldi, F. et al., "Facial feature detection by saccadic exploration of the Gabor decomposition, XP010586874", Image Prodessing, ICIP 98. Proceedings International Conference on Chicago, IL, USA, IEEE Comput. Soc, 1998, pp. 163-167, vol. 3.

Song, Hong et al., "Face detection and segmentation for video surveillance Language: Chinese. http://rlinks2.dialog.com/NASApp/ChannelWEB/DialogProServlet?ChName=engineering", Binggong Xuebao/Acta Armamentarii, 2006, pp. 252-257, vol. 27—Issue 2.

Stegmann, M.B. et al., "A flexible appearance modelling environment, Available: http://www2.imm.dtu.dk/pubdb/p.php?1918", IEEE Transactions on Medical Imaging, 2003, pp. 1319-1331, vol. 22—Issue 10.

Stegmann, M.B. et al., "Multi-band modelling of appearance, XP009104697", Image and Vision Computing, 2003, pp. 61-67, vol. 21—Issue I.

Stricker et al., "Similarity of color images", SPIE Proc. 1995, pp. 1-12, vol. 2420.

Sublett, J.W. et al., "Design and Implementation of a Digital Teleultrasound System for Real-Time Remote Diagnosis, Abstract printed from http://csdl.computer.org/comp/proceedings/cbms/1995/7117/00/71170292abs.htm", Eight Annual IEEE Symposium on Computer-Based Medical Systems (CBMS '95), 1995.

Tang, Yuan Y. et al., "Information Acquisition and Storage of Forms in Document Processing, Abstract printed from http://csdl.computer.org/comp/proceedings/icdar/1997/7898/00/78980170abs.htm", 4th International Conference Document Analysis and Recognition, 1997, vol. I and II.

Tjahyadi et al., "Application of the DCT Energy Histogram for Face Recognition", Proceedings of the 2nd Intl Conference on Information Technology for Application, 2004, pp. 305-310.

Tkalcic, M. et al., "Colour spaces perceptual, historical and applicational background, ISBN: 0-7803-7763-X", IEEE, EUROCON, 2003, pp. 304-308, vol. 1.

Turk, Matthew et al., "Eigenfaces for Recognition", Journal of Cognitive Neuroscience. 1991, 17 pgs, vol. 3—Issue 1.

Turkan, Mehmet et al., "Human face detection in video using edge projections, Conference: Visual Information Processing XV, http://rlinks2.dialog.com/NASApp/ChannelWEB/DialogProServlet?ChName=engineering", Proceedings of SPIE—The International Society for Optical Engineering Visual Information Processing, 2006, vol. 6246.

Twins Crack Face Recognition Puzzle, Internet article http://www.cnn.com/2003/TECH/ptech/03/10/israel.twins.reut/ index.html, printed Mar. 10, 2003, 3 pages.

U.S. Appl. No. 11/554,539, filed Oct. 30, 2006, entitled Digital Image Processing Using Face Detection and Skin Tone Information.

Viola, P. et al., "Robust Real-Time Face Detection", International Journal of Computer Vision, 2004, pp. 137-154, vol. 57—Issue 2, Kluwer Academic Publishers.

Vuylsteke, P. et al., "Range Image Acquisition with a Single Binary-Encoded Light Pattern, abstract printed from http://csdl.computer.org/comp/trans/tp/I990/02/i0148abs.htm", IEEE Transactions on Pattern Analysis and Machine Intelligence, 1990, 1 page.

Wan, S.J. et al., "Variance-based color image quantization for frame buffer display", S. K. M. Wong Color Research and Application, 1990, pp. 52-58, vol. 15—Issue 1.

Xin He et al., "Real-Time Human Face Detection in Color Image", International Conference on Machine Learning and Cybernetics, 2003, pp. 2915-2920, vol. 5.

Yang, Ming Hsuan et al., "Face Detection and Gesture Recognition for Human-Computer Interaction", 2004, p. 33-p. 35, Kluwer Academic.

Yang, Ming-Hsuan et al., "Detecting Faces in Images: A Survey. ISSN:0162-8828, http://portal.acm.org/citation.cfm?id=505621andcoll=GUIDEanddl=GUIDEandCFID=680-9268andCFTOKEN=82843223.", IEEE Transactions on Pattern Analysis and Machine Intelligence archive, 2002, pp. 34-58, vol. 24—Issue 1, IEEE Computer Society.

Zhang, Jun et al., "Face Recognition: Eigenface, Elastic Matching, and Neural Nets", Proceedings of the IEEE, 1997, pp. 1423-1435, vol. 85—Issue 9.

Zhao, W. et al., "Face recognition: A literature survey, ISSN: 0360-0300, http://portal.acm.org/citation.cfm?id=954342andcoll=GUIDEanddl=GUIDEandCFID=680-9268andCFTOKEN=82843223.", ACM Computing Surveys (CSUR) archive, 2003, pp. 399-458, vol. 35—Issue 4, ACM Press.

Zhu Qiang et al., "Fast Human Detection Using a Cascade of Histograms of Oriented Gradients", Proceedings of the 2006 IEEE Computer Society Conference on Computer Vision and Pattern Recognition, 2006, pp. 1491-1498, IEEE Computer Society.

Gangaputra, Sachin et al., "A United Stochatic Model for Detecting and Tracking Faces", http://portal.acm.acm.org/citation.cfm?id=1068818andcoll=Guideandddl=guideandcf-id6809268andcftoken=82843223, Proceedings of the 2nd Canadian conference on computer and robot vision (CRV 2005), 2005, pp. 306-313, vol. 00 IEEE, Computer Society.

Soriano, M., et al., "Making Saturated Facial Images Useful Again", XP002325961, ISSN: 0277786X, Proceedings of the SPIE, dated 1999, pp. 113-121, vol. 3826.

Viola, P. et al., Rapid Object Detection Using a Boosted Cascade of Simple Features Proceedings of the 2001 IEEE Computer Society Conference on Computer Vision and Pattern Recognition, dated 2001, pp. 1-511-1-158, vol. 1.

Matkovic, Kresimir et al., The 3D Wunderkammer and Indexing by Placing Approach to the Image Storage and Retrieval, Abstract Printed from http://csdl.computer.org/comp/proceedings/tocg/2003/1942/00/19420034abs.hum, Theory and Practice of Computer Graphics, dated 2003, University of Beimingham.

* cited by examiner

IMAGE CAPTURE DEVICE WITH CONTEMPORANEOUS IMAGE CORRECTION MECHANISM

This application claims the benefit under 35 U.S.C. §120 as a continuation of application Ser. No. 12/140,532, filed Jun. 17, 2008, which claims the benefit under 35 U.S.C. 119(e) of provisional application 60/945,558, filed Jun. 21, 2007, the entire contents of which are hereby incorporated by reference for all purposes as if fully set forth herein. The applicants hereby rescind any disclaimer of claim scope in the parent applications or the prosecution history thereof and advise the USPTO that the claims in this application may be broader than any claim in the parent applications.

This application is related to U.S. patent application Ser. No. 11/573,713, filed Feb. 14, 2007, which claims priority to U.S. provisional patent application No. 60/773,714, filed Feb. 14, 2006, and to PCT application no. PCT/EP2006/008229, filed Aug. 15, 2006 (FN-119).

This application also is related to Ser. No. 11/024,046, filed Dec. 27, 2004, which is a CIP of U.S. patent application Ser. No. 10/608,772, filed Jun. 26, 2003 (fn-102e-cip).

This application also is related to PCT/US2006/021393, filed Jun. 2, 2006, which is a CIP of Ser. No. 10/608,784, filed Jun. 26, 2003 (fn-102f-cip-pct)

This application also is a CIP of U.S. application Ser. No. 10/985,657, filed Nov. 10, 2004 (FN-109A).

This application also is related to U.S. application Ser. No. 11/462,035, filed Aug. 2, 2006, which is a CIP of U.S. application Ser. No. 11/282,954, filed Nov. 18, 2005 (FN-121-CIP).

This application also is related to Ser. No. 11/233,513, filed Sep. 21, 2005, which is a CIP of U.S. application Ser. No. 11/182,718, filed Jul. 15, 2005, which is a CIP of U.S. application Ser. No. 11/123,971, filed May 6, 2005 and which is a CIP of U.S. application Ser. No. 10/976,366, filed Oct. 28, 2004 (FN-106-CIP-2).

This application also is related to U.S. patent application Ser. No. 11/460,218, filed Jul. 26, 2006, which claims priority to U.S. provisional patent application Ser. No. 60/776,338, filed Feb. 24, 2006 (FN-149a).

This application also is related to U.S. patent application Ser. No. 12/063,089, filed Feb. 6, 2008, which is a CIP of U.S. Ser. No. 11/766,674, filed Jun. 21, 2007, which is a CIP of U.S. Ser. No. 11/753,397, which is a CIP of U.S. Ser. No. 11/765,212, filed Aug. 11, 2006, now U.S. Pat. No. 7,315,631 (FN-143-CIP-3).

This application also is related to U.S. patent application Ser. No. 11/674,650, filed Feb. 13, 2007, which claims priority to U.S. provisional patent application Ser. No. 60/773,714, filed Feb. 14, 2006 (FN-144).

This application is related to U.S. Ser. No. 11/836,744, filed Aug. 9 2007, which claims priority to U.S. provisional patent application Ser. No. 60/821,956, filed Aug. 9, 2006 (FN-178A).

This application is related to a family of applications filed contemporaneously by the same inventors, including an application entitled DIGITAL IMAGE ENHANCEMENT WITH REFERENCE IMAGES, and another entitled METHOD OF GATHERING VISUAL META DATA USING A REFERENCE IMAGE, and another entitled IMAGE CAPTURE DEVICE WITH CONPEMPORANEOUS REFERENCE IMAGE CAPTURE MECHANISM, and another entitled FOREGROUND/BACKGROUND SEPARATION USING REFERENCE IMAGES, and another entitled Modification of Post-Viewing Parameters for Digital Images Using Image Region or Feature Information and another entitled REAL-TIME FACE TRACKING WITH REFERENCE IMAGES and another entitled METHOD AND APPARATUS FOR RED-EYE DETECTION USING PREVIEW OR OTHER REFERENCE IMAGES.

All of these priority and related applications, and all references cited below, are hereby incorporated by reference.

FIELD OF THE INVENTION

The invention relates to enhancement of digital image processing in a portable image capture device by use supplementary meta data from reference images.

BACKGROUND

It is recognized in the present invention that reference images of various types can be used advantageously in processing and enhancing digital images, particularly when efficiency is desired and/or when various defects tend to be present in the images as originally-acquired. In some cases, existing techniques can be improved and in other cases, new techniques are made available.

FOREGROUND/BACKGROUND SEPARATION

For some applications the ability to provide foreground/background separation in an image is useful. In US published application 2006/0039690, separation based on an analysis of a flash and non-flash version of an image is discussed. However, there are situations where flash and non-flash versions of an image may not provide sufficient discrimination, e.g. in bright sunlight.

Depth from de-focus is an image processing technique which creates a depth map from two or more images with different focal lengths. A summary of this technique can be found at: http://homepages.inf.ed.ac.uk/rbf/CVonline/LOCAL_COPIES/FAVARO1/dfdtutorial.html. Favaro is based on a statistical analysis of radiance of two or more images—each out of focus—to determine depth of features in an image. Favaro is based on knowing that blurring of a pixel corresponds with a given Gaussian convolution kernel and so applying an inverse convolution indicates the extent of defocus of a pixel and this in turn can be used to construct a depth map. Favaro involves a dedicated approach to depth calculation once images have been acquired in that a separate radiance map is created for each image used in depth calculations. This represents a substantial additional processing overhead compared to the existing image acquisition process.

US published application 2003/0052991 discloses for each of a series of images taken at different focus settings, building a contrast map for each pixel based on a product of the difference in pixel brightness surrounding a pixel. The greater the product of brightness differences, the more likely a pixel is considered to be in focus. The image with the greatest contrast levels for a pixel is taken to indicate the distance of the pixel from the viewfinder. This enables the camera to build a depth map for a scene. The camera application then implements a simulated fill flash based on the distance information. Here, the contrast map is specifically built representing substantial additional processing overhead over the existing image acquisition process.

US published application 2004/0076335 to Epson describes a method for low depth of field image segmentation. The Epson technique involves some knowledge that sharply focused regions contain high frequency components. US published application 2003/0219172 to Philips discloses calculating the sharpness of a single image according to the Kurtosis (shape of distribution) of its Discrete Cosine Transform (DCT) coefficients. US published application 2004/0120598 to Xiao-Fan Feng discloses using DCT blocks of a single image to detect blur within the image. The Epson, Philips and Feng techniques each involve an analysis of only a single image, and do not provide reliable distinctions between foreground and background regions of an image. US published application 2003/0091225 describes a creation of a depth map from two "stereo" images. It is desired to have an improved method of distinguishing between foreground and background regions of a digital image.

Image Classifiers for Scene Analysis

Even though human beings have little trouble interpreting images semantically, the challenge to do so using artificial intelligence is not that straight forward. A few methods are available to those familiar in the art of image and pattern recognition that separate images using a learning-based descriptor space. Such methods involve a training set and maximization methods of likelihood. Examples of such methods includes the Adatron (1989) method as described by Analauf et. al. (see citation below). Other work includes scene analysis such as the work by Le Saux Bertrand et al. (2004), citation below.

Faces in Digital Images

Face tracking in digital image acquisition devices may be described as involving the marking or identification of human faces in a series of images such as a video stream or a camera preview. Face tracking can be used to indicate to a photographer the locations of faces in an image, thereby improving acquisition parameters, or for allowing post processing of the images based on some knowledge of the locations of the faces.

In general, a face tracking system may employ two principle modules: (i) a face detection module for locating of new candidate face regions in an acquired image or a sequence of images; and (ii) a face tracking module for confirming face regions.

A fast-face detection algorithm is disclosed in US published application 2002/0102024 to Viola-Jones. In brief, Viola-Jones involves deriving an integral image from an acquired image, which is usually an image frame in a video stream. Each element of the integral image is calculated as the sum of intensities of all points above and to the left of the point in the image. The total intensity of any sub-window in an image can then be derived by subtracting an integral image value for the top left point of the sub-window from the integral image value for the bottom right point of the sub-window. Intensities for adjacent sub-windows are compared using particular combinations of integral image values from points of the sub-windows.

According to Viola-Jones, a chain (cascade) of 32 classifiers based on rectangular (and increasingly refined) Haar features may be used with the integral image by applying the classifiers to a sub-window within the integral image. For a complete analysis of an acquired image, this sub-window is shifted incrementally across the integral image until the entire image has been covered.

In addition to moving the sub-window across the entire integral image, the sub window is also be scaled up or down to cover a range of face sizes. In Viola-Jones, a scaling factor of 1.25 is used and typically, a range of about 10-12 different scales is used to cover possible face sizes in an XVGA size image.

The resolution of the integral image may be determined by the smallest sized classifier sub-window, i.e. the smallest size face to be detected, as larger sized sub-windows can use intermediate points within the integral image for their calculations.

There are a number of variants of the original Viola-Jones algorithm described in the literature. These generally employ rectangular, Haar feature classifiers and use the integral image techniques of Viola-Jones.

Even though Viola-Jones is significantly faster than other face detectors, it still involves significant computation, e.g., on a Pentium-class computer. In a resource-restricted embedded system, such as hand-held image acquisition devices, (e.g., including digital cameras, hand-held computers or cellular phones equipped with a cameras), it is not generally practical to run such a computationally-intensive face detector at real-time frame rates for video. From tests within a typical digital camera, it is only possible to achieve complete coverage of all 10-12 sub-window scales with a 3-4 classifier cascade. This allows some level of initial face detection to be achieved, but with undesirably high false positive rates.

Viola and Jones in their paper entitled "Robust Real Time Object Detection" as presented in the $2^{nd}$ international workshop on Statistical and Computational theories of Vision, in Vancouver, Canada, Jul. 31, 2001, describe a visual object detection framework that is capable of processing images extremely rapidly while achieving high detection rates. The paper demonstrates a framework for the task of face detection. The described technique is based on a learning algorithm where a small number of critical visual features yield a set of classifiers.

In US published application 2005/0147278 by Rui et al., a system is described for automatic detection and tracking of multiple individuals using multiple cues. Rui et al. disclose using Viola-Jones as a fast face detector. However, in order to avoid the processing overhead of Viola-Jones, Rui et al. instead disclose using an auto-initialization module which uses a combination of motion, audio and fast face detection to detect new faces in the frame of a video sequence. The remainder of the system employs well-known face tracking methods to follow existing or newly discovered candidate face regions from frame to frame. It is also noted that the Rui et al. technique involves some video frames being dropped in order to run a complete face detection process.

Yang et al., in IEEE Transactions on Pattern Analysis and Machine Intelligence, Vol. 24, No. 1, pages 34-58 (January 2002), have provided a useful and comprehensive review of face detection techniques. These authors discuss various methods of face detection which may be divided into four main categories: (i) knowledge-based methods; (ii) feature-invariant approaches, including the identification of facial features, texture and skin color; (iii) template matching methods, both fixed and deformable and (iv) appearance-based methods, including eigenface techniques, statistical distribution-based methods and neural network approaches. They also discuss a number of main applications for face detection technology. It is recognized in the present invention that none of these references describe detection and knowledge of faces in images to create and/or use tools for the enhancement and/or correction of images in accordance with the present invention and the several preferred and alternative embodiment set forth below, and particularly to using reference images, such as preview or postview images these enhancements and/or corrections.

Baluja in 1997 (see citations below) described methods of extending upright, frontal templates based on a face detection system to efficiently handle in-plane rotations, thus achieving a rotation invariant face detection system.

It is recognized that human faces are perhaps the most photographed subject matter for the amateur and professional photographer. Thus it is possible to assume a high starting percentage for algorithms based on the existence of faces in them.

Orientation

The camera is usually held horizontally or vertically, counter-clockwise or clockwise in relation to the horizontal position when the picture is taken, creating what is referred to as landscape mode or portrait mode, respectively. Thus most images are taken in either one of the three orientations, namely landscape, clockwise portrait and counter-clockwise portrait. When viewing images, it is preferable to determine ahead of time the orientation of the camera at acquisition, thus eliminating a step of rotating the image and automatically orienting the image. The system may try to determine if the image was shot horizontally, which is also referred to as landscape format, where the width is larger than the height of an image, or vertically, also referred to as portrait mode, where the height of the image is larger than the width.

Techniques may be used to determine an orientation of an image. Primarily these techniques include either recording the camera orientation at an acquisition time using an in-camera mechanical indicator or attempting to analyze image content post-acquisition. In-camera methods, although providing precision, use additional hardware and sometimes movable hardware components which can increase the price of the camera and add a potential maintenance challenge. However, post-acquisition analysis may not generally provide sufficient precision. Knowledge of location, size and orientation of faces in a photograph, a computerized system can offer powerful automatic tools to enhance and correct such images or to provide options for enhancing and correcting images.

Face Recognition as a Function of Orientation

The human visual system is very sensitive to the orientation of faces. As a matter of fact, the way the human mind stores faces is different for upright and inverted faces, as described in Endo in 1982 (see citation below). In particular, recognition of inverted faces is known to be a difficult perceptual task. While the human visual system performs well in recognizing different faces, performing the same task with inverted faces is significantly worse. Such results were illustrated for example by Moses in 1994 (see citation below), where face memory and face recognition is determined to be highly orientation dependent. A detailed review of face recognition of inverted faces was made available by Valentine in 1988 (see citation below).

It is therefore only natural that artificial intelligence detection algorithms based on face-related classifiers may have the same features of being orientation-variant.

Cameras are becoming strong computation tools. In particular, FotoNation Vision, Inc., assignee of the present application, has developed many advantageous face detection tools. Some of these are described at U.S. patent applications Ser. Nos. 10/608,776, 10/608,810, 10/764,339, 10/919,226, 11/182,718, and 11/027,001, which are hereby incorporated by reference.

It is desired to have a smart system for disqualifying unsatisfactory images, particularly of faces, and/or that alerts a photographer to take another picture due to poor quality of a previous picture. It is also desired to do so without using a trigger to take a picture, nor waiting for an event that may or may not happen (e.g. a smile). U.S. Pat. No. 6,301,440 discloses adjusting image capture parameters based on analysis of temporary images, and awaiting taking a picture until everyone in the temporary images is smiling. The camera must await a certain event that may or may not ever happen. It is many times not acceptable to make people wait for the camera to decide that a scene is optimal before taking a picture, and there is no description in the '440 patent that would alleviate such dilemma. The '440 patent also provides no guidance as to how to detect or determine certain features within a scene. There are also security cameras that take pictures when a subject enters the view of the camera. However, these generally only detect motion or abrupt changes in what is generally a stagnant scene.

Correction of Red-Eye Defects

Redeye is the appearance of an unnatural reddish coloration of the pupils of a person appearing in an image captured by a camera with flash illumination. Red-eye is caused by light from the flash reflecting off blood vessels in a person's retina and returning to the camera.

A large number of image processing techniques have been proposed to detect and correct redeye in color images. In general, these techniques may be characterized as either semi-automatic or automatic. Semi-automatic red-eye detection techniques rely on human input. For example, in some semi-automatic red-eye reduction systems, a user manually identifies to the system the areas of an image containing red-eye before the defects can be corrected.

An automatic red-eye reduction system may rely on a preliminary detection of any faces in an image before red-eye areas are detected. One automatic approach may involve detecting faces in an image and, subsequently, detecting eyes within each detected face. After the eyes are located, red-eye is identified based on shape, coloration, and/or brightness of image areas corresponding to the detected eye locations. In general, face detection-based automatic red-eye reduction techniques have high computation and memory resource requirements. In addition, most of the face detection algorithms are only able to detect faces that are oriented in an upright frontal view. These approaches generally do not detect faces that are rotated in-plane or out-of-plane with respect to the image plane.

U.S. Pat. No. 6,407,777, having inventor DeLuca and assignee Fotonation, discloses in-camera detection and correction of redeye pixels in an acquired digital image, while US published patent application 2002/0176623 to inventor Steinberg discloses automated real-time detection and correction of redeye defects optimized for handheld devices (see also U.S. application Ser. No. 10/919,226, filed Aug. 16, 2004, Ser. No. 10/772,092, filed Feb. 4, 2004, Ser. No. 10/773,092, filed Feb. 4, 2004, and Ser. No. 10/635,918, filed Aug. 5, 2003). US published patent applications 2005/0047655 and 2005/0047656 to Luo et al disclose techniques for detecting and correcting redeye in a digital image and in embedded systems, respectively.

Within an image acquisition subsystem such as is embodied in typical digital cameras, a peak computing load and resource requirements occur around the time of image acquisition. Upon receiving an image acquisition request from the user the main embedded processing system refines the image focus and exposure to achieve an optimal main acquired image. This image, in turn, is off-loaded from the main optical sensor of the camera and subjected to further image processing to convert it from its raw format (e.g. Bayer) to a conventional color space such as RGB or YCC. Finally, the acquired image is compressed prior to saving it on a removable storage medium such as a compact flash or multimedia card.

The time taken by the camera to recover from the acquisition of a first image and reinitialize itself to capture a second image is referred to as the "click-to-click" time. This parameter is used in the comparison and marketing of modern digital cameras. It is desired for manufacturers to minimize this "click-to-click" time. Thus, it is desired that any additional image processing, such as redeye filtering, which is to be added to the main image acquisition chain should be highly optimized for speed of execution in order to minimize its impact on the click-to-click time of the main system. Such a redeye filter typically compromises its overall performance in terms of accuracy of detection of redeye defects and quality of image correction.

An alternative would be to wait until after the main image has been acquired and perform the redeye filtering at a later time when the camera may execute the filter as a background process, or to perform the redeye filtering off-camera on a desktop PC or printer. There can be drawbacks to this alternative approach, though. First, images are displayed on the acquiring device, immediately after acquisition, with uncorrected redeye defects. Second, when images are accessed in playback mode, there is a further delay while images are post-processed before an image can be displayed. Both drawbacks would create a negative impression on end users.

Further, as most digital cameras store images using lossy compression techniques there can be additional disadvantages with respect to image quality as images are decompressed and recompressed in order to perform redeye detection and correction processes in playback or background modes. Such loss of image quality may not become apparent until later when a user wishes to print an image and it is too late to reverse the process.

If redeye processing is delayed until the images are loaded onto another device, such as a desktop PC or printer, there can be further disadvantages. First, meta-data relating to the acquiring device and its state at the time the image was acquired may not be available to the redeye filter process. Second, this post-processing device performs redeye filtering on the entire image; so that for an embedded device such as a printer that may be relatively constrained in terms of CPU cycles and processing resources for its primary post-processing activity, it would be desirable to optimize the performance of the full redeye filter. It is generally desired to optimize the detection of red-eye defects in digital images for embedded image acquisition and processing systems.

Most algorithms that involve image analysis and classification, are statistical in nature. It is therefore desired to develop tools which will improve the probability of successful detection, while reducing the probability of false detection, while maintaining optimal execution, especially in limited computational devices such as in handheld or otherwise portable digital cameras. In many cases, knowledge of image characteristics such as image quality may affect the design parameters and decisions the detection and correction software uses. For example an image with sub-optimal exposure may deteriorate the overall detection of red-eye defects. It is desired to have a method of improving a success rate of efficient algorithms for detecting and reducing red-eye phenomenon by utilizing information, meta-data and/or image data from reference images.

Correction of Dust Defects

A map of defects caused by dust particles present in optical elements of a digital image acquisition device may be generated, and used in processing images captured by the device. For example, FIG. 1 of US published patent application no. 2003/0193604 to Robins illustrates a set of LEDs 38 or 38a disposed within camera lens elements 42, 44, 46 and, with the lens cover 36, 36a in place, lighting the LEDs and acquiring a calibration image from the camera sensor to detect contamination of the camera lens elements. In addition, published PCT application no. PCT/EP2004/010199, which is assigned to Fotonation and corresponding to one or more of seven sequentially numbered U.S. published applications nos. 2005/0068446 through '68452, and 2005/0078173 disclose building a statistical dust map based on information derived from one or more images acquired by a camera. While working with camera companies, there is a constant complaint about ORBS which are undesirable artifacts in images. Scientifically they are reflections of water or dust particles. As to correction, Kodak has worked on detection and correction of defective-colored eyes (thus, round shapes). For example, U.S. Pat. No. 7,035,462 describes an apparatus and method for processing digital images having eye color defects. The correction of artifacts is also approached at U.S. Pat. No. 7,031,548, which describes a method and apparatus for filtering noise from a digital image. U.S. Pat. No. 6,614,946 discloses a system and method for correcting defects in digital images through selective fill-in from surrounding areas. U.S. Pat. No. 6,160,923 also relates to this issue. It is desired to provide an efficient, quality dust or orb artifact correction technique for a hand-held or otherwise portable or spatial or temporal performance-based image capture device

SUMMARY OF THE INVENTION

A digital image processing method includes capturing, on a hand-held or otherwise portable or spatial or temporal performance-based image capture device, an original main image and one or more reference images having a temporal or spatial overlap or proximity with the original image, or combinations thereof. The method also includes in general the ability to obtain supplemental or complementary data, such as visual information to the captured image, using a reference image. In one embodiment, such data analysis includes assessing on the device that the original main image has one or more defects or otherwise sub-optimal characteristics. Information, image data or meta data, or combinations thereof, of the one or more reference images relating to the one or more defects or otherwise sub-optimal characteristics of the original main image are analyzed on the device. The one or more defects or other sub-optimal characteristics in the original main image are corrected on the device based on the information, image data or meta data, or combinations thereof, of the one or more reference images. Thus, a modified image is created than includes an enhanced version of the original main image. The modified image is rendered at a digital rendering device, display or printer, or combinations thereof, as output from the image capture device. The correcting of the one or more defects or other sub-optimal characteristics of the original main image based on the one or more reference images produces at the device the modified image from the original main image in real-time with spatial economy and performance efficiency.

The original main image and at least one reference image may include flash and non-flash versions of a substantially same scene. The original main image may be segmented into foreground and background regions, at least one of which may be modified based on the one or more reference images. A region containing a face may be detected within the original main image, and the face region may be modified based on the one or more reference images. A red-eye defect may be corrected within the face region of the original main image. A blur defect may be corrected in the original main image based on the one or more reference images. A dust artifact defect may be corrected in the original main image based on the one or more reference images.

A hand-held or otherwise portable or spatial or temporal performance-based image capture device may include one or more lenses, and a corresponding one or more sensors configured to provide a closely overlapping or identical temporal proximity between the acquired image and the reference image. Alternatively, the reference image may be acquired using the same optical system but at different times, e.g., just before or just after acquiring the main image. The device may also include an aperture and a photodetector for capturing the original main image and the one or more reference images, as well as a processor, and one or more processor-readable media having embedded therein programming code for the processor to perform a digital image processing method as described above or below herein.

DETAILED DESCRIPTION OF THE PREFERRED EMBODIMENTS

Figure 1:
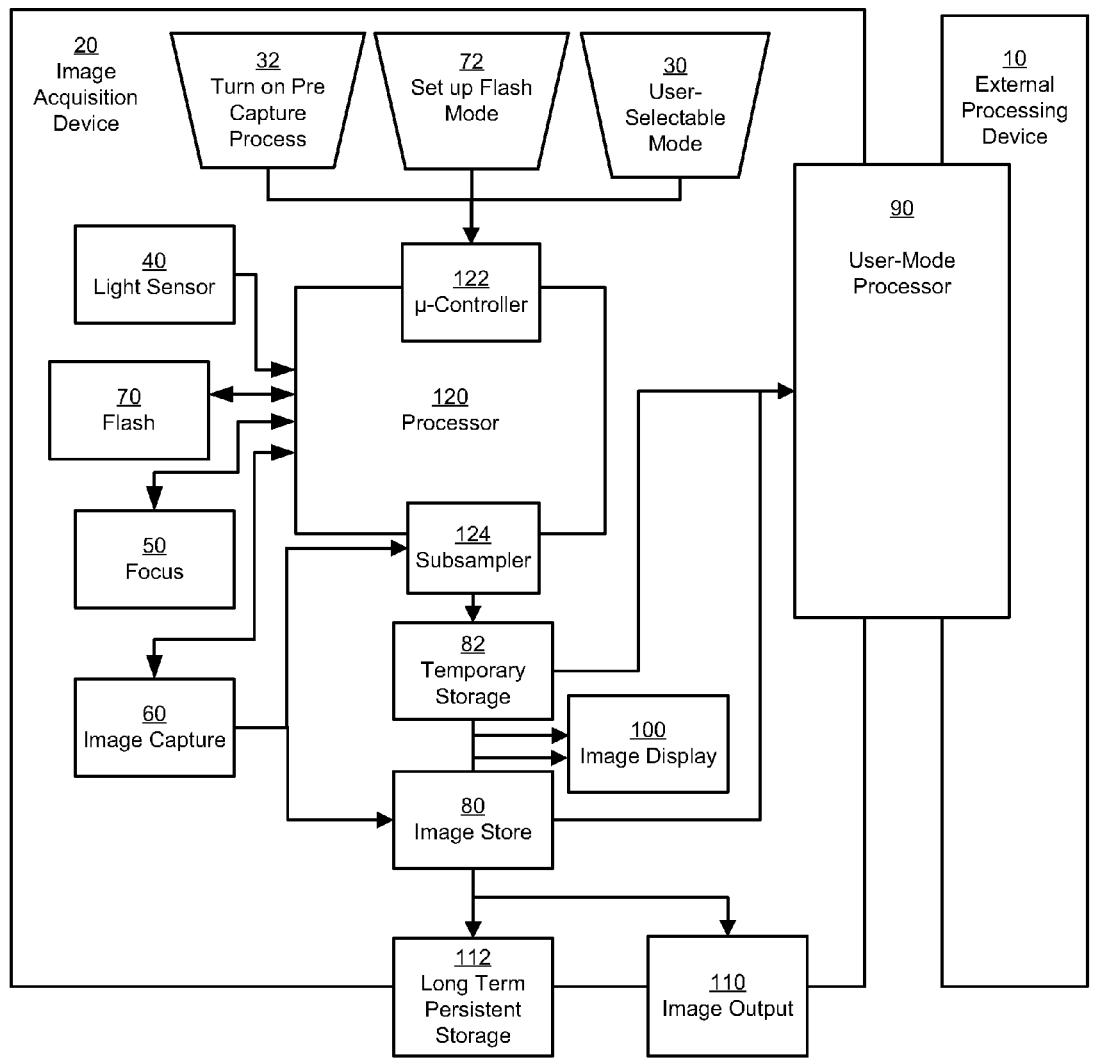
FIG. 1 is a block diagram of a camera apparatus operating in accordance with certain embodiments.

Several embodiments are described herein that use information obtained from reference images for processing a main image. That is, the data that are used to process the main image come at least not solely from the image itself, but instead or also from one or more separate "reference" images.

Reference Image

Reference images provide supplemental meta data, and in particular supplemental visual data to an acquired image, or main image. The reference image can be a single instance, or in general, a collection of one or more images varying from each other. The so-defined reference image(s) provides additional information that may not be available as part of the main image.

Example of a spatial collection may be multiple sensors all located in different positions relative to each other. Example of temporal distribution can be a video stream.

The reference image differs from the main captured image, and the multiple reference images differ from each other in various potential manners which can be based on one or combination of permutations in time (temporal), position (spatial), optical characteristics, resolution, and spectral response, among other parameters.

One example is temporal disparity. In this case, the reference image is captured before and/or after the main captured image, and preferably just before and/or just after the main image. Examples may include preview video, a pre-exposed image, and a post-exposed image. In certain embodiments, such reference image uses the same optical system as the acquired image, while in other embodiments, wholly different optical systems or optical systems that use one or more different optical components such as a lens, an optical detector and/or a program component.

Alternatively, a reference image may differ in the location of secondary sensor or sensors, thus providing spatial disparity. The images may be taken simultaneously or proximate to or in temporal overlap with a main image. In this case, the reference image may be captured using a separate sensor located away from the main image sensor. The system may use a separate optical system, or via some splitting of a single optical system into a plurality of sensors or a plurality of sub-pixels of a same sensor. As digital optical systems become smaller dual or multi sensor capture devices will become more ubiquitous. Some added registration and/or calibration may be typically involved when two optical systems are used.

Alternatively, one or more reference images may also be captured using different spectral responses and/or exposure settings. One example includes an infra red sensor to supplement a normal sensor or a sensor that is calibrated to enhance specific ranges of the spectral response such as skin tone, highlights or shadows.

Alternatively, one or more reference images may also be captured using different capture parameters such as exposure time, dynamic range, contrast, sharpness, color balance, white balance or combinations thereof based on any image parameters the camera can manipulate.

Alternatively, one or more reference images may also be captured using a secondary optical system with a differing focal length, depth of field, depth of focus, exit pupil, entry pupil, aperture, or lens coating, or combinations thereof based on any optical parameters of a designed lens.

Alternatively, one or more reference images may also capture a portion of the final image in conjunction with other differentials. Such example may include capturing a reference image that includes only the center of the final image, or capturing only the region of faces from the final image. This allows saving capture time and space while keeping as reference important information that may be useful at a later stage.

Reference images may also be captured using varying attributes as defined herein of nominally the same scene recorded onto different parts of a same physical sensor. As an example, one optical subsystem focuses the scene image onto a small area of the sensor, while a second optical subsystem focuses the scene image, e.g., the main image, onto a much larger area of the sensor. This has the advantage that it involves only one sensor and one post-processing section, although the two independently acquired scene images will be processed separately, i.e., by accessing the different parts of the sensor array. This approach has another advantage, which is that a preview optical system may be configured so it can change its focal point slightly, and during a capture process, a sequence of preview images may be captured by moving an optical focus to different parts of the sensor. Thus, multiple preview images may be captured while a single main image is captured. An advantageous application of this embodiment would be motion analysis.

Getting data from a reference image in a preview or postview process is akin to obtaining meta data rather than the image-processing that is performed using the meta data. That is, the data used for processing a main image, e.g., to enhance its quality, is gathered from one or more preview or postview images, while the primary source of image data is contained within the main image itself. This preview or postview information can be useful as clues for capturing and/or processing the main image, whether it is desired to perform red-eye detection and correction, face tracking, motion blur processing, dust artifact correction, illumination or resolution enhancement, image quality determination, foreground/background segmentation, and/or another image enhancement processing technique. The reference image or images may be saved as part of the image header for post processing in the capture device, or alternatively after the data is transferred on to an external computation device. In some cases, the reference image may only be used if the post processing software determines that there is missing data, damaged data or need to replace portions of the data.

In order to maintain storage and computation efficiency, the reference image may also be saved as a differential of the final image. Example may include a differential compression or removal of all portions that are identical or that can be extracted from the final image.

Correcting Eye Defects

In one example involving red-eye correction, a face detection process may first find faces, find eyes in a face, and check if the pupils are red, and if red pupils are found, then the red color pupils are corrected, e.g., by changing their color to black. Another red-eye process may involve first finding red in a digital image, checking whether the red pixels are contained in a face, and checking whether the red pixels are in the pupil of an eye. Depending on the quality of face detection available, one or the other of these may be preferred. Either of these may be performed using one or more preview or postview images, or otherwise using a reference image, rather than or in combination with, checking the main image itself. A red-eye filter may be based on use of acquired preview, postview or other reference image or images, and can determine whether a region may have been red prior to applying a flash.

Another known problem involves involuntary blinking. In this case, the post processing may determine that the subject's eyes were closed or semi closed. If there exists a reference image that was captured time-wise either a fraction of a second before or after such blinking, the region of the eyes from the reference image can replace the blinking eye portion of the final image.

In some cases as defined above, the camera may store as the reference image only high resolution data of the Region of Interest (ROI) that includes the eye locations to offer such retouching.

Face Tools

Multiple reference images may be used, for example, in a face detection process, e.g., a selected group of preview images may be used. By having multiple images to choose from, the process is more likely to have a more optimal reference image to operate with. In addition, a face tracking process generally utilizes two or more images anyway, beginning with the detection of a face in at least one of the images. This provides an enhanced sense of confidence that the process provides accurate face detection and location results.

Moreover, a perfect image of a face may be captured in a reference image, while a main image may include an occluded profile or some other less than optimal feature. By using the reference image, the person whose profile is occluded may be identified and even have her head rotated and unblocked using reference image data before or after taking the picture. This can involve upsampling and aligning a portion of the reference image, or just using information as to color, shape, luminance, etc., determined from the reference image. A correct exposure on a region of interest or ROI may be extrapolated using the reference image. The reference image may include a lower resolution or even subsampled resolution version of the main image or another image of substantially a same scene as the main image.

Meta data that is extracted from one or more reference images may be advantageously used in processes involving face detection, face tracking, red-eye, dust or other unwanted image artifact detection and/or correction, or other image quality assessment and/or enhancement process. In this way, meta data, e.g., coordinates and/or other characteristics of detected faces, may be derived from one or more reference images and used for main image quality enhancement without actually looking for faces in the main image.

A reference image may also be used to include multiple emotions of a single subject into a single object. Such emotions may be used to create more comprehensive data of the person, such as smile, frown, wink, and/or blink. Alternatively, such data may also be used to post process editing where the various emotions can be cut-and-pasted to replace between the captured and the reference image. An example may include switching between a smile to a sincere look based on the same image.

Finally, the reference image may be used for creating a three-dimensional representation of the image which can allow rotating subjects or the creation of three dimensional representations of the scene such as holographic imaging or lenticular imaging.

Motion Correction

A reference image may include an image that differs from a main image in that it may have been captured at a different time before or after the main image. The reference image may have spatial differences such as movements of a subject or other object in a scene, and/or there may be a global movement of the camera itself. The reference image may, preferably in many cases, have lower resolution than the main image, thus saving valuable processing time, bytes, bitrate and/or memory, and there may be applications wherein a higher resolution reference image may be useful, and reference images may have a same resolution as the main image. The reference image may differ from the main image in a planar sense, e.g., the reference image can be infrared or Gray Scale, or include a two bit per color scheme, while the main image may be a full color image. Other parameters may differ such as illumination, while generally the reference image, to be useful, would typically have some common overlap with the main image, e.g., the reference image may be of at least a similar scene as the main image, and/or may be captured at least somewhat closely in time with the main image.

Some cameras (e.g., the Kodak V570, see http://www.d-cviews.com/_kodak/v570.htm) have a pair of CCDs, which may have been designed to solve the problem of having a single zoom lens. A reference image can be captured at one CCD while the main image is being simultaneously captured with the second CCD, or two portions of a same CCD may be used for this purpose. In this case, the reference image is neither a preview nor a postview image, yet the reference image is a different image than the main image, and has some temporal or spatial overlap, connection or proximity with the main image. A same or different optical system may be used, e.g., lens, aperture, shutter, etc., while again this would typically involve some additional calibration. Such dual mode system may include a IR sensor, enhanced dynamic range, and/or special filters that may assist in various algorithms or processes.

In the context of blurring processes, i.e., either removing camera motion blur or adding blur to background sections of images, a blurred image may be used in combination with a non-blurred image to produce a final image having a non-blurred foreground and a blurred background. Both images may be deemed reference images which are each partly used to form a main final image, or one may be deemed a reference image having a portion combined into a main image. If two sensors are used, one could save a blurred image at the same time that the other takes a sharp image, while if only a single sensor is used, then the same sensor could take a blurred image followed by taking a sharp image, or vice-versa. A map of systematic dust artifact regions may be acquired using one or more reference images.

Reference images may also be used to disqualify or supplement images which have with unsatisfactory features such as faces with blinks, occlusions, or frowns.

Foreground/Background Processing

A method is provided for distinguishing between foreground and background regions of a digital image of a scene. The method includes capturing first and second images of nominally the same scene and storing the captured images in DCT-coded format. These images may include a main image and a reference image, and/or simply first and second images either of which images may comprise the main image. The first image may be taken with the foreground more in focus than the background, while the second image may be taken with the background more in focus than the foreground. Regions of the first image may be assigned as foreground or background according to whether the sum of selected high order DCT coefficients decreases or increases for equivalent regions of the second image. In accordance with the assigning, one or more processed images based on the first image or the second image, or both, are rendered at a digital rendering device, display or printer, or combinations thereof.

This method lends itself to efficient in-camera implementation due to the relatively less-complex nature of calculations utilized to perform the task.

In the present context, respective regions of two images of nominally the same scene are said to be equivalent if, in the case where the two images have the same resolution, the two regions correspond to substantially the same part of the scene. If, in the case where one image has a greater resolution than the other image, the part of the scene corresponding to the region of the higher resolution image is substantially wholly contained within the part of the scene corresponding to the region of the lower resolution image. Preferably, the two images are brought to the same resolution by sub-sampling the higher resolution image or upsampling the lower resolution image, or a combination thereof. The two images are preferably also aligned, sized or other process to bring them to overlapping as to whatsoever relevant parameters for matching.

Even after subsampling, upsampling and/or alignment, the two images may not be identical to each other due to slight camera movement or movement of subjects and/or objects within the scene. An additional stage of registering the two images may be utilized.

Where the first and second images are captured by a digital camera, the first image may be a relatively high resolution image, and the second image may be a relatively low resolution pre- or post-view version of the first image. While the image is captured by a digital camera, the processing may be done in the camera as post processing, or externally in a separate device such as a personal computer or a server computer. In such case, both images can be stored. In the former embodiment, two DCT-coded images can be stored in volatile memory in the camera for as long as they are being used for foreground/background segmentation and final image production. In the latter embodiment, both images may be preferably stored in non-volatile memory. In the case of lower resolution pre-or-post view images, the lower resolution image may be stored as part of the file header of the higher resolution image.

In some cases only selected regions of the image are stored as two separated regions. Such cases include foreground regions that may surround faces in the picture. In one embodiment, if it is known that the images contain a face, as determined, for example, by a face detection algorithm, processing can be performed just on the region including and surrounding the face to increase the accuracy of delimiting the face from the background.

Inherent frequency information as to DCT blocks is used to provide and take the sum of high order DCT coefficients for a DCT block as an indicator of whether a block is in focus or not. Blocks whose high order frequency coefficients drop when the main subject moves out of focus are taken to be foreground with the remaining blocks representing background or border areas. Since the image acquisition and storage process in a digital camera typically codes captured images in DCT format as an intermediate step of the process, the method can be implemented in such cameras without substantial additional processing.

This technique is useful in cases where differentiation created by camera flash, as described in U.S. application Ser. No. 11/217,788, published as 2006/0039690, incorporated by reference (see also U.S. Ser. No. 11/421,027) may not be sufficient. The two techniques may also be advantageously combined to supplement one another.

Methods are provided that lend themselves to efficient in-camera implementation due to the computationally less rigorous nature of calculations used in performing the task in accordance with embodiments described herein.

A method is also provided for determining an orientation of an image relative to a digital image acquisition device based on a foreground/background analysis of two or more images of a scene.

Referring to the Figures

FIG. 1 shows a block diagram of an image acquisition device 20 operating in accordance with certain embodiments. The digital acquisition device 20, which in the present embodiment is a portable digital camera, includes a processor 120. Many of the processes implemented in the digital camera may be implemented in or controlled by software operating in a microprocessor, central processing unit, controller, digital signal processor and/or an application specific integrated circuit, collectively depicted as block 120 labelled "processor". Generically, user interfacing and control of peripheral components such as buttons and display may be controlled by microcontroller 122. The processor 120, in response to user input at 122, such as half pressing a shutter button (pre-capture mode 32), initiates and controls the digital photographic process. Ambient light exposure is determined using a light sensor 40 in order to automatically determine if a flash is to be used. The distance to the subject is determined using a focusing mechanism 50 which also focuses the image on an image capture device 60. If a flash is to be used, processor 120 causes a flash device 70 to generate a photographic flash in substantial coincidence with the recording of the image by the image capture device 60 upon full depression of the shutter button. The image capture device 60 digitally records the image in color. The image capture device is known to those familiar with the art and may include a CCD (charge coupled device) or CMOS to facilitate digital recording. The flash may be selectively generated either in response to the light sensor 40 or a manual input 72 from the user of the camera. The high resolution image recorded by image capture device 60 is stored in an image store 80 which may comprise computer memory such as dynamic random access memory or a non-volatile memory. The camera is equipped with a display 100, such as an LCD, for preview and post-view of images.

In the case of preview images which are generated in the pre-capture mode 32 with the shutter button half-pressed, the display 100 can assist the user in composing the image, as well as being used to determine focusing and exposure. Temporary storage 82 is used to store one or plurality of the preview images and can be part of the image store 80 or a separate component. The preview image is usually generated by the image capture device 60. For speed and memory efficiency reasons, preview images usually have a lower pixel resolution than the main image taken when the shutter button is fully depressed, and are generated by sub-sampling a raw captured image using software 124 which can be part of the general processor 120 or dedicated hardware or combinations thereof. Depending on the settings of this hardware subsystem, the pre-acquisition image processing may satisfy some predetermined test criteria prior to storing a preview image. Such test criteria may be chronological, such as to constantly replace the previous saved preview image with a new captured preview image every 0.5 seconds during the pre-capture mode 32, until the final high resolution image is captured by full depression of the shutter button. More sophisticated criteria may involve analysis of the preview image content, for example, testing the image for changes, before deciding whether the new preview image should replace a previously saved image. Other criteria may be based on image analysis such as the sharpness, or metadata analysis such as the exposure condition, whether a flash will be used in the final image, the distance to the subject, or combinations thereof.

If test criteria are not met, the camera continues by capturing the next preview image while storing and/or discarding preceding captured previews. The process continues until the final high resolution image is acquired and saved by fully depressing the shutter button.

Where multiple preview images can be saved, a new preview image will be placed on a chronological First-In, First-Out (FIFO) stack, until the user takes the final picture. A reason for storing multiple preview images is that the last preview image, or any single preview image, may not be the best reference image for comparison with the final high resolution image in, for example, a red-eye correction process or, in the present embodiments, portrait mode processing. By storing multiple images, a better reference image can be achieved, and a closer alignment between the preview and the final captured image can be achieved in an alignment stage discussed later. Also, some processing may involve the use of multiple preview and/or post-view images.

The camera is also able to capture and store in the temporary storage 82 one or more low resolution post-view images when the camera is in portrait mode. Post-view images are essentially the same as preview images, except that they occur after the main high resolution image is captured.

In this embodiment the camera 20 has a user-selectable mode 30. The user mode 30 is one which involves foreground/background segmentation of an image as part of a larger process, e.g. for applying special effects filters to the image or for modifying or correcting an image. Thus in the user mode 30 the foreground/background segmentation is not an end in itself. However, as the segmentation aspects of the user mode 30 are relevant, those aspects are described further herein.

If user mode 30 is selected, when the shutter button is depressed the camera is caused to automatically capture and store a series of images at close intervals so that the images are nominally of the same scene. The particular number, resolution and sequence of images, and the extent to which different parts of the image are in or out of focus, depends upon the particular embodiment. A user mode processor 90 analyzes and processes the stored images according to a workflow to be described. The processor 90 can be integral to the camera 20—indeed, it could be the processor 120 with suitable programming—or part of an external processing device 10 such as a desktop computer. In this embodiment the processor 90 processes the captured images in DCT format. As explained above, the image acquisition and storage process in a digital camera typically codes the captured images in DCT format as an intermediate step of the process, the images being finally stored in, for example, jpg format. Therefore, the intermediate DCT-coded images can be readily made available to the processor 90.

Figure 2:
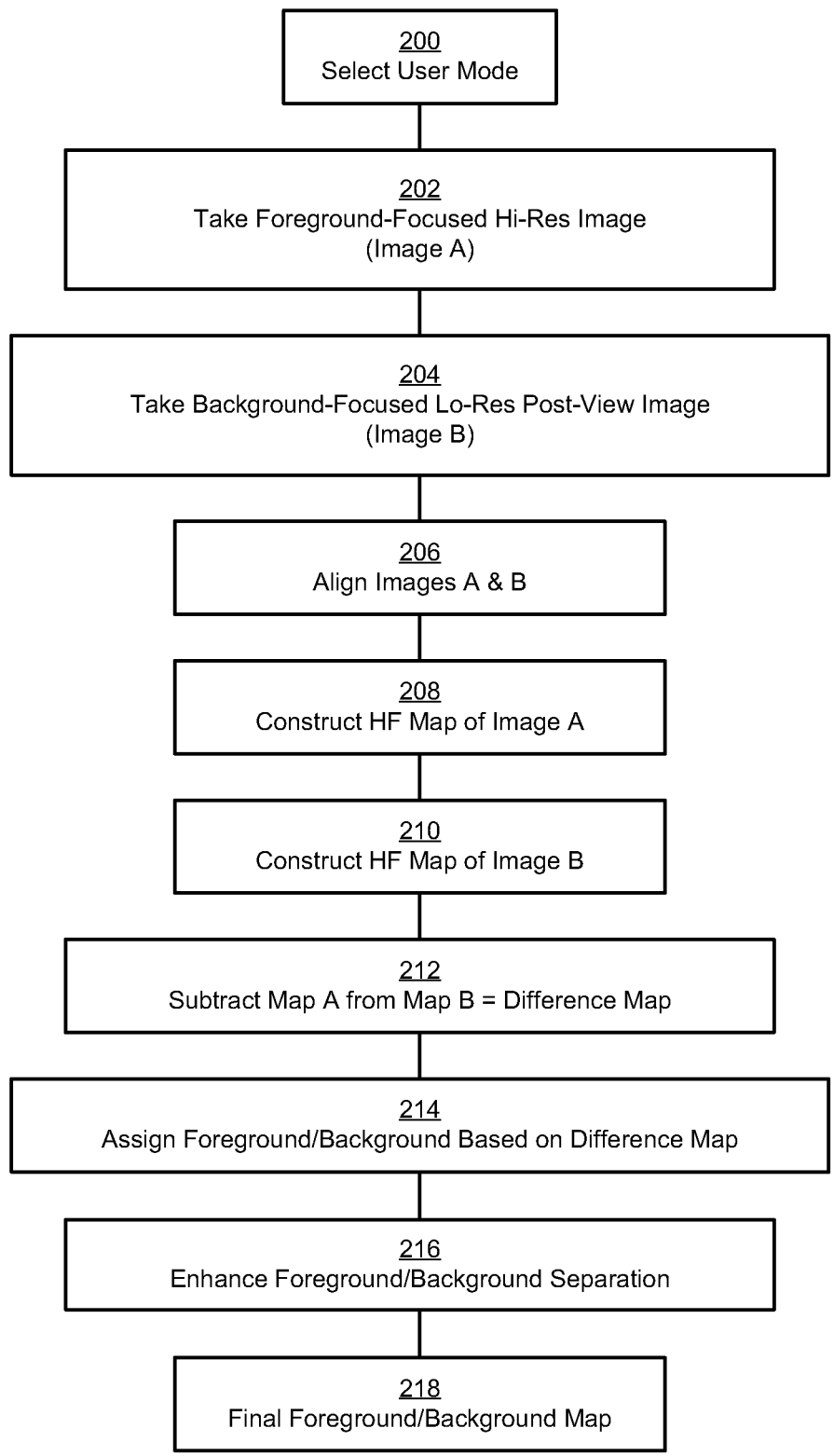
FIG. 2 shows the workflow of a method according to certain embodiments.

FIG. 2 illustrates the workflow of an embodiment of user mode processing. First, user mode 30 is selected at step 200. Now, when the shutter button is fully depressed, the camera automatically captures and stores two digital images in DCT format, including:

a high pixel resolution image (image A) is taken at step 202. This image has a foreground subject of interest which is in focus, or at least substantially more in focus than the background.

a low pixel resolution post-view (or preview) image (image B) is taken at step 204. This image has its background in focus, or at least substantially more in focus than the foreground subject of interest. Auto-focus algorithms in a digital camera will typically provide support for off-centre multi-point focus which can be used to obtain a good focus on the background. Where such support is not available, the camera can be focussed at infinity.

These two images are taken in rapid succession so that the scene captured by each image is nominally the same. In this embodiment steps 200 to 206 just described take place in the camera 20. The remaining steps now to be described can take place in the camera or in an external device 10.

Images A and B are aligned in step 206, to compensate for any slight movement in the subject or camera between taking these images. Alignment algorithms are well known. Then, at step 208, a high frequency (HF) map of the foreground focussed image A is constructed by taking the sum of selected high order DCT coefficients for each, or at least the majority of, the DCT blocks of the image. By way of background, for an 8×8 block of pixels, a set of 64 DCT coefficients going from the first (d.c.) component to the highest frequency component is generated. In this embodiment, the top 25% of the DCT coefficients for a block are added to provide an overall HF index for the block. If not all the DCT blocks of the image are used to construct the map, those that are should be concentrated on the regions expected to contain the foreground subject of interest. For example, the extreme edges of the image can often be omitted, since they will almost always be background. The resultant map is referred to herein as Map A.

Next, step 210, an HF map (Map B) of the background focussed image B is constructed by calculating the HF indices of the DCT blocks using the same procedure as for Map A.

Now, step 212, a difference map is constructed by subtracting Map A from Map B. This is done by subtracting the HF indices obtained in step 208 individually from the HF indices obtained in step 210. Since Image A has a higher resolution than image B, a DCT block in Image B will correspond to a larger area of the scene than a DCT block in Image A. Therefore, each HF index of Map A is subtracted from that HF index of Map B whose DCT block corresponds to an area of the scene containing or, allowing for any slight movement in the subject or camera between taking the images, substantially containing the area of the scene corresponding to the DCT block of Map A. This means that the HF indices for several adjacent DCT blocks in Image A will be subtracted from the same HF index of Map B, corresponding to a single DCT block in Image B.

At step 214, using the values in the difference map, a foreground/background map is constructed wherein each DCT block of Image A is assigned as corresponding to a foreground or background region of the image according to whether the difference between its HF index and the HF index of the DCT block of Image B from which it was subtracted in step 212 is, respectively, negative or positive.

Finally, at step 216, additional morphological, region filling and related image processing techniques, alone or in combination with other foreground/background segmentation techniques, can further improve and enhance the final foreground/background map.

The final foreground/background map 218 may now be applied to the DCT-coded or jpg version of Image A for use in processing the image according to the function to be performed by the user-selectable mode 30.

Where the processor 90 is integral to the camera 20, the final processed jpg image may be displayed on image display 100, saved on a persistent storage 112 which can be internal or a removable storage such as CF card, SD card or the like, or downloaded to another device, such as a personal computer, server or printer via image output device 110 which can be tethered or wireless. In embodiments where the processor 90 is implemented in an external device 10, such as a desktop computer, the final processed image may be returned to the camera 20 for storage and display as described above, or stored and displayed externally of the camera.

Variations of the foregoing embodiment are possible. For example, Image B could be a low resolution preview image rather than a post-view image. Alternatively, both Images A and B could be high resolution images having the same resolution. In that case a DCT block in Image B will correspond to the same area of the scene as a DCT block in Image A. Thus, in step 212, the difference map would be constructed by subtracting each HF index of Map A from a respective different HF index of Map B, i.e. that HF index of Map B corresponding to the same or, allowing for any slight movement in the subject or camera between taking the images, substantially the same area of the scene. In another embodiment both Images A and B are low resolution preview and/or post-view images having the same resolution, and the foreground/background map derived therefrom is applied to a third, higher resolution image of nominally the same scene.

In another embodiment, rather than basing the maps and comparison on a DCT block by block analysis, each map can first be pre-processed to provide regions, each having similar HF characteristics. For example, contiguous blocks with HF components above a given threshold are grouped together and contiguous blocks with HF components below a given threshold are grouped together. Regions from the foreground and background images can then be compared to determine if they are foreground or background.

In another embodiment, Images A and B may have different pixel resolutions, and prior to DCT coding, the pixel resolutions of the two images are matched by up-sampling the image of lower resolution and/or sub-sampling the image of higher resolution. In this context, US published patent applications nos. 2005/0041121 and 2006/0098890, which are assigned to the same assignee as the present application, are hereby incorporated by reference. In this embodiment, a digital foreground/background map may be preferably created and stored, while it may also be possible to use the foreground/background designation of the image region corresponding to each DCT block directly in another algorithm, instead of formally creating and storing a digital map.

As mentioned above, the ability to provide foreground/background separation in an image is useful in many applications.

In other embodiments, a particular application may use a foreground/background map of an image, regardless of whether it has been calculated using the embodiment described above or, e.g., using a flash-based technique such as that described at US published patent application no. 2006/0285754, which is hereby incorporated by reference. The technique may detect the orientation of an image relative to the camera. The technique may be applicable to any digital image acquisition device. For many situations, this may imply an orientation of a camera when the image was taken without an additional mechanical device.

Figure 3:
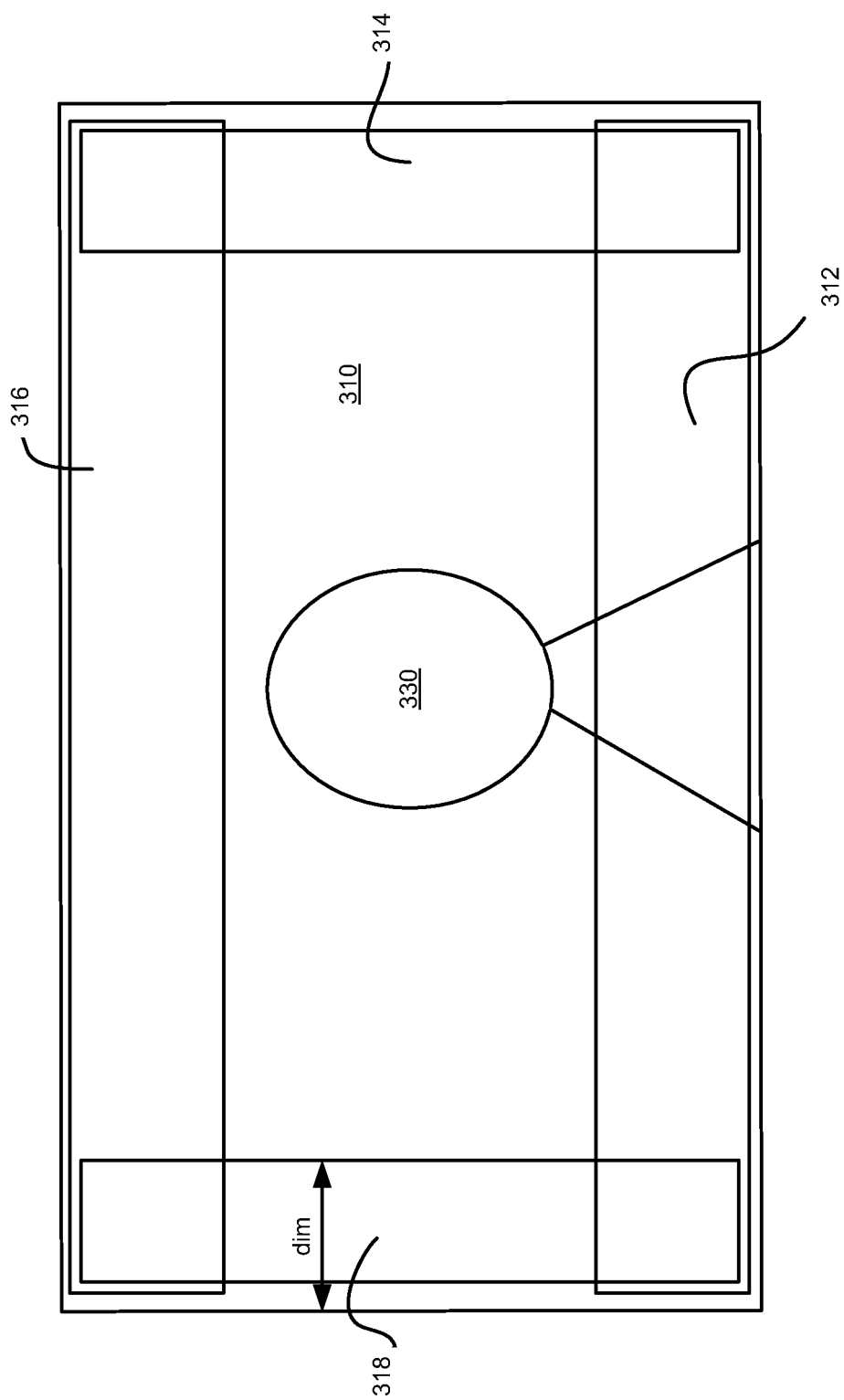
FIG. 3 illustrates a foreground/background map for a portrait image.

Referring now to FIG. 3, in a normally-oriented camera for a normally-oriented scene, a close image foreground (in this case the subject 330) may be at the bottom of the image and a far background at its top. Using flash-based foreground/background segmentation, being closer to the camera, the close foreground 330 reflects the flash more than the far background. Thus, by computing a difference between a flash and non-flash version image of the scene, the image orientation can be detected and camera orientation implied. A corresponding analysis may apply when analysing DCT coefficients of two images as in the above described embodiment.

An exemplary implementation may use two reference images, e.g., preview or postview images or combinations of preview, postview and/or ordinary images suitably matched in resolution, one flash and one non-flash, and transforms these into grey level. For each pixel, the grey level of the non-flash image is subtracted from the one corresponding to the flash image to provide a difference image. In other implementations, a ratio could be used instead of subtraction.

For each potential image/camera orientation direction, a box is taken in the difference image. So, for an image sensing array 310 in an upright camera, box 312 is associated with an upright orientation of the camera, and box 316 is associated with an inverted orientation of the camera, box 314 is associated with a clockwise rotation of the camera relative to a scene, and box 318 is associated with an anti-clockwise rotation of the camera relative to the scene.

For each of boxes 312-318 of FIG. 3, an average value of the difference image is computed. In some implementations, the difference might only be calculated for portions of the image corresponding to the boxes 312-318.

For clarity, the boxes 312-318 of FIG. 3 are not shown as extending to the edges of the image, however, in an exemplary implementation, for a box size=dim, the box 318 would extend from: left=0, top=0 to right=dim and bottom=image height. In other implementations, one could associate other suitable regions with a given orientation or indeed other units of measurement instead of the average (i.e. histograms).

The maximum of the average values for the boxes 312-318 may be computed and the box corresponding to the largest value may be deemed to be a region with the greatest degree of foreground vis-a-vis the remaining regions. This is deemed to indicate that this region lies at the bottom of the reference image(s). In the example of FIG. 3, the largest difference in the difference images of the boxes should occur in box 312, indicating an upright subject and implying an upright camera orientation given the normal pose of a subject. In some implementations, box 316 might not be used as it is not a realistic in-camera orientation.

In some implementations, it can be of benefit to run some tests in order to validate the presumptive image orientation. For example, the maximum of the average values may be tested to determine if it is dominant vis-à-vis other values and a level of confidence can be implied from this dominance or otherwise. The degree of dominance involved can be varied experimentally for different types of images (e.g., indoor/outdoor as described in US published patent application no. 2006/0285754, or day/night).

Information from other image analysis components which are used within the camera may also be combined for determining a level of confidence. One exemplary image analysis component is a face tracking module which may be operable on a stream of ordinary, preview or postview images. This component may store historical data relating to tracked face regions, including a confidence level that a region is a face and an associated orientation. Where multiple faces are present, their data may be combined in determining a level of confidence.

In an example, if the difference values for the presumed left and right sides of an image are similar and smaller then the presumed bottom and larger than the presumed top, then it may be more (or less) likely that the orientation has been detected correctly.

Because foreground/background maps can be provided for both indoor and outdoor images according to whether the maps have been created using flash or non-flash based segmentation, knowing image orientation can be useful in many further camera applications. For example, knowing the likely orientation of objects in an image can reduce processing overhead in attempting to identify such objects in every possible orientation.

Processing with Faces in Digital Images

In another embodiment, a method is provided wherein one or more groups of pixels are identified as faces or other objects or subjects within a digital acquisition device based on information from one or more reference images, which may be preview, postview or other different images from a main image within which it is desired to identify such faces, or other objects or subjects. Certain embodiments are described below including methods and devices for providing and/or suggesting options for determining image orientation automatically using face detection. A preferred embodiment includes an image processing application whether implemented in software or in firmware, as part of the image capture process, such as in a digital camera, or as part of post processing, such as a desktop, in the camera as a post processing background process or on a server application. This system receives images in digital form, where the images can be translated into a grid representation including multiple pixels.

The preferred embodiment describes a method of re-using face detection information in different orientations of the image to determine the orientation with the highest probability to be the correct one. The information regarding the location and size of faces in an image assist in determining correct orientation.

Advantages of the preferred embodiments include the ability to automatically perform or suggest or assist in the determination of the correct orientation of an image. Another advantage is that the processing may be automatically performed and/or suggested based on this information. Such automatic processing is fast enough and efficient enough to handle multiple images in close to real time, or be used for a single image as part of the image processing in the acquisition device.

Many advantageous techniques are provided in accordance with preferred and alternative embodiments set forth herein. For example, this method of detection the image orientation can be combined with other methods of face detection, thus improving the functionality, and re-purposing the process for future applications.

Two or more methods of detecting faces in different orientations may be combined to achieve better accuracy and parameters of a single algorithm may be concatenated into a single parameter. The digital image may be transformed to speed up the process, such as subsampling or reducing the color depth. The digital image may be transformed to enhance the accuracy such as preprocessing stage for improving the color balance, exposure or sharpness. The digital image may post-processed to enhance the accuracy, such as removal of false positives as a post processing process, based on parameters and criteria of the face detection algorithm.

Values of orientation may be adjusted such that a rotation value for the digital image is determined. This technique may be implemented for supporting arbitrary rotation or fixed interval rotation such as 90 degree rotation.

The method may be performed within any digital image capture device, which as, but not limited to digital still camera, phone handset with built in camera, web camera or digital video camera. Determining which of the sub-group of pixels belong to which of the group of face pixels may be performed. The determining of the initial values of one or more parameters of pixels may be calculated based on the spatial orientation of the one or more sub-groups that correspond to one or more facial features. The spatial orientation of the one or more sub-groups that correspond to one or more facial features may be calculated based on an axis of an ellipse fit to the sub-group. The adjusted values of pixels within the digital image may be rounded to a closest multiple of 90 degrees. The initial values may be adjusted to adjusted values for re-orienting the image to an adjusted orientation. The one or more facial features may include an eye, two eyes, two eyes and a mouth, an eye, a mouth, hairline, ears, nostrils, nose bridge, eyebrows or a nose, or combinations thereof. On a more abstract level the features used for the detection of objects in general in the image, or faces specifically may be determined through a mathematical classifiers that are either deduced via a learning process or inserted into the system. One example of such classifiers are described by Viola Jones in the paper incorporated herein by reference. Other classifiers can be the eigenfaces, which are the basis functions that define images with faces.

Each of the methods provided are preferably implemented within software and/or firmware either in the camera or with external processing equipment. The software may also be downloaded into the camera or image processing equipment. In this sense, one or more processor readable storage devices having processor readable code embodied thereon are provided. The processor readable code programs one or more processors to perform any of the above or below described methods.

Figure 4:
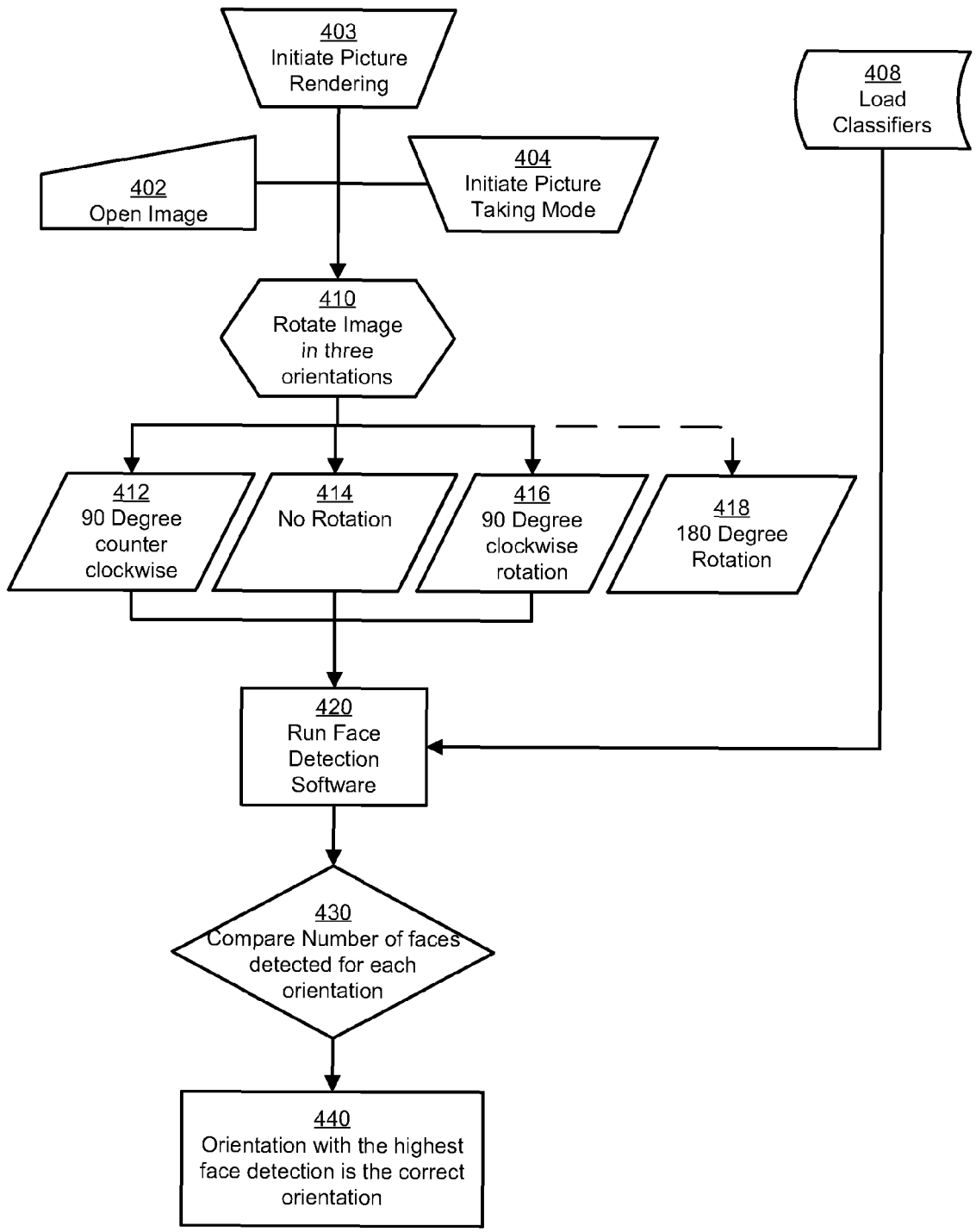
FIG. 4 is a flow diagram that illustrates a main orientation workflow based on rotation of a digital image that includes one or more faces.

FIG. 4 illustrates a process flow according to a preferred embodiment. The input is an image which can come from various sources. According to this exemplary procedure, an image may be opened by a software, firmware or other program application in block 402. The process may be initiated when a photographer takes a picture at block 403, or as an automatic background process for an application or acquisition device at block 404.

The classifiers are preferably pre-determined for the specific image classification. A detailed description of the learning process to create the appropriate classifiers can be found in the paper by Viola and Jones that has been cited and incorporated by reference hereinabove. The classifiers are loaded, at step 408, into the application.

The image is preferably rotated into three orientations at block 410. Only two or more than three orientation may alternatively be used: The preferred orientations are counter clockwise 412, no rotation 414 and clockwise, 416. Note that a fourth orientation which is the upside down 418 is technically and theoretically plausible but is not preferred due to the statistical improbability of such images. One or more images rotated by 1°, or a few seconds or minutes, or by 3° or 45°, or an arbitrary amount, may also be used.

The three images are then provided to the face detection software at block 420 and the results are analyzed at block 430. The image with the highest probability of detection of faces is determined at block 440 to be most likely the one with the right orientation.

Figure 5:
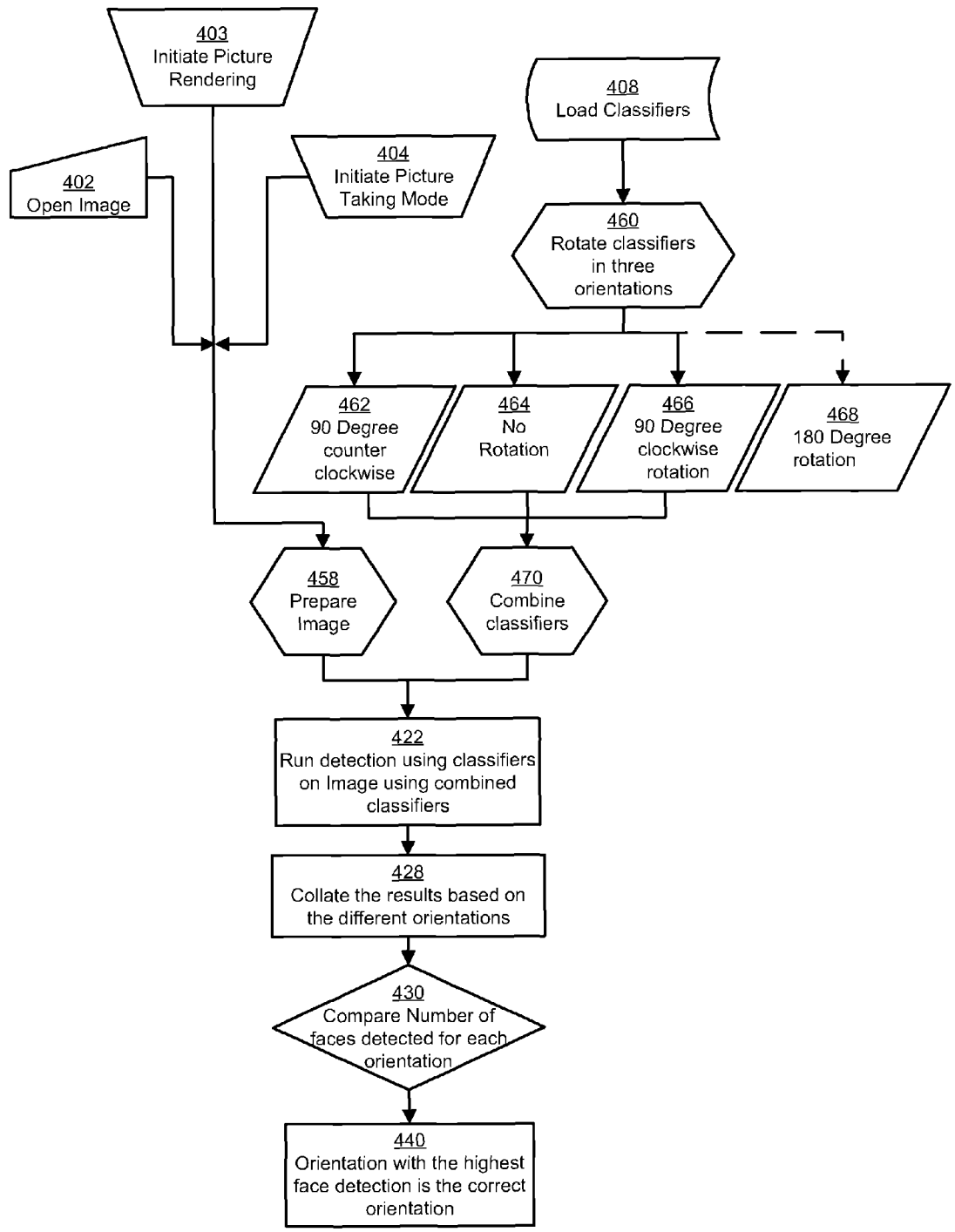
FIG. 5 is a flow diagram that illustrates a main orientation workflow based on rotation of classifiers relative to an orientation of a digital image that includes one or more faces.

FIG. 5 is an alternative embodiment, wherein the classifiers are rotated as opposed to the images. By doing so, even if the results are similar, the execution time is highly optimized because the process is preferably not repeated over three images, and is instead performed over only a single image with two, three or more times the number of classifiers. Preferably, two sets of rotated classifiers are used along with an unrotated set. According to FIG. 5, the classifiers loaded at block 408 are rotated at block 460 to create counter clockwise classifiers 462, original classifiers 464 and clockwise classifiers 466. As explained above, if desired, a fourth set of classifiers 468 of 180 degree rotation can be generated, and in fact, any number of classifier sets may be generated according to rotations of arbitrary or selected amounts in accordance with alternative embodiments of this invention. In a third embodiment, both the image and the classifiers may be rotated.

The classifiers are preferably combined into a single set of classifiers at block 470. The concatenation of the classifiers is preferably performed in such a manner that an false eliminating process would still be optimized. Note that these operations need not be executed at the time of analysis, but can be prepared prior to running the process on an image, as a preparatory step. Also note that the two approaches may be combined, where some classifiers may or may not be used depending on the results of the previous classifies. It may be possible to merge the preferred three sets, or an arbitrary number of two or more sets, of rotated classifiers.

Part-way through, the common classifiers one would branch into the specific classifiers for each orientation. This would speed up the algorithm because the first part of the classification would be common to the three orientations.

In another embodiment, where the classifier set contains rotation invariant classifiers it is possible to reduce the number of classifiers which must be applied to an image from 3N to 3N−2M where N is the number of classifiers in the original classifier set and M is the number of rotation invariant classifiers. The image is then prepared at block 458 to run the face detection algorithm at block 422. Such preparation varies on the algorithm and can include different operations such as converting the image format, the color depth, the pixel representation etc. In some cases the image is converted, such as described by Viola and Jones, to form a pixel based representation from an integral one. In other cases the image may be subsampled to reduce computation, converted to a gray scale representation, or various image enhancement algorithms such as edge enhancement, sharpening, blurring, noise reduction etc. may be applied to the image. Numerous operations on the image in preparation may also be concatenated. The face detection algorithm is run once on the image at block 422, using the multiple set of classifiers 470. The results are then collated at block 428, according to each of the three orientations of the preferred classifier set. The number of surviving face regions for each orientation of the classifier set are next compared at block 430. The orientation with the highest number of surviving face regions is determined at block 440 to be the one with the highest likelihood orientation.

In an additional embodiment, the algorithm handles may handle cases of false detection of faces. The problem occurs where in some cases regions that are not faces are marked as potential faces. In such cases, it is not enough to count the occurrence of faces, but the probability of false detection and missed faces needs to be accounted for.

Camera Motion Blur

According to another embodiment, there is provided a digital image acquisition system comprising an apparatus for capturing digital images and a digital processing component for determining a camera motion blur function in a captured digital image based on a comparison of at least two images each taken during, temporally proximate to or overlapping an exposure period of said captured image and of nominally the same scene.

Preferably, the at least two images comprise the captured image and another image taken outside, preferably before and alternatively after, the exposure period of said captured image.

Preferably at least one reference image is a preview image.

Referring back again briefly to FIG. 1 for context, an image recorded by an image capture device 20, such as a handheld or otherwise portable digital camera, may be stored in an image store 80 which may comprise computer memory such a dynamic random access memory or a non-volatile memory. The camera 20 of FIG. 1 is equipped with a display 100, such as an LCD at the back of the camera 20 or a microdisplay inside a viewfinder for viewing preview and/or post-view or other reference images. In the exemplary case of preview images, which may be generated in a pre-capture mode 32, the display 100 can assist the user in composing the image, as well as being used to determine focusing and exposure. A temporary storage space 82 may be used to store one or plurality of the preview images and may be part of the image store 80 or a separate component. The preview image may typically be generated by the same image capture element 60, and for speed and memory efficiency reasons may be generated by subsampling the image 124 using software which can be part of the general processor 120 or dedicated hardware, before displaying at display 100 or storing 82 the preview image.

Upon full depression of the shutter button, a full resolution image is acquired and stored at image store 80. The image may go through image processing stages such as conversion from the RAW sensor pattern to RGB, format, color correction and image enhancements. These operations may be performed as part of the main processor 120 or by using a secondary processor such as a dedicated DSP. Upon completion of the image processing the images are stored in a long term persistent storage such as a removable storage device 112.

According to this embodiment, the system further includes a motion de-blurring component. This component can be implemented as firmware or software running on the main processor 120 or on a separate processor. Alternatively, this component may be implemented in software running on an external processing device 10 of FIG. 1, such as a desktop or a server, which receives the images from the camera storage 112 via the image output mechanism 110, which can be physical removable storage, wireless or tethered connection between the camera and the external device. The motion de-blurring component may include a PSF calculator (see element 498 of FIG. 6) and an image de-convolver which de-convolves the full resolution image using the PSF. These two components may be combined or treated separately. The PSF calculator may be used for qualification only, such as determining if motion blur exists, while the image de-convolver may be activated only after the PSF calculator has determined if de-blurring is needed.

Figure 6:
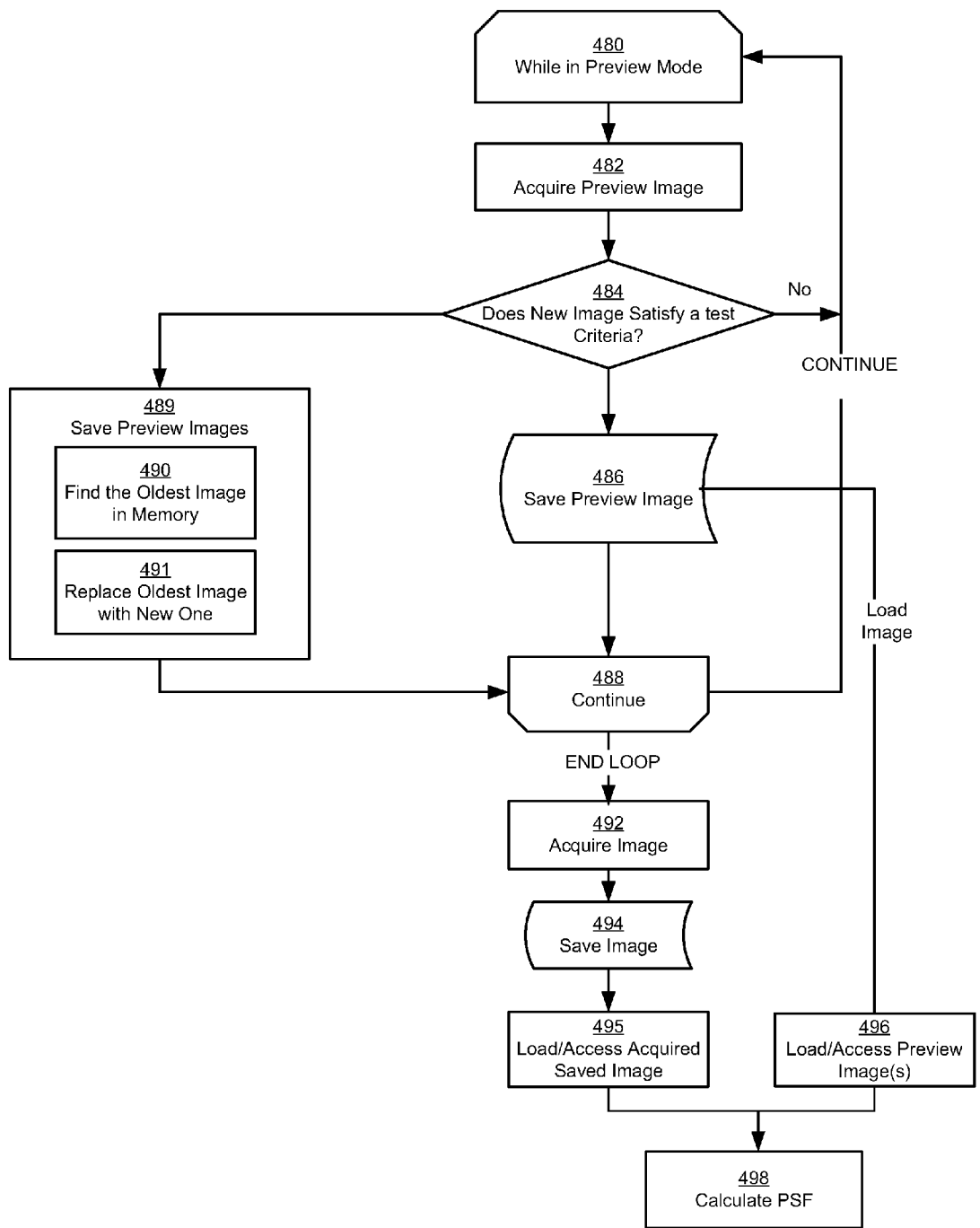
FIG. 6 illustrates the workflow of the initial stage of a camera motion blur reducing means using preview data according to certain embodiments.

FIG. 6 includes a flow chart of one embodiment of calculating the PSF in accordance with certain embodiments. While the camera is in preview mode 480, the camera continuously acquires preview images 482, and calculates exposure and focus and displays the composition. When such an image satisfies some predefined criteria 484, the preview image is saved 486. As explained below, such criteria are preferably defined based on image quality and/or chronological considerations. Among the criteria may be to always save the last image. More advanced image quality criteria may include analysis as to whether the preview image itself has too much motion blurring. As an alternative to saving a single image, multiple images may be saved 489. The newest preview image may be added to a list replacing the oldest one, at 490 and 491 of FIG. 6. The definition of oldest can be chronological, as in First In First Out or FIFO. Alternatively it can be the image that least satisfies criteria as defined in stage 484. The process continues at 488, until the shutter release is fully pressed 492, or the camera is turned off.

The criteria 484 that a preview image is determined to satisfy can vary depending on specific implementations of the process. In one embodiment, such criteria may be whether the image is not blurred. This is based on the assumption that even if a camera is constantly moving, being hand held by the user, there are times where the movement is zero, whether because the user is firmly holding the camera or due to change of movement direction the movement speed is zero at a certain instance. Such criteria may not need to be absolute. In addition such criteria may be based on one or more 1-dimensional vectors as opposed to a full two dimensional image. In other words, the criteria 484 may be satisfied if the image is blurred horizontally, but no vertical movement is recorded and vice versa, due to the fact that the motion may be mathematically described in orthogonal vectors, thus separable. More straight forward criteria will be chronological, saving images every predefined time which can be equal or slower to the speed the preview images are generated. Other criteria may be defined such as related to the exposure, whether the preview reached focus, whether flash is being used, etc.

Finally, the full resolution image is acquired at 492 is saved at 494. After the full resolution image is saved 494, it is loaded into memory 495 and the preview image or images are loaded into memory as well at 496 of FIG. 6. Together the preview and final images are the input of the process which calculates the PSF 498.

Figure 7A:
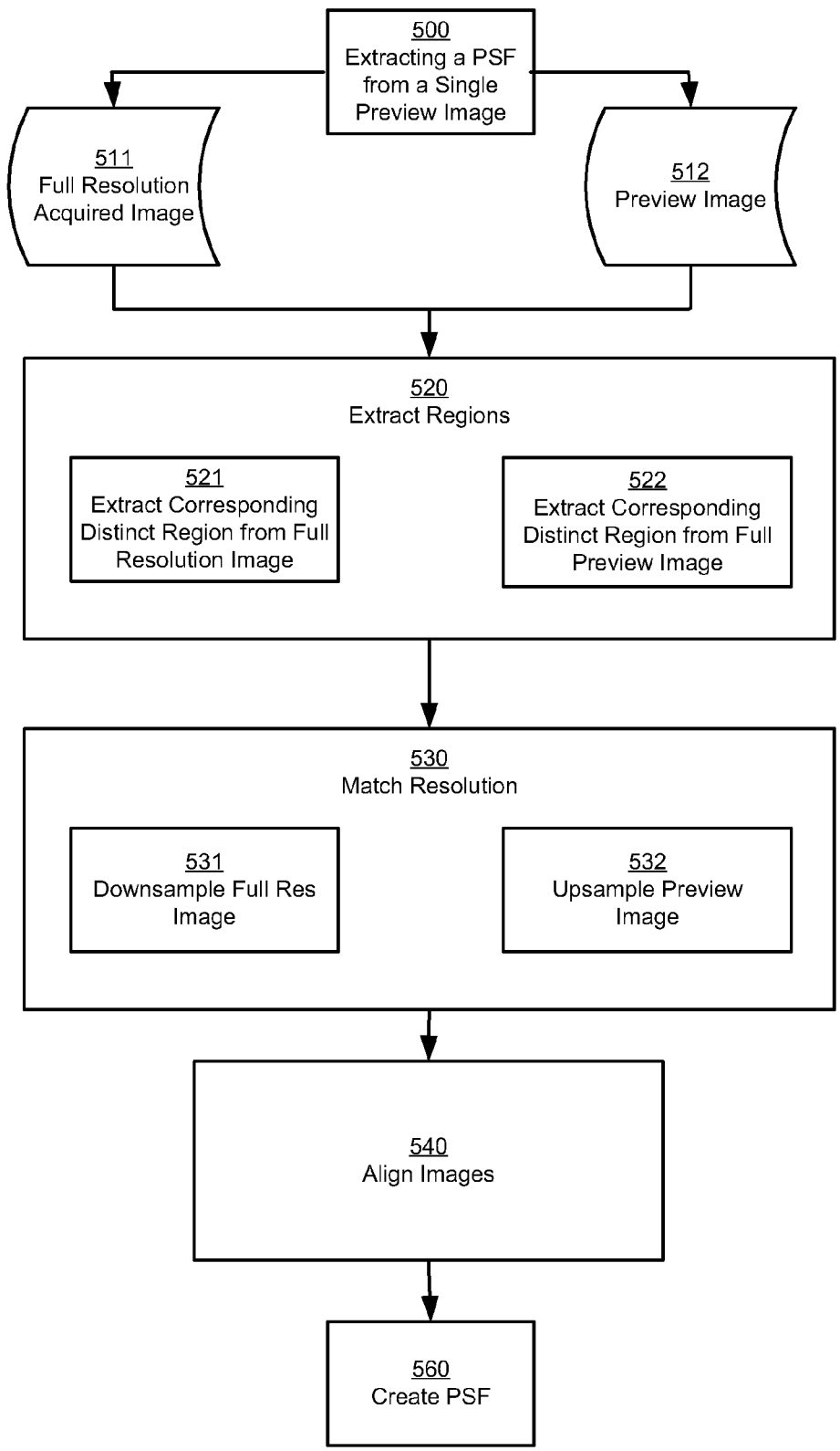
FIGS. 7A-7B are workflows illustrating further embodiments.
Figure 7B:
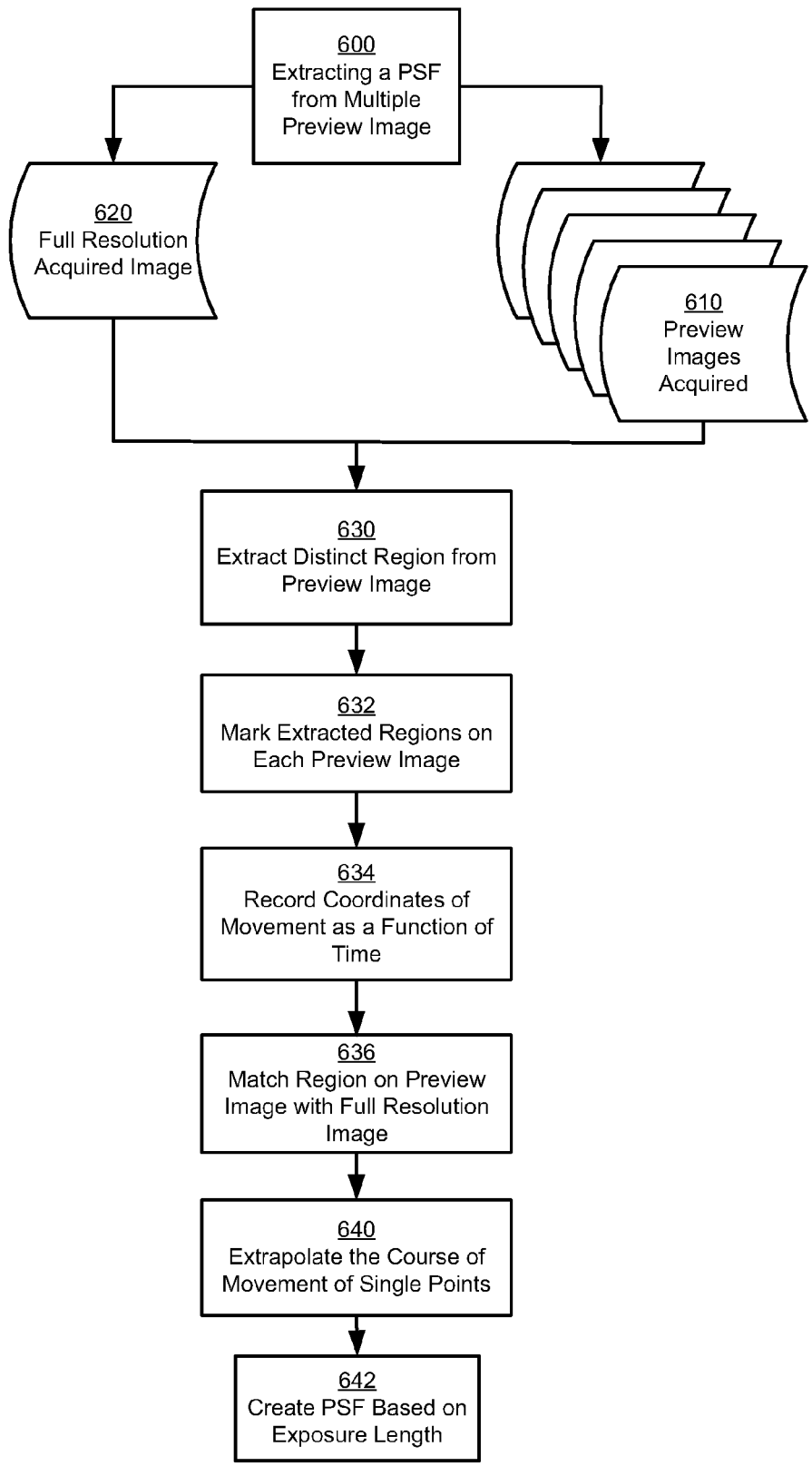

A description of two different methods of calculating PSF is provided with reference to FIGS. 7a-7b. FIG. 7a shows an embodiment 500 for extracting a PSF using a single preview image. In this embodiment, the input is the finally acquired full resolution image 511, and a saved preview image 512. Prior to creating the PSF, the preview and final image have to be aligned. The alignment can be a global operation, using the entire images, 511 and 512. However, the two images may not be exact for several reasons.

Due to the fact that the preview image and the final full resolution image differ temporally, there may not be a perfect alignment. In this case, local alignment, based on image features and using techniques known to those skilled in the art, will normally be sufficient. The process of alignment may be performed on selected extracted regions 520, or as a local operation. Moreover, this alignment is only required in the neighborhood of the selected region(s) or feature(s) used for the creation of the PSF. In this case, matching regions of the full resolution and preview image are extracted, 521 and 522. The process of extraction of such regions may be as simple as separating the image into a grid, which can be the entire image, or fine resolution regions. Other more advanced schemes will include the detection of distinct regions of interest based on a classification process, such as detecting regions with high contrast in color or exposure, sharp edges or other distinctive classifiers that will assist in isolating the PSF. One familiar in the art is aware of many algorithms for analyzing and determining local features or regions of high contrast; frequency transform and edge detection techniques are two specific examples that may be employed for this step, which may further include segmentation, feature extraction and classification steps.

The preview image 512 is normally, but not necessarily, of lower resolution than the full resolution image 511, typically being generated by clocking out a subset of the sensor cells or by averaging the raw sensor data. Therefore, the two images, or alternatively the selected regions in the images, need to be matched in pixel resolution, 530. In the present context "pixel resolution" means the size of the image, or relevant region, in terms of the number of pixels constituting the image or region concerned. Such a process may be done by either upsampling the preview image, 532, downsampling the acquired image, 531, or a combination thereof. Those familiar in the art will be aware of several techniques best used for such sampling methods.

Now we recall from before that:
A two dimensional image I is given as I(x,y).
A motion point spread function describing the blurring of image I is given as MPSF(I).
The degraded image I'(x,y) can be mathematically defined as the convolution of I(X,Y) and MPSF(x,y) or $$I'(x,y) = I(x,y) \otimes MPSF(x,y) \qquad \text{(Eq. 1)}$$

Now it is well known that where a mathematical function, such as the aforementioned MPSF(x,y), is convoluted with a Dirac delta function δ(x,y) that the original function is preserved. Thus, if within a preview image a sharp point against a homogenous background can be determined, it is equivalent to a local occurrence of a 2D Dirac delta function within the unblurred preview image. If this can now be matched and aligned locally with the main, blurred image I(x,y) then the distortion pattern around this sharp point will be a very close approximation to the exact PSF which caused the blurring of the original image I(x,y). Thus, upon performing the alignment and resolution matching between preview and main images the distortion patterns surrounding distinct points or high contrast image features, are, in effect, representations of the 2D PSF, for points and representation of a single dimension of the PSF for sharp, unidirectional lines.

The PSF may be created by combining multiple regions. In the simple case, a distinguished singular point on the preview image and its corresponding motion blurred form of this point which is found in the main full-resolution image is the PSF.

However, as it may not always be possible to determine, match and align, a single distinct point in both preview and full resolution image, it is alternatively possible to create a PSF from a combination of the orthogonal parts of more complex features such as edges and lines. Extrapolation to multiple 1-D edges and corners should be clear for one familiar in the art. In this case multiple line-spread-functions, depicting the blur of orthogonal lines need to be combined and analysed mathematically in order to determine a single-point PSF.

Due to statistical variances this process may not be exact enough to distinguish the PSF based on a single region. Therefore, depending on the processing power and required accuracy of the PSF, the step of finding the PSF may include some statistical pattern matching or statistical combination of results from multiple regions within an image to create higher pixel and potentially sub pixel accuracy for the PSF.

As explained above, the PSF may not be shift invariant. Therefore, the process of determining the right PSF may be performed in various regions of the image, to determine the variability of the PSF as a function of location within the image.

FIG. 7b shows a method 600 of extrapolating a PSF using multiple preview images.

In this embodiment, the movement of the image is extrapolated based on the movement of the preview images. According to FIG. 7b, the input for this stage is multiple captured preview images 610, and the full resolution image 620. All images are recorded with an exact time stamp associated with them to ensure the correct tracking. In most cases, preview images will be equally separated, in a manner of several images per second. However, this is not a requirement for this embodiment as long as the interval between images, including the final full resolution image, is known.

One or more distinctive regions in a preview image are selected, 630. By distinctive, one refers to a region that can be isolated from the background, such as regions with noticeable difference in contrast or brightness. Techniques for identifying such regions are well known in the art and may include segmentation, feature extraction and classification.

Each region is next matched with the corresponding region in each preview image, 632. In some cases not all regions may be accurately determined on all preview images, due to motion blurring or object obscurations, or the fact that they have moved outside the field of the preview image. The coordinates of each region is recorded, 634, for the preview images and, 636, for the final image.

Knowing the time intervals of the preview images, one can extrapolate the movement of the camera as a function of time. When the full resolution image 620 is acquired, the parameter that needs to be recorded is the time interval between the last captured preview image and the full resolution image, as well as the duration of the exposure of the full resolution image. Based on the tracking before the image was captured, 634, and the interval before and duration of the final image, the movement of single points or high contrast image features can be extrapolated, 640, to determine the detailed motion path of the camera.

Figure 8:
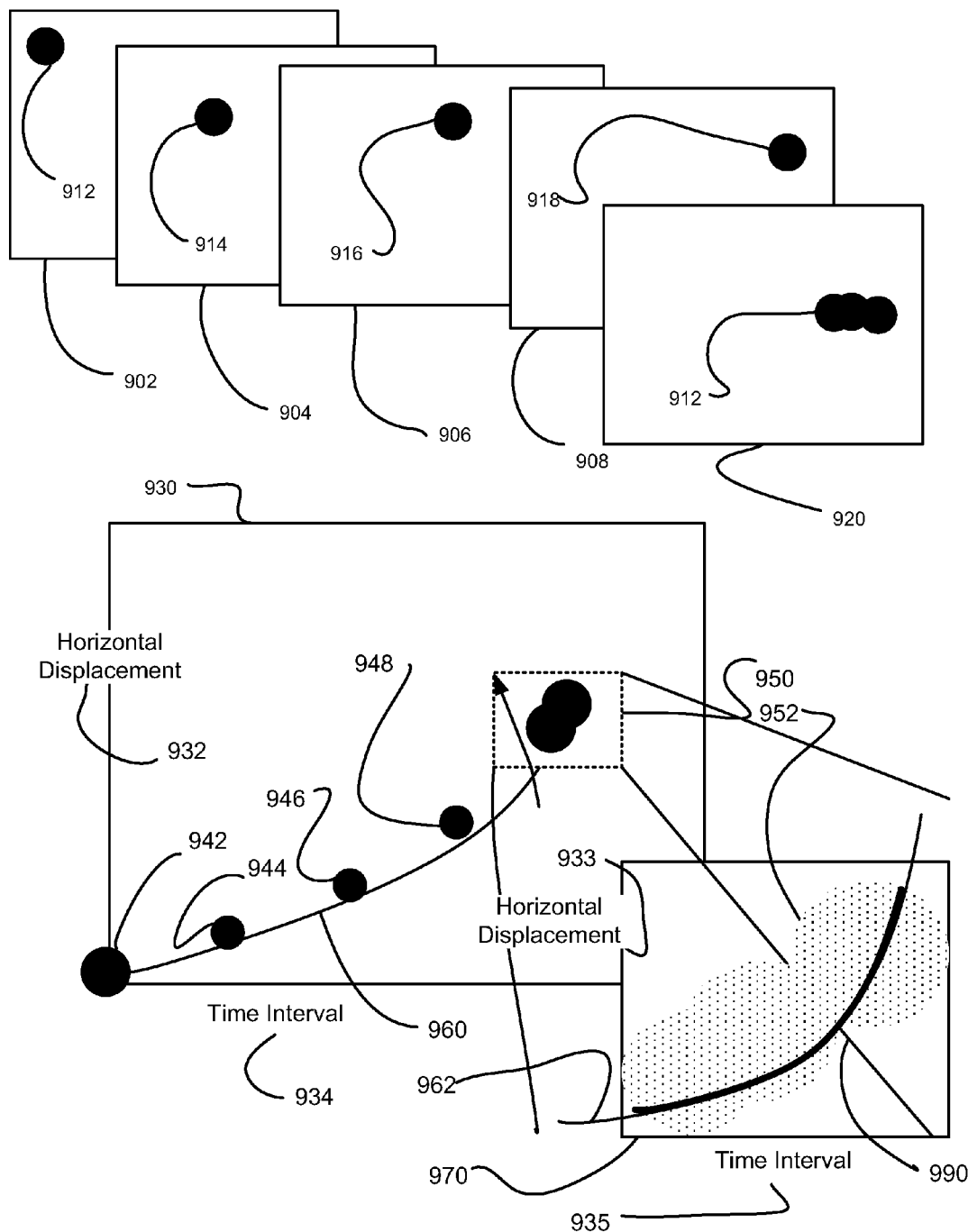
FIGS. 8, 9, and 10 are motion diagrams which assist in the understanding of the previous embodiment.

This process is illustrated in FIG. 8. According to this figure multiple preview images 902, 904, 906, 908 are captured. In each of them a specific region 912, 914, 916, 918 is isolated which corresponds to the same feature in each image. The full resolution image is 910, and in it the regions corresponding to 912, 914, 916, 918 are marked as 920. Note that 920 may be distorted due to motion blurring.

Tracking one dimension as a function of time, the same regions are illustrated in 930 where the regions are plotted based on their displacement 932, as a function of time interval 932. The objects 942, 944, 946 948 and 950 correspond to the regions 912, 914, 916, 918 and 920.

The motion is calculated as the line 960. This can be done using statistical interpolation, spline or other curve interpolation based on discrete sampling points. For the final image, due to the fact that the curve may not be possible to calculate, it may also be done via extrapolation of the original curve, 960.

The region of the final acquired image is enlarged 970 for better viewing. In this plot, the blurred object 950 is depicted as 952, and the portion of the curve 690 is shown as 962. The time interval in this case, 935 is limited to the exact length in which the exposure is being taken, and the horizontal displacement 933, is the exact horizontal blur. Based on that, the interpolated curve, 952, within the exposure time interval 935, produces an extrapolation of the motion path 990.

Now, an extrapolation of the motion path may often be sufficient to yield a useful estimate of the PSF if the motion during the timeframe of the principle acquired image can be shown to have practically constant velocity and practically zero acceleration. As many cameras now incorporate sensitive gyroscopic sensors it may be feasible to determine such information and verify that a simple motion path analysis is adequate to estimate the motion blur PSF.

Figure 9:
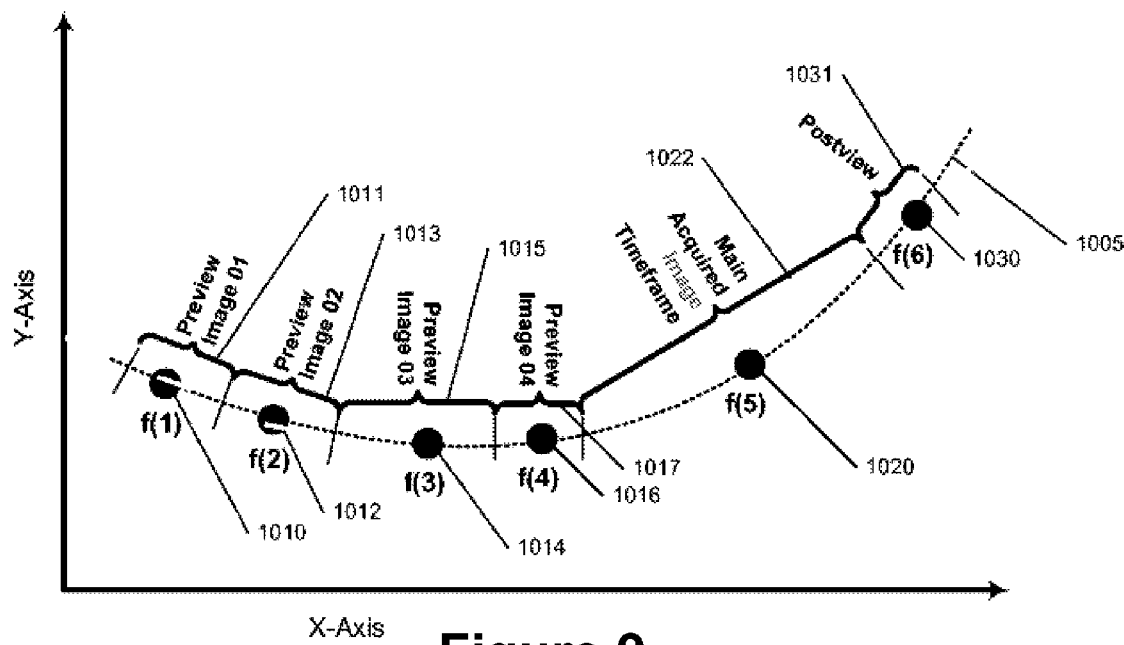
Figure 10:
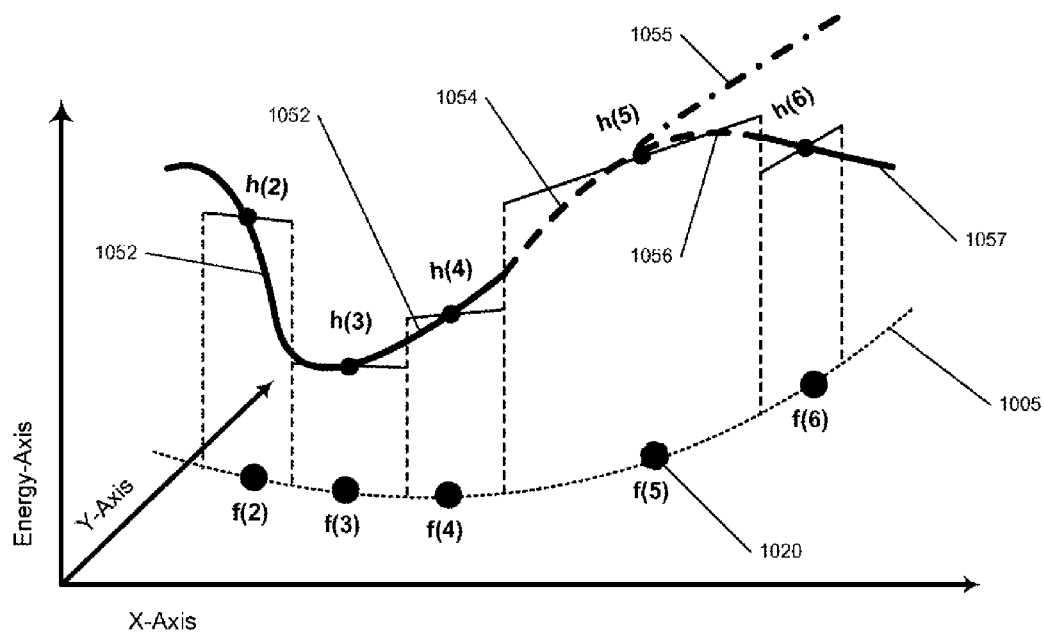

However when this is not the case (or where it is not possible to reliably make such a determination) it is still possible to estimate the detailed motion blur PSF from a knowledge of the time separation and duration of preview images and a knowledge of the motion path of the camera lens across an image scene. This process is illustrated in FIGS. 9 and 10 and will now be described in more detail.

Any PSF is an energy distribution function which can be represented by a convolution kernel k(x,y)→w where (x,y) is a location and w is the energy level at that location. The kernel k must satisfy the following energy conservation $$\iint k(x,y)dxdy=1,$$

constraint:

which states that energy is neither lost nor gained by the blurring operation. In order to define additional constraints that apply to motion blur PSFs we use a time parameterization of the PSF as a path function, f(t)→(x,y) and an energy function h(t)→w. Note that due to physical speed and acceleration constraints, f(t) should be continuous and at least twice differentiable, where f'(t) is the velocity of the (preview) image frame and f"(t) is the acceleration at time t. By making the assumption that the scene radiance does not change during image acquisition, we get the additional constraint:

$$\int_{t}^{t+\delta t} h(t)\,dt = \frac{\delta t}{t_{end}-t_{start}},$$

$$\delta t > 0, t_{start} \le t \le t_{end} - \delta t,$$

where $[t_{start}, t_{end}]$ is the acquisition interval for a (preview) image. This constraint states that the amount of energy which is integrated at any time interval is proportional to the length of the interval.

Given these constraints we can estimate a continuous motion blur PSF from discrete motion samples as illustrated in FIGS. 9 and 10. First we estimate the motion path, f(t), by spline interpolation as previously described above and as illustrated in FIG. 8. This path [1005] is further illustrated in FIG. 9.

Now in order to estimate the energy function h(t) along this path we need to determine the extent of each image frame along this interpolated path. This may be achieved using the motion centroid assumption described in Ben-Ezra et al and splitting the path into frames with a 1-D Voronoi tessellation as shown in FIG. 9. Since the assumption of constant radiance implies that frames with equal exposure times will integrate equal amounts of energy, we can compute h(t) for each frame as shown in FIG. 10. Note that as each preview frame will typically have the same exposure time thus each rectangle in FIG. 10, apart from the main image acquisition rectangle will have equal areas. The area of the main image rectangle, associated with capture frame 5 [1020] in this example, will typically be several time larger than preview image frames and may be significantly more than an order of magnitude larger if the exposure time of the main image is long.

The resulting PSF determined by this process is illustrated in FIG. 10 and may be divided into several distinct parts. Firstly there is the PSF which is interpolated between the preview image frames [1052] and shown as a solid line; secondly there is the PSF interpolated between the last preview image and the midpoint of the main acquired image [1054]; thirdly there is the extrapolation of the PSF beyond the midpoint of the main acquired image [1055] which, for a main image with a long exposure time—and thus more susceptible to blurring—is more likely to deviate from the true PSF. Thus it may be desirable to acquire additional postview images, which are essentially images acquired through the same in-camera mechanism as preview images except that they are acquired after the main image has been acquired. This technique will allow a further interpolation of the main image PSF [1056] with the PSF determined from at least one postview image.

The process may not be exact enough to distinguish the PSF based on a single region. Therefore, depending on the processing power and accuracy need, the step of finding the PSF may include some statistical pattern matching of multiple regions, determining multiple motion paths, thus creating higher pixel and potentially sub pixel accuracy for the PSF.

Advantageously, a determination may be made whether a threshold amount of camera motion blur has occurred during the capture of a digital image. The determination is made based on a comparison of a least two images acquired during or proximate to the exposure period of the captured image. The processing occurs so rapidly, either in the camera or in an external processing device, that the image blur determination occurs in "real time". The photographer may be informed and/or a new image capture can take place on the spot due to this real time image blur determination feature. Preferably, the determination is made based on a calculated camera motion blur function, and further preferably, the image may be de-blurred based on the motion blur function, either in-camera or in an external processing device in real time or later on.

Dust or Other Image Artifact Detection and Correction

When either a preview or a full resolution image is acquired while the sensor is lit by the light source, the obtained calibration image will be uniform enough to allow construction of a map of dust related defects on the CCD sensor surface. Even if the CCD surface is not uniformly lit (as a consequence of an off-center LED) the non-uniformity is persistent, and can be thus accounted for in a map or a formula that can be stored (in a compressed form) in a lookup table for mapping a calibration image to a final dust map.

At any suitable time after an image has been acquired, it can be compared with a dust map to identify and/or correct defects in the image resulting from sensor defects. Where camera click-to-click interval is critical, this processing is likely to be performed in the background during periods of camera inactivity. It is also possible that the dust map could be used both to analyze and correct low resolution preview or post-view images as well as full resolution acquired images.

Detection and correction of digital image artifacts that appear in images acquired by compact digital still cameras due to the flash reflection on airborne dust particles (or small waterborne particles in underwater photography) that are placed out of focus. An exemplary method uses a preview image (or other reference image), taken without flash just before (or during or just after) the acquisition of the actual image.

Artifacts may appear in the digital image taken with flash. The overall shape may be semi-transparent round areas, encompassed by a brighter outer edge. Within the artifact area the original content of the image is shaded, as the "orbs" inside is matted and slightly textured.

The main approach of detecting dust artifacts is based on the extraction of edges from image luminance components and a search of circular frontiers, and/or thresholding of a color image in the luminance and saturation domains, and selecting regions that are relatively bright and slightly unsaturated. The computation of the local contrast (within the luminance component) could also be used.

A different approach may be used to detect orb artifacts. These could be obtained as a last preview image acquired of a scene. Since the preview is taken without flash, it offers a clean version of the scene, providing a baseline of the image content. Obtaining such a baseline image implies the color calibration of the preview image to the final image, based on a linear transformation of the RGB color channels. The transformation is to be obtained by a minimal mean square error matching of colors selected from the preview and the final images in uniform regions at the same spatial location. These same preview or other reference images may be used in other applications, e.g., to detect red eye in images. The concept of the preview with no flash that has no artifact and the one with flash that has artifact is similar. Airborne artifacts may also be detected and corrected using this process.

Red-Eye Detection and Correction

A digital image acquisition device 1100 is provided. An imaging optic and detector are for acquiring digital images including one or more preview, postview or other reference images and a main image. A face detector module 1110 is for analyzing the one or more preview or other reference images to ascertain information relating to candidate face regions therein. An image generating module 1120 is for programming the processor to generate a sub-sampled version of the main image. A first speed-optimized red-eye filter 1122 is for programming the processor to produce a first set of candidate red-eye regions in a sub-sampled version 1124 of the main image 1126 based on the candidate face region information provided by the face detector 1110.

An analysis-optimized red eye filter 1128 is for later analysis of a full resolution version of the main image based in part on the previous analysis. The one or more preview images may include a sub-sampled version of an acquired image.

One convenient approach to pre-determine image regions which have a high probability of containing red-eye candidates is to perform pre-processing on a set of preview images. Many state-of-art digital cameras acquire such a stream of images captured at video rates of 15-30 frames per second (fps) at a lower resolution than that provided by the main image acquisition architecture and/or programming. A set of 320×240, or QVGA images is typical of many consumer cameras and the size and frame-rate of this preview images stream can normally be adjusted within certain limits.

Figure 11:
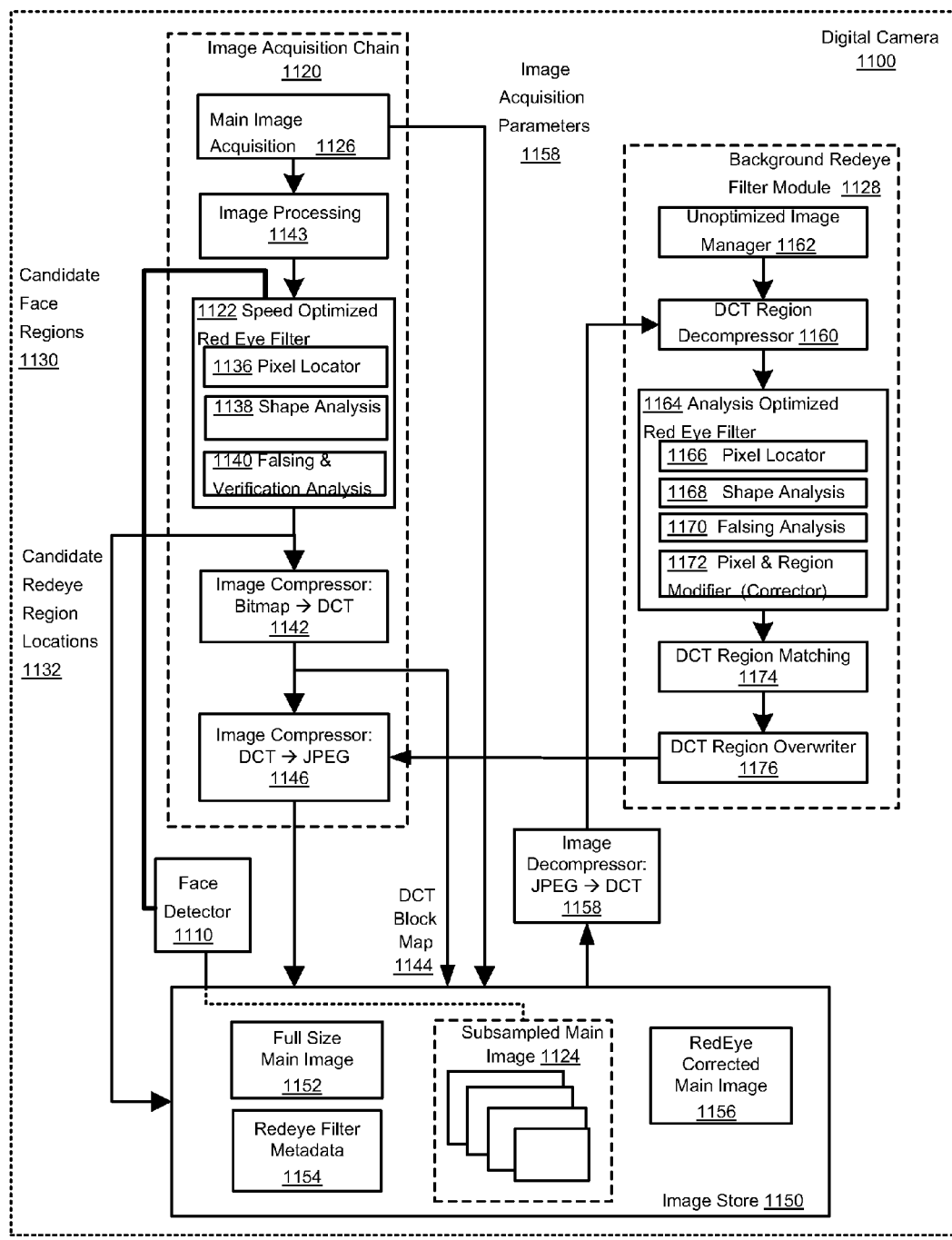
FIG. 11 illustrates a functional implementation of modified redeye filtering process according to another embodiment.

In one embodiment, as illustrated in FIG. 11, the digital camera includes a face detector 1110 which operates on the preview image stream 1124. The face detector 1110 may have two principle modes: (i) a full image search mode to detect (and confirm) new face-candidate regions 1130; and (ii) a main tracking mode (1132) which predicts and then confirms the new location of existing face-candidates in subsequent frames of the image stream and compiles statistical information relating to each such confirmed candidate region. Both modes can employ a variety of methods including face detection, skin region segmentation, feature detection including eye and mouth regions, active contour analysis and even non-image based inputs such as directional voice analysis (e.g. US 2005/0147278 to Rui et al which describes a system for automatic detection and tracking of multiple individuals using multiple cues). As the first mode, hereafter referred to as the "seeding mode" is applied to the entire image, it is computationally more intensive and is only applied occasionally, e.g., every 30-60 image frames. As such, new faces appearing in the image will still be detected within a couple of seconds which is sufficient for most consumer applications. The second mode is preferably applied to every image frame, although not all of the analysis cues may be applied on every frame.

Thus in normal operation only the output(s) from the second operational mode of a face tracker algorithm will be available after every frame of the preview image stream. There may be three principle outputs from this second mode: (i) a list of candidate face regions which are confirmed to still contain faces; and/or (ii) a set of data associated with each such confirmed face region including its location within that frame of the image and various additional data determined from a statistical analysis of the history of said confirmed face region; and/or (iii) a predicted location for each such confirmed face region in the next frame of the preview image stream. If item (ii) is used, item (iii) can be optional as sufficient data may be provided by item (ii) for a determination of predicted location.

These outputs from the preview face detector 1110 enable the speed optimized red-eye detector 1122 to be applied selectively to face regions 1130 where it is expected that a red-eye defect will be found. The speed optimized filter 1122 may include a pixel locator 1136, a shape analyzer 1138 and/or falsing and verification analysis 1140. Other image processing may be performed 1143 including other image processing described herein, e.g., blur processing, face analysis, quality analysis, foreground/background processing, chrominance or luminance enhancement, and/or various others.

As further illustrated at FIG. 11, an image compressor bitmap DCT 1142 may be followed by generated a DCT block map 1144, and/or an image compressor DCT JPEG 1146 may be provided. An image store 1150 may include full size main image 1152, red eye filter meta data 1154, sub-sampled main images 1124 and red eye corrected main images 1156. Image acquisition parameters 1158 may also be used in this process. An image decompressor JPEG DCT 1158 may lead to a DCT region decompressor 1160 of background red eye filter module 1128. These may be controlled by unoptimized image manager 1162. The module 1128 includes an analysis optimized red eye filter 1164 preferably including pixel locator 1166, shape analyzer 1168, falsing analyzer 1170 and pixel and region modifier 1172. DCT region matching 1174 may be following by DCT region overwriting 1176, which may be followed by image compressor DCT JPEG 1146

A face detector may be first applied to an image prior to the application of a red-eye filter (see, e.g. US 20020172419 to Lin et al; US 20020126893 to Held et al; US 20050232490 to Itagaki et al and US 20040037460 to Luo et al.). Under normal circumstances, however, there is not sufficient time available during the main image acquisition chain, which is operable within a digital camera, to allow the application of face detector prior to the application of a red-eye filter. An advantageous embodiment overcomes this disadvantage by employing a predictive output of a face tracker module 1110. Although the size of the predicted region will typically be larger than the size of the corresponding face region, it is still significantly smaller than the size of the entire image. Thus, advantages of faster and more accurate detection can be achieved within a digital camera or embedded image acquisition system without the need to operate a face detector 1110 within the main image acquisition chain.

Note that where multiple face candidate regions 1130 are tracked, then multiple predicted regions will have the speed-optimized red-eye filter 1122 applied.

Figure 12:
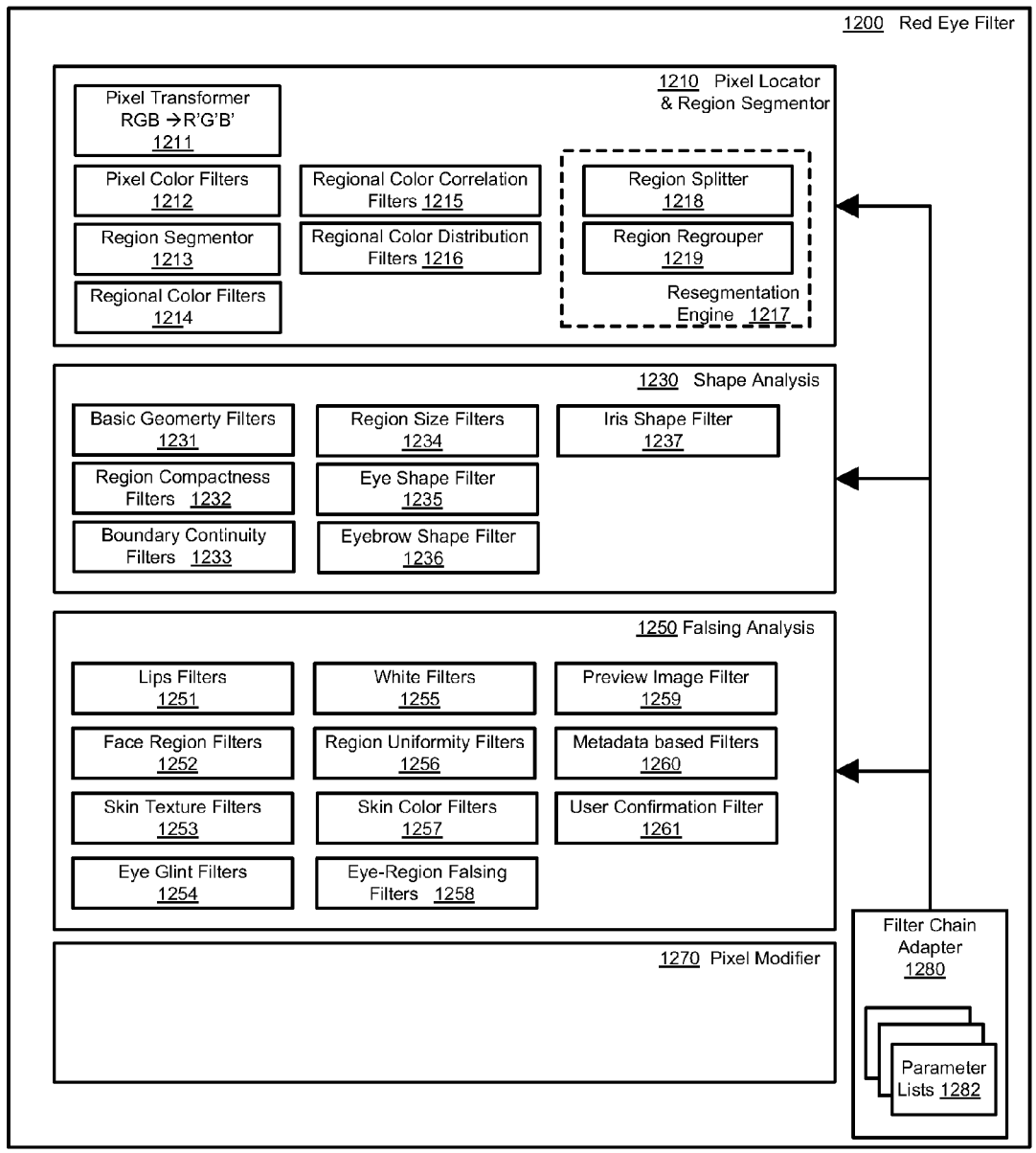
FIG. 12 illustrates a redeye filter chain of a red eye detection system in accordance with another embodiment.

FIG. 12 illustrates principle subfilter categories which may exist within a main redeye filter 1200, including pixel locator and region segmentor 1210, shapr analyzer 1230, falsing analyzer 1250 and pixel modifier 1270, as well as filter chain adapter 1280. While each of the component filters will be referred to in sequence, it will be appreciated that where appropriate more than one of these filters may be applied at a given time and the decisions above to modify the filter chain can include a decision not alone as to which filters may be executed in a sequence, but also on which filters can be applied in parallel sequences. As described above, the pixel locator and region segmentor 1210 includes pixel transformer filter 1211 which allows global pixel-level transformations of images during color determining and pixel grouping operations. Also, within the pixel locator and region segmentor 1210, there are one or more pixel color filters 1212 which perform initial determination of whether a pixel has a color indicative of a flash eye defect. There is also a region segmentor 1213 which segments pixels into candidate redeye groupings, as well as one or more regional color filters 1214, regional color correlation filters 1215, and regional color distribution filters 1216 which operate on candidate regions based on these respective criteria. In addition, the pixel locator and region segmentor 1210 preferably includes a resegmentation engine 1217 including two additional functional blocks which do not contribute directly to the color determining and segmentation operations but are nevertheless intertwined with the operation of the pixel locator and region segmentor 1210. The resegmentation engine 1217 is a functional block which is particularly useful for analyzing difficult eye defects. It allows region splitting 1218 and region regrouping 1219 for borderline candidate regions based on a variety of threshold criteria.

After candidate eye-defect groupings have been determined by the segmentor 1210, a shape analyzer 1230 next applies a set of subfilters to determine if a particular candidate grouping is physically compatible with known eye-defects. Thus some basic geometric filters 1231 are first applied followed by one or more additional region compactness filters 1232, as well as one or more boundary continuity filters 1233. Further determining is then performed by one or more region size filters 1234, and a series of additional filters then determine if neighboring features exist which are indicative of eye shape 1235, eyebrows 1236 and iris regions 1237. In certain embodiments, the redeye filter may additionally use anthropometric data to assist in the accurate determining of such features.

Now the remaining candidate regions are passed to a falsing analyzer 1250 which includes a range of subfilter groups which eliminate candidate regions based on a range of criteria including lips filters 1251, face region filters 1252, skin texture filters 1253, eye-glint filters 1254, white region filters 1255, region uniformity filters 1256, skin color filters 1257, and eye-region falsing filters 1258. Further to these standard filters a number of specialized filters may also be included as part of the falsing analyzer 1250. In particular, a category of filter may be based on the use of acquired preview images, i.e., a preview image filter 1259, which can determine if a region was red prior to applying a flash. This particular preview filter 1259 may also be incorporated as part of the initial region determining process 1210, as described in co-pending U.S. application Ser. No. 10/919, 226 from August, 2004 entitled "Red-Eye Filter Method And Apparatus". An additional category of falsing filter employs image metadata determined from the camera acquisition process, as metadata based filters 1260. This category of filter can be particularly advantageous when combined with anthropometric data as described in PCT Application No. PCT/EP2004/008706. An additional category of filter may be a user confirmation filter 1261 which can be optionally used to request a final user input at the end of the detection process. This filter can be activated or disabled based on how sub-optimal the quality of an acquired image is, and the amount, if any, of user involvement that is desired not desired.

The pixel modifier 1270 works with the correction of confirmed redeye regions. Where an embodiment incorporates a face recognition module, then the pixel modifier 1270 may advantageously employ data from an in-camera known person database (not shown) to indicate aspects of the eye color of a person in the image. This can have great benefit as certain types of flash eye-defects in an image can destroy indications of original eye color.

In another embodiment, an additional component of a redeye filter 1200 may be a filter chain adapter 1280. This component 1280 is responsible for combining, and sequencing the subfilters of the redeye filter 1200 and for activating each filter with a set of input parameters corresponding to parameter list(s) 1282 supplied from an image compensation prefilter.

In further regard to FIG. 12, the pixel locator & region segmentor 1210, the shape analyzer 1230 and the falsing analyzer 1250 are illustrated as separate components, however it is not intended to exclude the possibility that subfilters from these components may be applied in out-of-order sequences. As an illustrative example, regions which pass all the falsing filters except for the region uniformity filter 1256 may be returned to the resegmentation engine 1217 to determine if the region was incorrectly segmented. Thus a subfilter from the pixel locator and region segmentor 1210 may be used to add an additional capability to the falsing analysis 1250.

Image Quality Processing

A method is provided for disqualifying an unsatisfactory scene as an image acquisition control for a camera. An analysis of the content of the captured image determines whether the image should be acquired or discarded. One example includes human faces. It may be determined whether an image is unsatisfactory based on whether the eyes are closed, partially closed or closing down or moving up during a blinking process. Alternatively, other non-desirable or unsatisfactory expressions or actions such as frowning, covering one's face with a hand or other occluding or shadowing of a facial feature or other key feature of a scene, or rotating the head away from the camera, etc., may be detected.

A present image of a scene is captured including a face region. One or more groups of pixels is/are identified corresponding to the region of interest, such as an eye region, or a mouth within the face region.

In the case of blink detection, it is determined whether the eye region is in a blinking process. If so, then the scene is disqualified as a candidate for a processed, permanent image while the eye is completing the blinking.

The present image may include a preview image, and the disqualifying may include delaying full resolution capture of an image of the scene. The delaying may include ending the disqualifying after a predetermined wait time.

A preview image may be used. This can provide an indication of a region of interest (ROI) where the eyes may be in the captured image. This provides a fast search in the final image of the mouth or eyes based on spatial information provided from the analysis of preview images.

The delaying may include predicting when the blinking will be completed and ending the disqualifying at approximately the predicted blink completion time. The predicting may include determining a point of a complete blinking process the scene is at, and calculating a remainder time for completion of the blinking. The calculating may include multiplying a fraction of the complete blinking process remaining times a predetermined complete blinking process duration. The predetermined complete blinking process duration may be programmed based on an average blinking process duration and/or may be determined based on estimating a time from a beginning of the blinking to the present and in view of the fraction representing the point of the complete blinking process the scene is at. The estimating may be based on analyzing a temporal capture parameter of one or more previous preview images relative to that of the present preview image. The fraction may be determined based on whether the eye that is blinking is opening or closing in the present preview image, and a degree to which the eye is open or shut.

The method may include determining whether the eye is blinking including determining a degree to which the eye is open or shut. The degree to which the eye is open or shut may be determined based on relatively analyzing the present preview image and one or more other preview images relatively acquired within less than a duration of a complete blinking process. The determining whether the eye is blinking may include determining a degree of blurriness of one or both eye lids. It may be determined what portion of a pupil, an iris, one or both eye lids or an eye white that is/are showing, or combinations thereof. A color analysis of the eye may be performed and differentiating pixels corresponding to an eye lid tone from pixels corresponding to an iris tone or pupil tone or eye white tone, or combinations thereof. A shape analysis of the eye may be performed and pixels differentiated as corresponding to an eye lid shape contrast with those corresponding to an iris shape or pupil shape or eye white shape, or combinations thereof.

The present image may include a full resolution capture image. The disqualifying may include foregoing further processing of the present image. It may be determined whether the eye is blinking including determining a degree to which the eye is open or shut. This may include relatively analyzing the present preview image and one or more other preview images relatively acquired within less than a duration of a complete blinking process. The determination of whether the eye is blinking may be based on determining a degree of blurriness of one or both eye lids.

The method may include determining a portion of a pupil, an iris, one or both eye lids or an eye white that is/are showing, or combinations thereof. A color analysis of the eye may be performed and pixels differentiated as corresponding to an eye lid tone contrasted with pixels corresponding to an iris tone or pupil tone or eye white tone, or combinations thereof. A shape analysis of the eye may be performed and pixels differentiated as corresponding to an eye lid shape contrasted with pixels corresponding to an iris shape or pupil shape or eye white shape, or combinations thereof.

The present image may include a full resolution capture image. The method may include assembling a combination image including pixels from the present image and open-eye pixels corresponding to the eye that is blinking from a different image. The different image may include a preview image or a post-view image or another full resolution image. The different image may include a lower resolution than the present image, and the assembling may include upsampling the different image or downsampling the present image, or a combination thereof. The method may also include aligning the present image and the different image, including matching an open-eye pixel region to a blinking eye region in the present image.

A further method is provided for automatically disqualifying an unsatisfactory scene as an image acquisition control of a camera. The method includes acquiring multiple preview images. Information is extracted from the multiple preview images. One or more changes is/are analyzed in the scene between individual images of the multiple temporary images. Based on the analyzing, it is determined whether one or more unsatisfactory features exist within the scene. The scene is disqualified as a candidate for a processed, permanent image while the one or more unsatisfactory features continue to exist.

One or more processor readable storage devices having processor readable code embodied thereon are also provided. The processor readable code is for programming one or more processors to perform a method of disqualifying an unsatisfactory scene as an image acquisition control for a camera, as set forth herein above or below. The processor may be embedded as part of the camera or external to the acquisition device. The acquisition device may be a hand held camera, a stationary camera, a video camera, a mobile phone equipped with a acquisition device, a hand held device equipped with a acquisition device, a kiosk booth, such as ones used for portraits, a dedicated portrait camera such as one used for security or identifications or generically, any image capture device.

An image may be generated as a combination of a present image, and a preview, post-view or other full resolution image. For example, the combination image may include a face region and some background imagery, wherein one or both eye regions, which are unsatisfactorily closed or partially closed in the present image, are replaced with one or both open eyes from the preview, post-view or other full resolution image. This feature may be combined with features presented in U.S. patent application Ser. No. 10/608, 776. In the '776 application, a method of digital image processing using face detection is described. A group of pixels is identified that corresponds to a face within a digital image. A second group of pixels is identified that corresponds to another feature within the digital image. A re-compositioned image is determined including a new group of pixels for at least one of the face and the other feature.

In one embodiment, the camera will take the picture right after the subject completes a blinking process. The present system can be used to disqualify an image having a subject whose eyes are closed, and can take multiple images to prevent having no images that lack blinking. One of the images will likely have eyes open for each subject person, and the pictures can have a mixture of pixels combined into a single image with no eyes blinking. The camera may decide on the number of images to take based on the number of subjects in the image. The more people, the higher the likelihood of one person blinking, thus more images should be acquired. If it is acceptable for efficiency that a certain percentage of persons may be blinking in a large group shot, e.g., that is below a certain amount, e.g., 5%, then the number of images can be reduced. These threshold numbers and percentage tolerances can be selected by a camera product manufacturer, program developer, or user of a digital image acquisition apparatus. This information may be generated based on analysis of preview images. The preview image may also assist in determining the location of the eyes, so that the post processing analysis can be faster honing into the region of interest as determined by the preview analysis.

The present system sets a condition under which a picture will not be taken or will not be used or further processed after it has already been taken, and/or where an additional image or images will be taken to replace the unsatisfactory image. Thus, another advantageous feature of a system in accordance with a preferred embodiment is that it can correct an acquired blink region with a user's eye information from a preview or post-view image or another full resolution image. The present system preferably uses preview images, which generally have lower resolution and may be processed more quickly. The present system can also look for comparison of changes in facial features (e.g., of the eyes or mouth), between images as potentially triggering a disqualifying of a scene for an image capture. In such a case, the system may distinguish between a squint which is somewhat permanent or of longer duration during the session than a blink which is more a temporary state. The system may also through a comparison of multiple images determine the difference between eyes that are naturally narrow due to the location of the upper-eye-lid or the epicanthal fold, or based on a determined nationality of a subject person, e.g., distinguishing Asian from Caucasian eyes.

Figure 13:
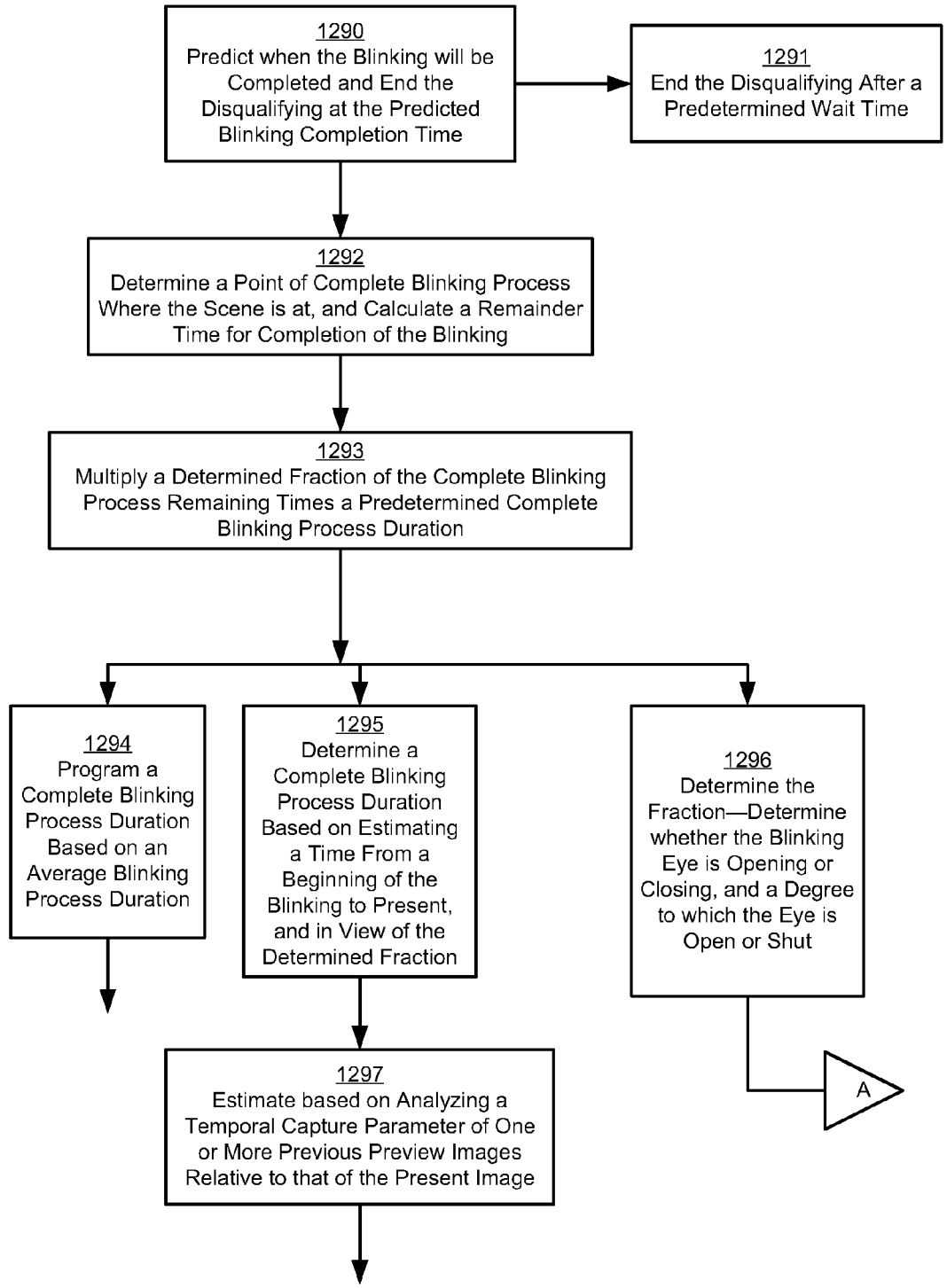
FIG. 13 illustrates a method of predicting a blinking completion time interval in accordance with a preferred embodiment.
Figure 14:
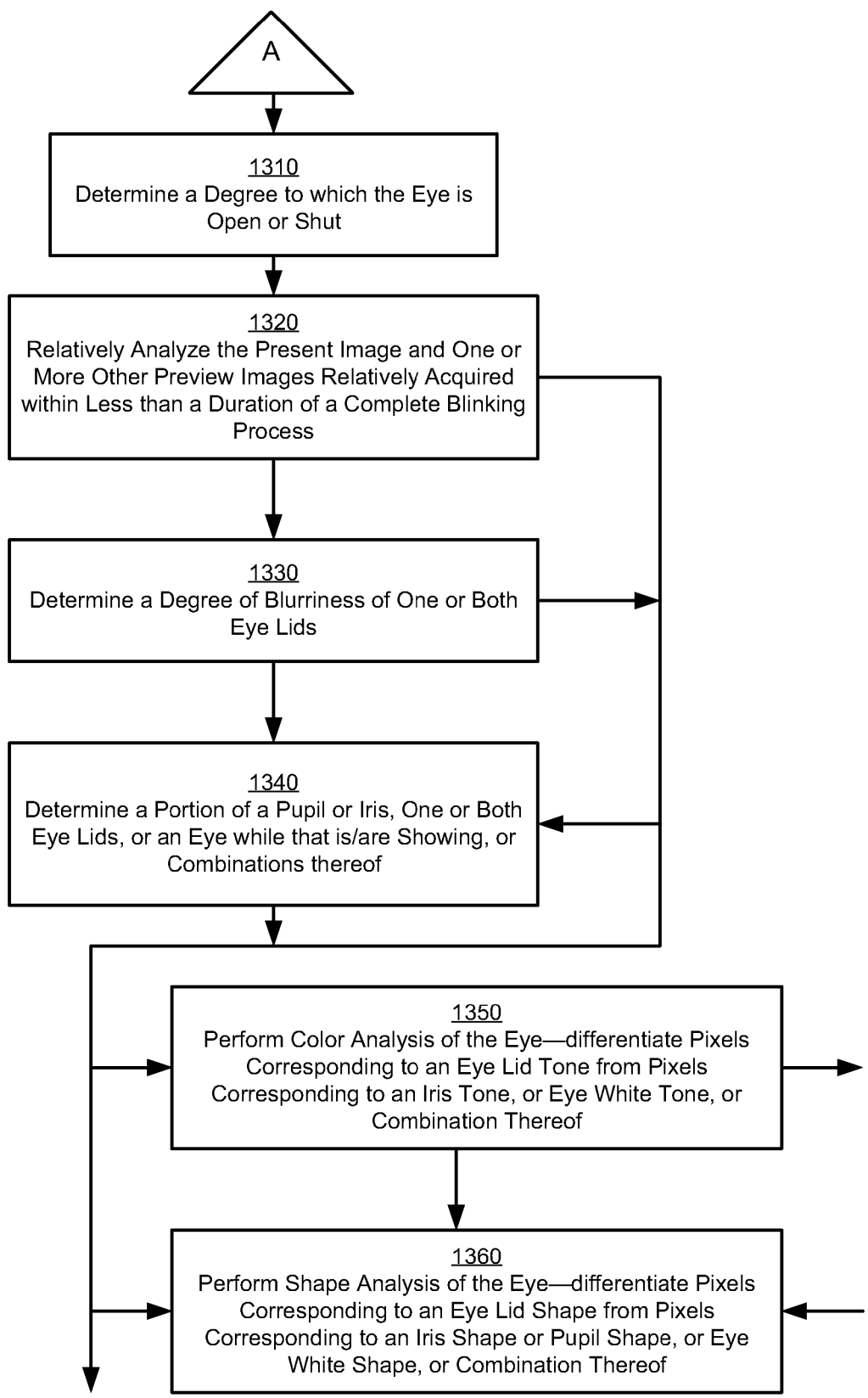
FIG. 14 illustrates a method of determining a degree to which an eye is open or shut in accordance with another embodiment.

FIGS. 13 and 14 illustrate a method of predicting a blinking completion time interval including determining a degree to which an eye is open or shut, respectively, in accordance with certain embodiments. Various options are provided at FIGS. 13 and 14 for inclusion in the process. At 1290, the process includes predicting when a blinking will be completed and ending a disqualifying at a predicted blinking completion time. This preferably includes a blinking detection sub-process. The disqualifying could be ended after a predetermined wait time at 1291, e.g., when someone may actually be asleep rather than blinking. A point at which a complete blinking process is at may be determined at 1292, and a remainder of time for completion of the blinking may be calculated. A determined fraction of a complete blinking process remaining times a predetermined complete blinking process duration may be performed at 1293. At 1294, a complete blinking process duration based on an average blinking process duration is programmed into the camera or other pre-capture or post-capture processing apparatus. At 1295, a complete blinking process duration is determined based on estimating a time from a beginning of the blinking to present, and in view of the determined fraction. For example, if the determined fraction is one third, and the time from the beginning of the blinking to present is determined to be 0.09 seconds, the complete blink time estimated to be 0.27 seconds, of which 0.18 second remain. At 1297, the estimation may be based on analyzing a temporal capture parameter of one of more previous preview images relative to that of the present image. For example, if a previous preview image shows a start of the blinking process, and the camera knows that the previous preview image was captured 0.08 seconds earlier, and the fraction is one third, then the blinking process may be predicted to end after another 0.16 seconds. At 1296, the fraction is determined, including determining whether the blinking eye is opening or closing, and further determining a degree to which the eye is open or shut.

The determining a degree to which an eye may be open or shut is further provided at 1310 of FIG. 13. To do this, the present image is preferably analyzed at 1320 relative to one or more other preview images acquired within less than a duration of a complete blinking process. An optional determination of a degree of blurriness at 1330 of one or both eye lids may facilitate a determination of blink speed. A portion of a pupil, iris, one or both eye lids or an eye white that is/are showing may be determined at 1340 to facilitate determining how open or shut the blinking eye is. Color analysis 1350 and shape analysis 1360 may also be performed to differentiate pixels corresponding to features of open eyes such as a pupil, an iris and/or an eye white, from pixels corresponding to features of shut eyes, or eye lids that would appear in an eye region of a present scene.

Figure 15:
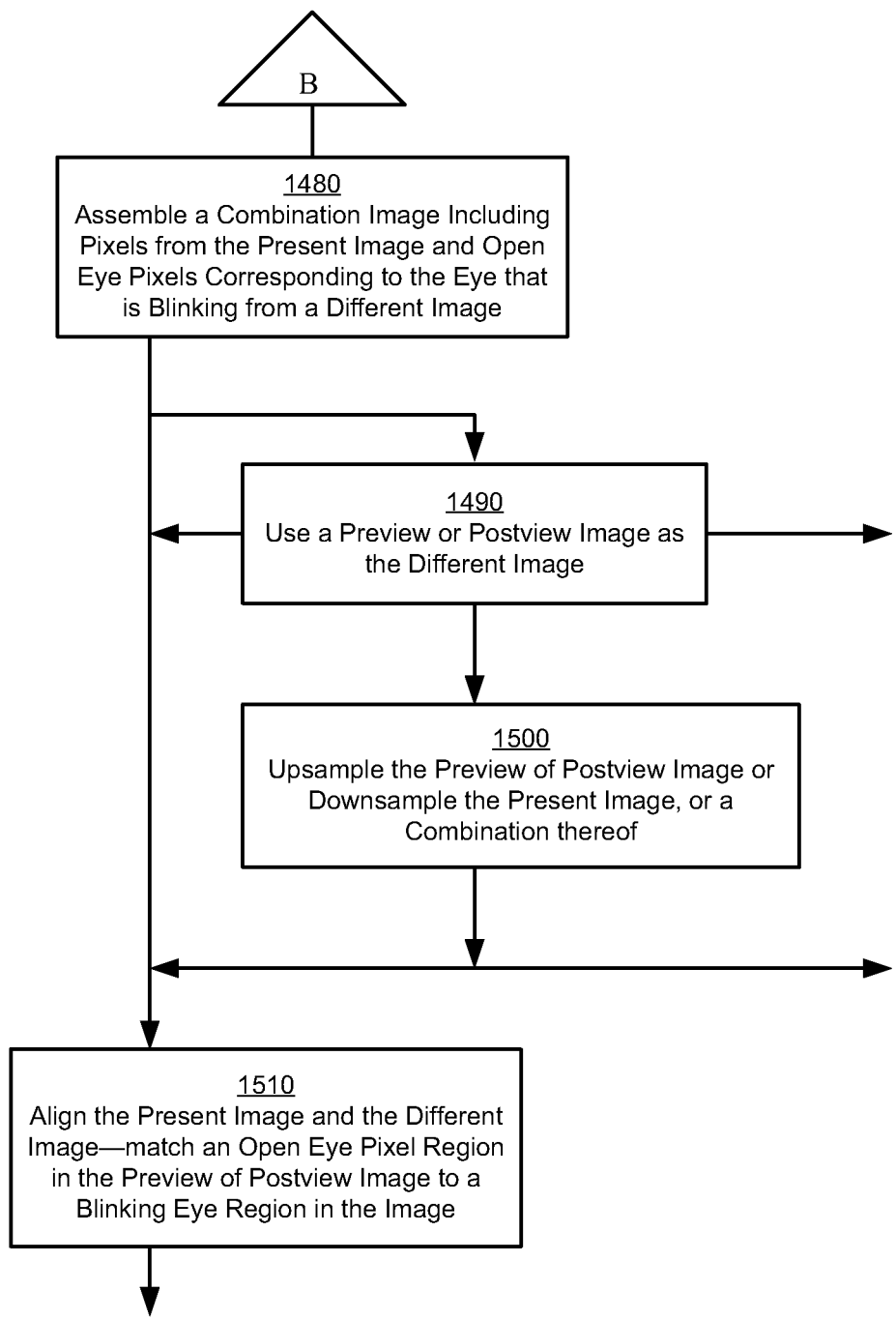
FIG. 15 illustrates a method of assembling a combination image in accordance with another embodiment.

FIG. 15 illustrates a method of assembling a combination image in accordance with a preferred embodiment. At 1480, a combination image is assembled including pixels from a present image and open eye pixels from a different image that correspond to the eye that is blinking in the present image. The different image may be a preview or postview image 1490. In this case, particularly if the preview or postview image has lower resolution than the present image, then at 1500 the preview image may be upsampled or the postview image may be downsampled, or a combination thereof. The present image and the different image are preferably aligned at 1510 to match the open eye pixel region in the preview of postview image to the blinking eye region in the present image.

In an alternative embodiment, eye detection software may be activated inside a camera or other handheld or portable device, as part of an acquisition process. In this scenario, the eye detection portion may be implemented differently to support real time or near real time operation. Such implementation may include sub-sampling of the image, and weighted sampling to reduce the number of pixels on which the computations are performed. This embodiment is further described with reference to FIG. 16.

Figure 16:
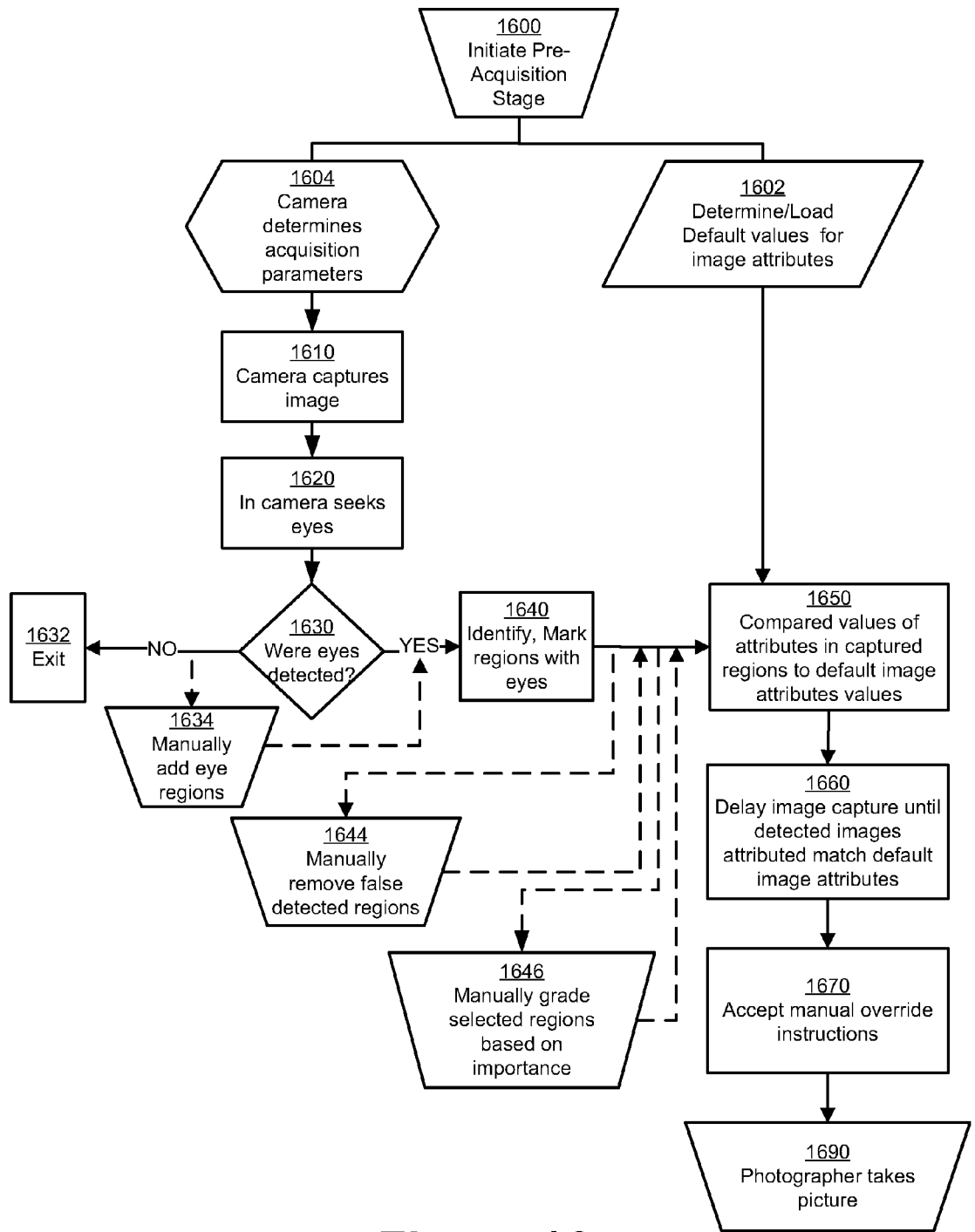
FIG. 16 illustrates a generic workflow of utilizing eye information in an image to delay image acquisition in accordance with another embodiment.

FIG. 16 describes a process that uses face detection to improve in camera acquisition parameters. In this scenario, a camera is activated at 1600, for example by means of half pressing the shutter, turning on the camera, etc. The camera then goes through the normal pre-acquisition stage to determine at 1604 the correct acquisition parameters such as aperture, shutter speed, flash power, gain, color balance, white point, or focus. In addition, a default set of image attributes, particularly related to potential faces in the image, are loaded at 1602. Such attributes can be the overall color balance, exposure, contrast, orientation etc. Alternatively, a collection of preview images may be analyzed to determine the potential existence of faces in the picture. A region wherein potentially the eyes will be when the full resolution is captured may also be predicted. This alternative technique may then include moving on to block 1610 and/or 1602.

At 1602, default values are loaded and/or determined for image attributes. Then at 1650, values of attributes, e.g., of one or more reference images, particularly preview images, are compared in captured regions to default or other reference image attribute values. Image capture may be delayed at 1660 while the attributes match default image attributes. Manual override instructions may be accepted at 1670. A photographer may take a picture at 1690.

At 1610, a camera captures a main or reference image. At 1620, the camera seeks eyes in the image. If no eye has been detected at 1630, then the process exits at 1632. Eyes may be manually added at 1634. If eyes are detected, then regions are marked or otherwise identified as eyes at 1640. False detected eye regions may be removed at 1644. At 1646, selected regions may be manually graded based on importance. Then, the process moves to 1650, 1660, 1670 and 1690 as introduced above.

In an alternative embodiment, the eye detection can then also make use of information provided from preview images to determine the location of the eyes in preview, thus expediting the analysis being performed in a smaller region on the final image.

In an alternative embodiment, the eye detection software may be activated inside the rendering device as part of the output process. In this scenario, the eye detection portion may be implemented either within the rendering device, using the captured image or using a single or plurality of preview images, or within an external driver to such device. This embodiment is further described with reference to FIG. 17 (see below).

Figure 17:
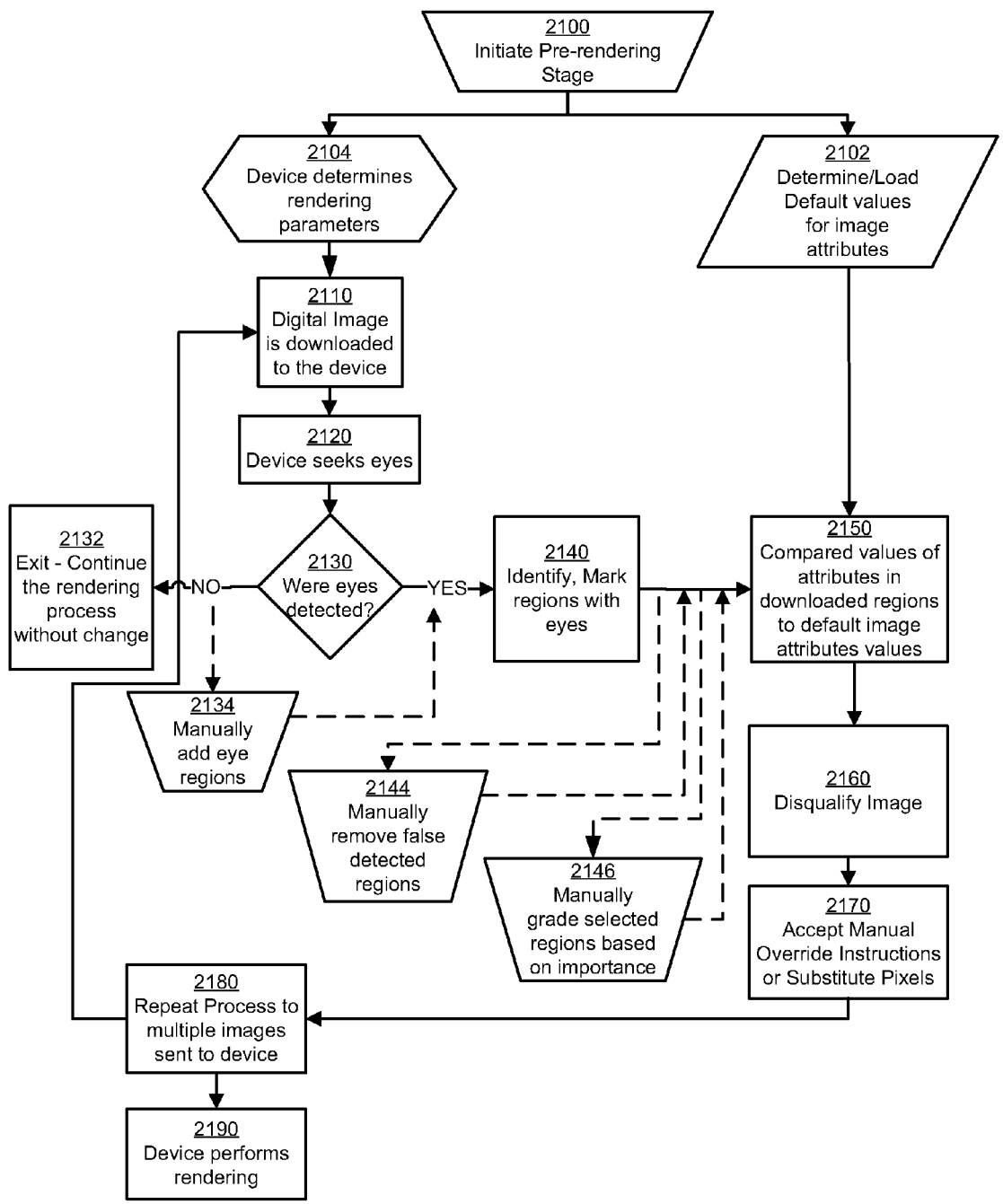
FIG. 17 illustrates a generic workflow of utilizing face information in a single or a plurality of images to adjust the image rendering parameters prior to outputting the image in accordance with another embodiment.

Referring to FIG. 17, a process is described for using eye, face or other feature detection to improve output or rendering parameters. In this scenario, a rendering device such as a printer or a display, hereinafter referred to as "the device" is activated at 2100. Such activation can be performed for example within a printer, or alternatively within a device connected to the printer such as a PC or a camera. The device then goes through a normal pre-rendering stage to determine at 2104, the correct rendering parameters such as tone reproduction, color transformation profiles, gain, color balance, white point and resolution. In addition, a default set of image attributes, particularly related to potential eyes or faces in the image, are loaded at 2102. Such attributes can be the overall color balance, exposure, contrast, or orientation, or combinations thereof.

An image is then digitally downloaded onto the device 2110. An image-detection process, preferably an eye or a face detection process, is applied to the downloaded image to seek eyes or faces in the image at 2120. If no images are found, the process terminates at 2132 and the device resumes its normal rendering process. Alternatively, or in addition to the automatic detection of 2130, the user can manually select 2134 detected eyes or faces or other features, using some interactive user interface mechanism, by utilizing, for example, a display on the device. Alternatively, the process can be implemented without a visual user interface by changing the sensitivity or threshold of the detection process.

When eyes or faces are detected at 2130, they are marked at 2140, and labeled. Detecting in 2130 may be more than a binary process of selecting whether an eye or a face is detected or not. It may also be designed as part of a process where each of the eyes or faces is given a weight based on size of the faces, location within the frame, other parameters described herein, etc., which define the importance of the eye or face in relation to other eyes or faces detected.

Alternatively, or in addition, the user can manually deselect regions at 2144 that were wrongly false detected as eyes or faces. Such selection can be due to the fact that an eye or face was false detected or when the photographer may wish to concentrate on one or two of the eyes or one of the faces as the main subject matter and not on other eyes or faces. Alternatively, 2146, the user may re-select, or emphasize one or more eyes or faces to indicate that these eyes or faces have a higher importance in the calculation relative to other eyes or faces. This process as defined in 1146, further defines the preferred identification process to be a continuous value one as opposed to a binary one. The process can be done utilizing a visual user interface or by adjusting the sensitivity of the detection process.

After the eyes or faces or other scene or image features are correctly isolated at 2140, their attributes are compared at 2150 to default values that were predefined in 2102. At least one preferred attribute that the process is looking for is blinking eyes. Such comparison will determine a potential transformation between the two images, in order to reach the same values. The image may be disqualified at 2160 if one or more eyes are determined to be blinking. The disqualifying may be overridden manually at 2170 or open eye pixels may be substituted from a different image. The transformation may be translated to the device rendering parameters, and the image at 2190 may be rendered. The process may include a plurality of images. In this case at 2180, the process repeats itself for each image prior to performing the rendering process. A practical example is the creation of a thumbnail or contact sheet which is a collection of low resolution images, on a single display instance.

A practical example is that if the eyes or face were too darkly captured, the rendering parameters may change the tone reproduction curve to lighten the eyes or face. Note that the image attributes are not necessarily only related to the eye or face regions, but can also be in relation to an overall tone reproduction.

Figure 18:
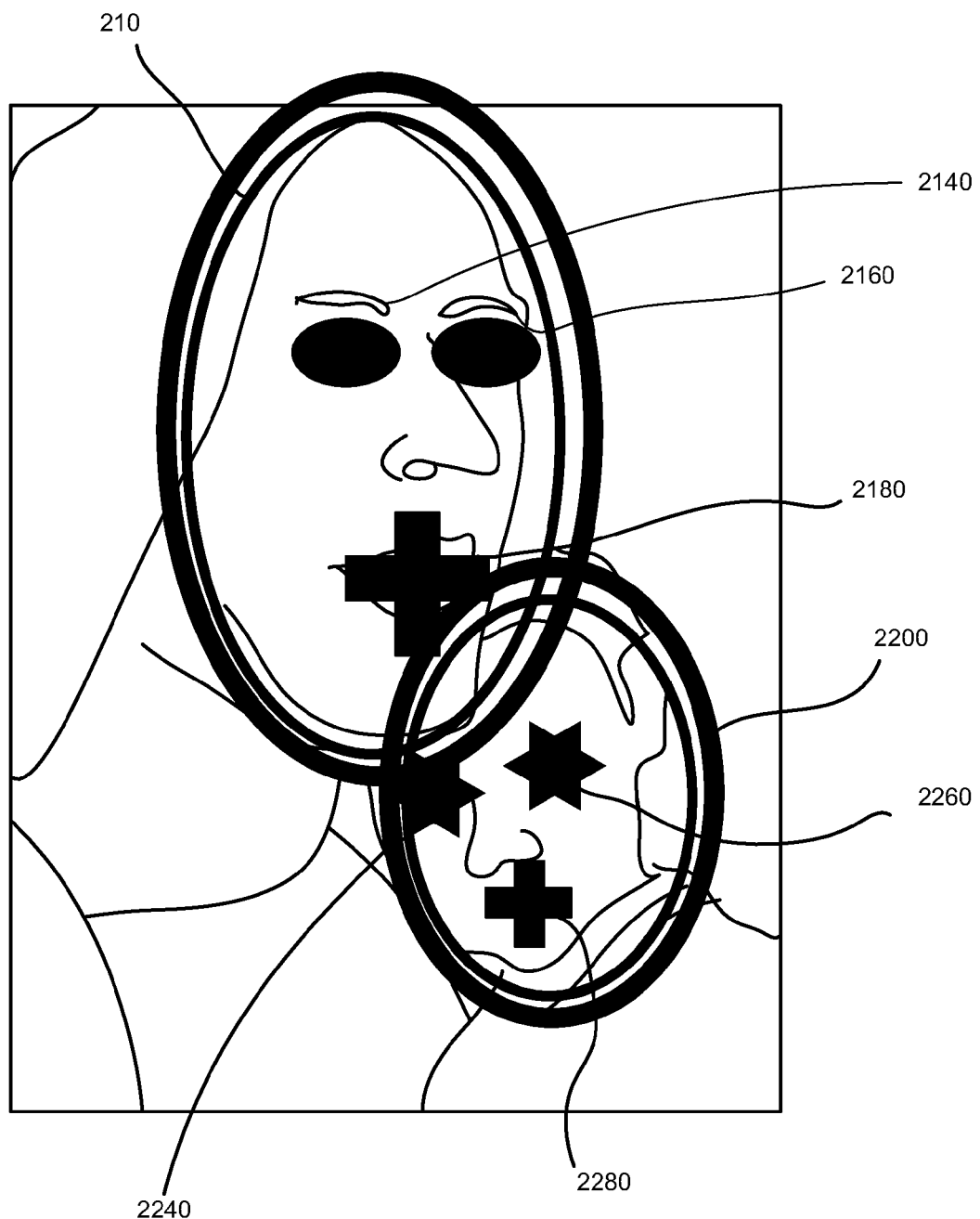
FIG. 18 illustrates face, eye or mouth detection, or combinations thereof, in accordance with one or more further embodiments.

FIG. 18 describes extracting pertinent features of a face, which are usually highly detectable. Such objects may include the eyes, 2140, 2160 and 2240, 2260, and the lips, 2180 and 2280, or the nose, eye brows, eye lids, features of the eyes, hair, forehead, chin, ears, etc. The combination of the two eyes (or two eyebrows, two ears or two nostrils, etc.) and the center of the lips (or nose or chin, etc.) creates a triangle which can be detected not only to determine the orientation of the face but also the rotation of the face relative to a facial shot. Note that there are other highly detectable portions of the image which can be labeled and used for orientation detection, such as the nostrils, the eyebrows, the hair line, nose, bridge and the neck as the physical extension of the face, etc. In this figure, the eyes and lips are provided as an example of such facial features Based on the location of the eyes, if found, and the mouth, the image might ought to be rotated in a counter clockwise direction.

Note that it may not be enough to just locate the different facial features, but such features may be compared to each other. For example, the color of the eyes may be compared to ensure that the pair of eyes originated from the same person.

Alternatively, the features of the face may be compared with preview images. Such usage may prevent a case where a double upper eyelid may be mistaken to a semi closed eye. If the software combines the mouth of 2180 with the eyes of 2260, 2240 as illustrated at FIG. 18, the orientation would have been determined as clockwise. In this case, the software detects the correct orientation by comparing the relative size of the mouth and the eyes. The above method describes exemplary and illustrative techniques for determining the orientation of the image based on the relative location of the different facial objects. For example, it may be desired that the two eyes should be horizontally situated, the nose line perpendicular to the eyes, the mouth under the nose etc. Alternatively, orientation may be determined based on the geometry of the facial components themselves. For example, it may be desired that the eyes are elongated horizontally, which means that when fitting an ellipse on the eye, such as described in blocs 2140 and 2160, it may be desired that the main axis should be horizontal. Similar with the lips which when fitted to an ellipse the main axis should be horizontal. Alternatively, the region around the face may also be considered. In particular, the neck and shoulders which are the only contiguous skin tone connected to the head can be an indication of the orientation and detection of the face.

Face (or Other Subject) Tracking

Figure 19:
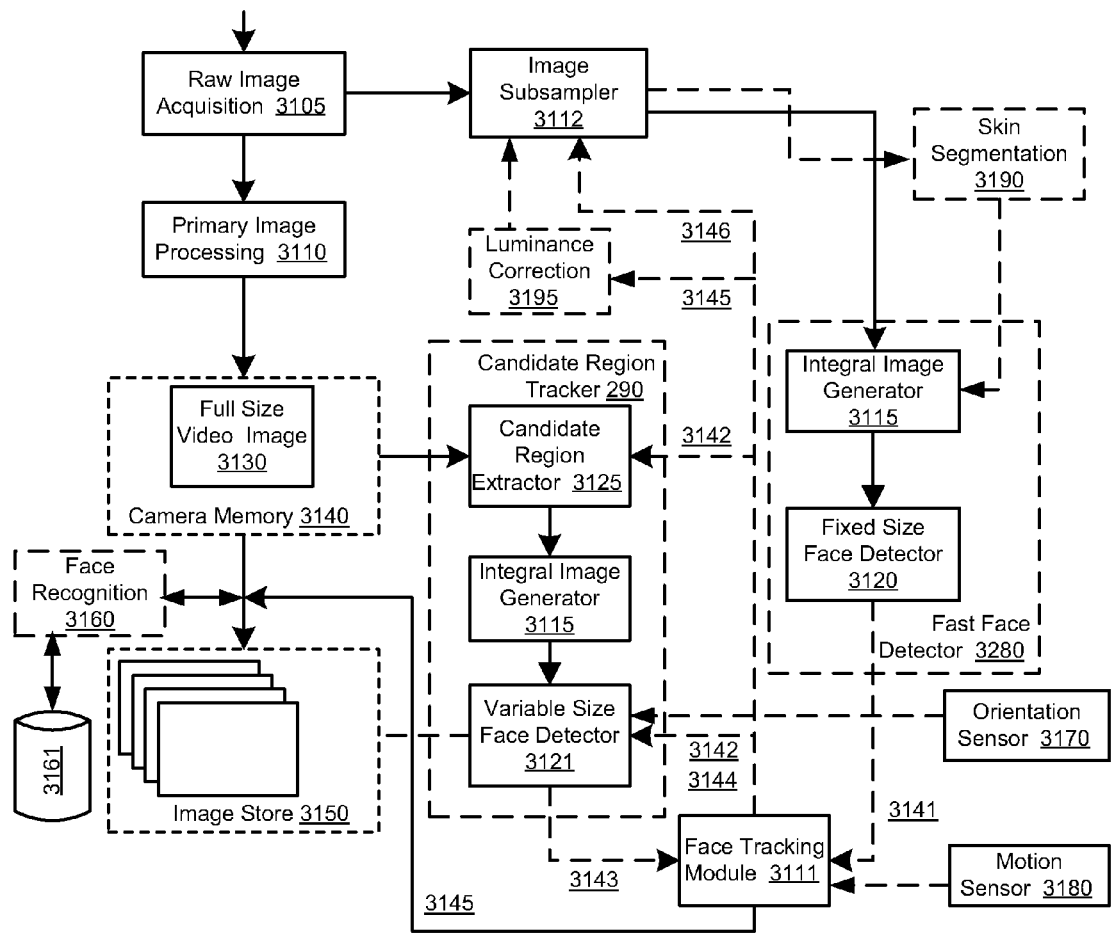
FIG. 19 is a block diagram illustrating the principle components of an image processing apparatus according to a preferred embodiment.

FIG. 19 illustrates primary subsystems of an image processing apparatus including a face tracking system in accordance with another embodiment. The solid lines indicate the flow of image data; the dashed line indicates control inputs or information outputs (e.g. location(s) of detected faces) from a module. In this example an image processing apparatus can be a digital still camera (DSC), a video camera, a cell phone equiped with an image capturing mechanism or a hand help computer equiped with an internal or external camera.

A digital image is acquired in raw format from an image sensor (CCD or CMOS) 3105 and an image subsampler 3112 generates a smaller copy of the main image. Most digital cameras already contain dedicated hardware subsystems to perform image subsampling, for example to provide preview images to a camera display. Typically the sub-sampled image is provided in bitmap format (RGB or YCC). In the meantime the normal image acquisition chain performs post-processing on the raw image 3110 which typically includes some luminance and color balancing. In certain digital imaging systems the subsampling may occur after such post-processing, or after certain post-processing filters are applied, but before the entire post-processing filter chain is completed.

The subsampled image is next passed to an integral image generator 3115 which creates an integral image from the subsampled image. This integral image is next passed to a fixed size face detector 3120. The face detector is applied to the full integral image, but as this is an integral image of a subsampled copy of the main image, the processing required by the face detector is proportionately reduced. If the subsample is one quarter of the main image, this implies the involved processing time will be only 25% of what would be involved for the full image.

This approach is particularly amenable to hardware embodiments where the subsampled image memory space can be scanned by a fixed size DMA window and digital logic to implement a Haar-feature classifier chain can be applied to this DMA window. However, this does not preclude the use of several sizes of classifier (in a software embodiment), or the use of multiple fixed-size classifiers (in a hardware embodiment). The key advantage is that a smaller integral image is calculated.

After application of the fast face detector 3280 any newly detected candidate face regions 3141 are passed onto a face tracking module 3111 where any face regions confirmed from previous analysis 3145 are merged with the new candidate face regions prior to being provided 3142 to a face tracker 3290.

In alternative embodiments, sub-sampled preview images for the camera display can be fed through a separate pipe than the images being fed to and supplied from the image sub-sampler 3112 and so every acquired image and its sub-sampled copies can be available both to the detector 3280 as well as for camera display.

In addition to periodically acquiring samples from a video stream, the process may also be applied to a single still image acquired by a digital camera. In this case, the stream for the face tracking comprises a stream of preview images and the final image in the series is the full resolution acquired image. In such a case, the face tracking information can be verified for the final image. In addition, the information such as coordinates or mask of the face may be stored with the final image. Such data for example may fit as an entry in the saved image header, for future post processing, whether in the acquisition device or at a later stage by an external device.

When the confidence factor is sufficiently high for a region, indicating that at least one face is in fact present in an image frame, the camera firmware runs a light-weight face recognition algorithm 3160 at the location of the face, for example a DCT-based algorithm. The face recognition algorithm 3160 uses a database 3161 preferably stored on the camera comprising personal identifiers and their associated face parameters.

In operation, the module 3160 collects identifiers over a series of frames. When the identifiers of a detected face tracked over a number of preview frames are predominantly of one particular person, that person is deemed by the recognition module to be present in the image. The identifier of the person, and the last known location of the face, may be stored either in the image (in a header) or in a separate file stored on the camera storage 3150. This storing of the person's ID can occur even when the recognition module 3160 fails for the immediately previous number of frames but for which a face region was still detected and tracked by the module 3111.

When the image is copied from camera storage to a display or permanent storage device such as a PC (not shown), the person's ID's are copied along with the images. Such devices are generally more capable of running a more robust face detection and recognition algorithm and then combining the results with the recognition results from the camera, giving more weight to recognition results from the robust face recognition (if any). The combined identification results are presented to the user, or if identification was not possible, the user is asked to enter the name of the person that was found. When the user rejects an identification or a new name is entered, the PC retrains its face print database and downloads the appropriate changes to the capture device for storage in the light-weight database 3161.

When multiple confirmed face regions 3145 are detected, the recognition module 3160 can detect and recognize multiple persons in the image.

Further Alternative Embodiments

Multiple images taken at different focal lengths may be used to simulate fill-flash (see 2003/0052991 to Stavely et al.). These multiple images may be of different sizes, and/or they may be misaligned, and/or they may be captured outside of a main acquisition process, such that described embodiments regarding use of preview/postview images in a camera would be advantageous A subsampled (or blurred) version of a main image may be used (see U.S. Pat. No. 6,249,315 to Holm), and according to described embodiments above subsampled preview images may be used as a reference image.

A scene may be "sensed" for regional brightness and range to subject prior to main image capture (see, e.g., 2001/0031142 to Whiteside). In accordance with certain embodiments, a preview image may be made available in a camera which is configured to perform the sensing.

Digital scene analysis may be performed for brightness adjustment (see, e.g., U.S. Pat. No. 5,724,456 to Boyack et al.). A system may be provided for processing a digital image signal representing an image that contains luminance and/or chrominance data. The luminance data may be mapped to a tonal reproduction capability of a destination application. An image signal may be acquired and the luminance data may be separated from the image signal. In accordance with certain embodiment, the image signal that is acquired may include a preview image or other reference image. The image signal may be converted and temporarily stored as a pixelated digital image. The luminance and chrominance data may be digitally processed.

Also, features have been described that relate to face tracking. In addition, a user may teach a camera by presenting the camera with a view of an object, such that the camera may then seek to control a tracking motor so as to keep the object in view, and/or a zoom motor such that the size of the object with respect to the overall image remains fixed at the region learned by the camera. In a further embodiment, a model of a person's head may be provided such that the camera can correctly identify the head, or others like it, within it's field of view. Thus the device seeks to maintain a lock on a target. Such may be performed mechanistically or according to software and/or firmware provided within the camera. Advantageously, multiple targets such as multiple faces or facial regions may be tracked and/or zoomed, and preferably digitally enhanced, e.g., in view of aesthetic considerations.

While an exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow and their structural and functional equivalents.

In addition, in methods that may be performed according to the claims below and/or preferred embodiments herein, the operations have been described in selected typographical sequences. However, the sequences have been selected and so ordered for typographical convenience and are not intended to imply any particular order for performing the operations, unless a particular ordering is expressly provided or understood by those skilled in the art as being necessary.

In addition, all references cited herein, as well as the background, invention summary, abstract and brief description of the drawings, are incorporated by reference into the detailed description of the preferred embodiments as disclosing alternative embodiments, including:

U.S. Pat. Nos. RE33682, RE31370, 4,047,187, 4,317,991, 4,367,027, 4,448,510, 4,638,364, 5,291,234, 5,488,429, 5,638,136, 5,710,833, 5,724,456, 5,781,650, 5,805,727, 5,812,193, 5,818,975, 5,835,616, 5,870,138, 5,900,909, 5,949,904, 5,978,519, 5,991,456, 6,035,072, 6,097,470, 6,101,271, 6,125,213, 6,128,397, 6,148,092, 6,151,073, 6,160,923, 6,188,777, 6,192,149, 6,233,364, 6,249,315, 6,263,113, 6,266,054, 6,268,939, 6,282,317, 6,298,166, 6,301,370, 6,301,440, 6,332,033, 6,393,148, 6,404,900, 6,407,777, 6,421,468, 6,438,264, 6,456,732, 6,459,436, 6,473,199, 6,501,857, 6,504,942, 6,504,951, 6,516,154, 6,526,161, 6,614,946, 6,621,867, 6,661,907, 6,747,690, 6,873,743, 6,965,684, 7,031,548, and 7,035,462;

US published patent applications nos. 2001/0031142, 2002/0051571, 2002/0090133, 2002/0102024, 2002/0105662, 2002/0114535, 2002/0176623, 2002/0172419, 20020126893, 2002/0102024, 2003/0025812, 2003/0039402, 2003/0052991, 2003/0071908, 2003/0091225, 2003/0193604, 2003/0219172, 2004/0013286, 2004/0013304, 20040037460, 2004/0041121, 2004/0057623, 2004/0076335, 2004/0119851, 2004/0120598, 2004/0223063, 2005/0031224, 2005/0041121, 2005/0047655, 2005/0047656, 2005/0068446, 2005/0078173, 2005/0140801, 2005/0147278, 20050232490, 2006/0120599, 2006/0039690, 2006/0098237, 2006/0098890, 2006/0098891, 2006/0140455, 2006/0204055, 2006/0204110, 2006/0285754, and 2007/0269108

U.S. patent application Ser. No. 11/764,339;

Japanese patent application no. JP5260360A2;

British patent application no. GB0031423.7;

Published PCT application no. WO-03/019473;

PCT Applications Nos. PCT/EP2004/008706, and PCT/EP2004/010199;

http://homepages.inf.ed.ac.uk/rbf/CVonline/LOCAL_COPIES/FAVARO1/df dtutorial.html;

Anlauf, J. K. and Biehl, M.: "The adatron: and adaptive perception algorithm". Neurophysics Letters, 10:687-692, 1989;

Baluja & Rowley, "Neural Network-Based Face Detection," IEEE Transactions on Pattern Analysis and Machine Intelligence, Vol. 20, No. 1, pages 23-28, January 1998;

Baluja, Shumeet in "Face Detection with In-Plane rotation: Early Concepts and Preliminary Results", Technical Report JPRC-TR-97-001;

Endo, M., "Perception of upside-down faces: and analysis form the viewpoint of cue saliency", in Ellis, H. Jeeves, M., Newcombe, F, and Young, A., editors, Aspects of Face Processing, 53-58, 1986, Matnus Nijhoff Publishers;

Moses, Yael and Ullman, Shimon and Shimon Edelman in "Generalization to Novel Images in Upright and Inverted Faces", 1994;

Le Saux, Bertrand and Amato, Giuseppe: "Image Classifiers for Scene Analysis", International Conference on Computer Vision and Graphics (ICCVG'04), Warsaw, Poland, September 2004;

Valentine, T., Upsaide Down Faces: A review of the effect of inversion and encoding activity upon face recognition", 1988, Acta Psychologica, 61:259-273;

Viola and Jones "Robust Real Time Object Detection", $2^{nd}$ international workshop on Statistical and Computational theories of Vision, in Vancouver, Canada, Jul. 31, 2001;

Yang et al., IEEE Transactions on Pattern Analysis and Machine Intelligence, Vol. 24, no. 1, pp 34-58 (January 2002);

Motion Deblurring Using Hybrid Imaging", by Moshe Ben-Ezra and Shree K. Nayar, from the Proceedings IEEE Computer Society Conference on Computer Vision and Pattern Recognition, 2003;

"Automatic Multidimensional Deconvolution" J. Opt. Soc. Am. A, vol. 4(1), pp. 180-188, January 1987 to Lane et al;

"Some Implications of Zero Sheets for Blind Deconvolution and Phase Retrieval", J. Optical Soc. Am. A, vol. 7, pp. 468-479, 1990 to Bates et al;

Iterative Blind Deconvolution Algorithm Applied to Phase Retrieval", J. Opt. Soc. Am. A, vol. 7(3), pp. 428-433, March 1990. to Seldin et al;

"Deconvolution and Phase Retrieval With Use of Zero Sheets," J. Optical Soc. Am. A, vol. 12, pp. 1,842-1,857, 1995 to Bones et al.;

"Digital Image Restoration", Prentice Hall, 1977 authored by Andrews, H. C. and Hunt, B. R., and "Deconvolution of Images and Spectra" 2nd. Edition, Academic Press, 1997, edited by Jannson, Peter A

What is claimed is:

1. A computer-implemented method comprising:
   receiving a plurality of images of a same scene captured by a camera;
   wherein the plurality of images comprises a particular image of the same scene, a preview image of the same scene and a postview image of the same scene;
   wherein the preview image, from the plurality of images, is an image acquired by the camera just shortly before the particular image was acquired by the camera;
   wherein the postview image, from the plurality of images, is an image acquired by the camera just after the particular image was acquired by the camera;
   wherein each of the preview image and the postview image has a resolution different than a resolution of the particular image;
   wherein each of the preview image and the postview image depicts the same objects and subjects as those depicted in the particular image of the plurality of images;
   determining whether the particular image, of the plurality of images, comprises a particular region that includes a defective depiction of one or more eyes;
   in response to determining that the particular image comprises the particular region that includes the defective depiction of the one or more eyes:
      selecting, either the preview image or the postview image that comprises a certain region;
      wherein:
         the certain region includes a non-defective depiction of the one or more eyes; and
         the certain region corresponds to the particular region in the particular image; and
      generating a combination image based, at least in part, on the particular image and the certain region by replacing the particular region in the particular image with the certain region;
   wherein the method is performed by one or more processors of a computing device configured as an optical system.

2. The method of claim 1, wherein one or more images of the plurality of images are obtained using one or more infra-red sensors.

3. The method of claim 1, wherein the determining whether the particular image comprises the particular region that includes the defective depiction of the one or more eyes comprises determining whether the particular image comprises a region that includes a depiction of a blinking-eye, and if so, determining a degree to which the blinking-eye is shut.

4. The method of claim 3, wherein the degree to which the blinking-eye is shut is determined based on analyzing the particular image and one or more images, of the plurality of images, acquired within a certain time interval before or after the particular image was acquired.

5. The method of claim 3, wherein the determining whether the particular region comprises the depiction of the blinking-eye comprises determining a degree of blurriness of one or more eye lids depicted in the particular region.

6. The method of claim 1, further comprising:
   determining whether any portion of a pupil, an iris, one or more eye lids, or an eye sclera is depicted in the particular region;
   performing a shape analysis of shapes identified in the particular region; performing a color analysis of pixels included in the particular region.

7. The method of claim 1, further comprising:
   applying a set of sub-filters to the particular image to determine whether any pixel grouping in the particular image is compatible with one or more known depictions of eye-defects;
   wherein the set of sub-filters comprise one or more of: geometric filters, additional region compactness filters, boundary continuity filters, or region size filters; and
   wherein the applying of the set of sub-filters to the particular image comprises determining one or more of: an eye shape, eyebrows, iris regions, or a red-eye region.

8. An interactive computing device comprising a processor and a display, wherein the processor is arranged to perform:
   receiving a plurality of images of a same scene captured by a camera;
   wherein the plurality of images comprises a particular image of the same scene, a preview image of the same scene and a postview image of the same scene;
   wherein the preview image, from the plurality of images, is an image acquired by the camera just shortly before the particular image was acquired by the camera;

wherein the postview image, from the plurality of images, is an image acquired by the camera just after the particular image was acquired by the camera;

wherein each of the preview image and the postview image has a resolution different than a resolution of the particular image;

wherein each of the preview image and the postview image depicts the same objects and subjects as those depicted in the particular image of the plurality of images;

determining whether the particular image, of the plurality of images, comprises a particular region that includes a defective depiction of one or more eyes;

in response to determining that the particular image comprises the particular region that includes the defective depiction of the one or more eyes:

selecting, either the preview image or the postview image that comprises a certain region;

wherein:
the certain region includes a non-defective depiction of the one or more eyes; and
the certain region corresponds to the particular region in the particular image; and generating a combination image based, at least in part, on the particular image and the certain region by replacing the particular region in the particular image with the certain region.

9. The interactive computing device of claim 8, wherein one or more images of the plurality of images are obtained using one or more infra-red sensors.

10. The interactive computing device of claim 8, wherein the determining whether the particular image comprises the particular region that includes the defective depiction of the one or more eyes comprises determining whether the particular image comprises a region that includes a depiction of a blinking-eye, and if so, determining a degree to which the blinking-eye is shut.

11. The interactive computing device of claim 10, wherein the degree to which the blinking-eye is shut is determined based on analyzing the particular image and one or more images, of the plurality of images, acquired within a certain time interval before or after the particular image was acquired.

12. The interactive computing device of claim 10, wherein the determining whether the particular region comprises the depiction of the blinking-eye comprises determining a degree of blurriness of one or more eye lids depicted in the particular region.

13. The interactive computing device of claim 8, wherein the processor is further arranged to perform:
determining whether any portion of a pupil, an iris, one or more eye lids, or an eye sclera is depicted in the particular region;
performing a shape analysis of shapes identified in the particular region; performing a color analysis of pixels included in the particular region.

14. The interactive computing device of claim 8, wherein the processor is further arranged to perform:
applying a set of sub-filters to the particular image to determine whether any pixel grouping in the particular image is compatible with one or more known depictions of eye-defects;
wherein the set of sub-filters comprise one or more of: geometric filters, additional region compactness filters, boundary continuity filters, or region size filters; and
wherein the applying of the set of sub-filters to the particular image comprises determining one or more of: an eye shape, eyebrows, iris regions, or a red-eye region.

15. A non-transitory, computer-readable storage medium storing one or more executable instructions which, when executed by one or more processors of an interactive computing device, cause performance of:
receiving a plurality of images of a same scene captured by a camera;
wherein the plurality of images comprises a particular image of the same scene, a preview image of the same scene and a postview image of the same scene;
wherein the preview image, from the plurality of images, is an image acquired by the camera just shortly before the particular image was acquired by the camera;
wherein the postview image, from the plurality of images, is an image acquired by the camera just after the particular image was acquired by the camera;
wherein each of the preview image and the postview image has a resolution different than a resolution of the particular image;
wherein each of the preview image and the postview image depicts the same objects and subjects as those depicted in the particular image of the plurality of images;
determining whether the particular image, of the plurality of images, comprises a particular region that includes a defective depiction of one or more eyes;
in response to determining that the particular image comprises the particular region that includes the defective depiction of the one or more eyes:
selecting either the preview image or the postview image that comprises a certain region;
wherein:
the certain region includes a non-defective depiction of the one or more eyes; and
the certain region corresponds to the particular region in the particular image; and
generating a combination image based, at least in part, on the particular image and the certain region by replacing the particular region in the particular image with the certain region.

16. The non-transitory, computer-readable storage medium of claim 15, wherein one or more images of the plurality of images are obtained using one or more infra-red sensors.

17. The non-transitory, computer-readable storage medium of claim 15, comprising additional instructions which, when executed by the one or more processors, cause performance of: determining whether the particular image comprises a region that includes a depiction of a blinking-eye, and if so, determining a degree to which the blinking-eye is shut.

18. The non-transitory, computer-readable storage medium of claim 17, wherein the degree to which the blinking-eye is shut is determined based on analyzing the particular image and one or more images, of the plurality of images, acquired within a certain time interval before or after the particular image was acquired.

19. The non-transitory, computer-readable storage medium of claim 17, comprising additional instructions which, when executed by the one or more processors, cause performance of: determining a degree of blurriness of one or more eye lids depicted in the particular region.

20. The non-transitory, computer-readable storage medium of claim 15, storing additional instructions which, when executed by the one or more processors, cause performance of:
- determining whether any portion of a pupil, an iris, one or more eye lids, or an eye sclera is depicted in the particular region;
- performing a shape analysis of shapes identified in the particular region; performing a color analysis of pixels included in the particular region.

21. The non-transitory, computer-readable storage medium of claim 15, storing additional instructions which, when executed by the one or more processors, cause performance of:
- applying a set of sub-filters to the particular image to determine whether any pixel grouping in the particular image is compatible with one or more known depictions of eye-defects;
- wherein the set of sub-filters comprise one or more of: geometric filters, additional region compactness filters, boundary continuity filters, or region size filters; and
- wherein the applying of the set of sub-filters to the particular image comprises determining one or more of: an eye shape, eyebrows, iris regions, or a red-eye region.

* * * * *